(12) United States Patent
Halter et al.

(10) Patent No.: US 9,073,274 B2
(45) Date of Patent: Jul. 7, 2015

(54) MOLDING APPARATUS HAVING AN IN-MOLD SHUTTER

(71) Applicant: Husky Injection Molding Systems Ltd., Bolton (CA)

(72) Inventors: Christophe Halter, Selange (BE); Pierre Glaesener, Bissen (LU); François Styga, Fremersdorff (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 14/092,992

(22) Filed: Nov. 28, 2013

(65) Prior Publication Data
US 2014/0093608 A1 Apr. 3, 2014

Related U.S. Application Data

(62) Division of application No. 13/202,799, filed as application No. PCT/CA10/01799 on Nov. 17, 2001, now Pat. No. 8,740,610.

(60) Provisional application No. 61/264,881, filed on Nov. 30, 2009, provisional application No. 61/264,883, filed on Nov. 30, 2009.

(51) Int. Cl.
*B29C 45/23* (2006.01)
*B29D 1/00* (2006.01)
(Continued)

(52) U.S. Cl.
CPC .............. *B29D 1/00* (2013.01); *B29C 45/1761* (2013.01); *B29C 45/1769* (2013.01);
(Continued)

(58) Field of Classification Search
CPC .................................................. B29C 45/1761

USPC .................................................. 425/589, 556
See application file for complete search history.

(56) References Cited

U.S. PATENT DOCUMENTS 2,514,486 A 7/1950 L. Green
3,156,014 A * 11/1964 Wenger .......................... 425/589
(Continued)

FOREIGN PATENT DOCUMENTS

CA 2501918 A1 5/2004
CN 1708388 A 12/2005
(Continued)

OTHER PUBLICATIONS

PCT International Search Report, Feb. 11, 2011, Ristovski, Branka, 5 pages.
(Continued)

*Primary Examiner* — Tim Heitbrink

(57) ABSTRACT

An in-mold shutter (140) for embedding in an injection mold (100, 200, 300) is described herein. The in-mold shutter (140, 240, 340, 440, 540) includes a shutter actuator (148, 548) that is configured to selectively engage a first mold shoe (130) of the injection mold (100, 200, 300) with a platen of a mold clamping assembly (996) to hold the first mold shoe (130) in an extended position (E), along a mold-stroke axis (X), during a step of molding a first molded article (102A) in the injection mold (100, 200, 300). Also described herein is a molded article transfer device (150, 250) for use with the injection mold (100, 200, 300). The molded article transfer device (150, 250) includes a shuttle (154) that is slidably arranged, in use, within the injection mold (100, 200, 300). The shuttle (154) defines a first aperture (156A), at least in part, that alternately accommodates: (i) a first mold stack (106A, 206A, 306A) arranged therein; and (ii) a first molded article (102A) received therein with opening of the first mold stack (106A, 206A, 306A).

17 Claims, 39 Drawing Sheets

(51) Int. Cl.

| | |
|---|---|
| *B29C 45/40* | (2006.01) |
| *B29C 45/42* | (2006.01) |
| *B29C 45/64* | (2006.01) |
| *B29C 45/26* | (2006.01) |
| *B29C 45/76* | (2006.01) |
| *B29C 45/80* | (2006.01) |
| B29C 45/17 | (2006.01) |
| B29C 45/36 | (2006.01) |

(52) U.S. Cl.
CPC ............ *B29C 45/40* (2013.01); *B29C 45/4225* (2013.01); *B29C 45/4005* (2013.01); *B29C 2045/4078* (2013.01); *B29C 45/64* (2013.01); *B29C 45/2618* (2013.01); *B29C 2045/363* (2013.01); *B29C 2045/4068* (2013.01); *B29C 45/76* (2013.01); *B29C 45/80* (2013.01); *Y10S 425/809* (2013.01)

(56) References Cited

U.S. PATENT DOCUMENTS

| | | |
|---|---|---|
| 3,982,869 A | 9/1976 | Eggers |
| 4,017,236 A | 4/1977 | Penkman et al. |
| 4,230,442 A | 10/1980 | Rees et al. |
| 4,438,065 A | 3/1984 | Brown |
| 4,589,840 A | 5/1986 | Schad |
| 4,889,480 A | 12/1989 | Nakamura et al. |
| 4,950,152 A | 8/1990 | Brun, Jr. et al. |
| 4,981,634 A | 1/1991 | Maus et al. |
| 5,037,597 A | 8/1991 | McGinley et al. |
| 5,133,655 A | 7/1992 | Schad et al. |
| 5,141,430 A | 8/1992 | Maus et al. |
| 5,195,431 A | 3/1993 | Kohno et al. |
| 5,209,889 A | 5/1993 | Brown et al. |
| 5,302,109 A | 4/1994 | Glaesener et al. |
| 5,318,435 A | 6/1994 | Brown et al. |
| 5,417,913 A | 5/1995 | Arend |
| 5,449,282 A | 9/1995 | Brown et al. |
| 5,531,588 A | 7/1996 | Brun, Jr. et al. |
| 5,536,166 A | 7/1996 | Schad |
| 5,622,736 A | 4/1997 | Brown et al. |
| 5,639,488 A | 6/1997 | Nakano |
| 5,662,856 A | 9/1997 | Wunderlich |
| 5,776,521 A | 7/1998 | Wright et al. |
| 6,055,904 A | 5/2000 | Chun et al. |
| 6,126,429 A | 10/2000 | Burger et al. |
| 6,210,619 B1 | 4/2001 | Owens |
| 6,238,202 B1 | 5/2001 | Joseph |
| 6,325,955 B1 | 12/2001 | Herbst |
| 6,398,537 B2 | 6/2002 | Matysek |
| RE37,827 E | 9/2002 | Schad |
| 6,450,797 B1 | 9/2002 | Joseph |
| 6,461,141 B1 | 10/2002 | Harrison et al. |
| 6,626,658 B2 | 9/2003 | Ito et al. |
| 6,652,262 B2 | 11/2003 | Kroeger |
| 6,730,262 B1 | 5/2004 | Hendry et al. |
| 6,767,497 B2 | 7/2004 | Knepper et al. |
| 6,832,906 B2 | 12/2004 | Hamann |
| 6,890,477 B2 | 5/2005 | Homann et al. |
| 6,890,478 B2 | 5/2005 | Hendry et al. |
| 6,899,843 B2 | 5/2005 | Homann |
| 6,939,504 B2 | 9/2005 | Homann et al. |
| 6,945,765 B2 | 9/2005 | Roetzel |
| 7,128,564 B2 | 10/2006 | Di Simone |
| 7,157,037 B2 | 1/2007 | Seidelman et al. |
| 7,291,305 B2 | 11/2007 | Vanderploeg et al. |
| 7,351,050 B2 | 4/2008 | Vanderploeg et al. |
| 7,462,319 B2 | 12/2008 | Keir et al. |
| 7,708,919 B2 | 5/2010 | Patterson et al. |
| 7,811,497 B2 | 10/2010 | Balint et al. |
| 8,057,728 B2 | 11/2011 | Zoppas et al. |
| 8,393,888 B2 | 3/2013 | Halter et al. |
| 8,459,977 B2 | 6/2013 | Glaesener et al. |
| 8,543,434 B2 | 9/2013 | Gaiser |
| 8,550,806 B2 | 10/2013 | Halter et al. |
| 8,709,326 B2 | 4/2014 | Sakamoto |
| 2001/0038163 A1 | 11/2001 | Matysek |
| 2002/0001637 A1 | 1/2002 | Taha |
| 2004/0084809 A1 | 5/2004 | Vanderploeg et al. |
| 2007/0059395 A1 | 3/2007 | Serniuck et al. |
| 2008/0088068 A1 | 4/2008 | Alberts |
| 2008/0099950 A1 | 5/2008 | Lindsten |
| 2009/0032996 A1 | 2/2009 | Orden et al. |
| 2011/0233823 A1 | 9/2011 | Schad et al. |
| 2011/0304076 A1 | 12/2011 | Halter et al. |
| 2011/0305786 A1 | 12/2011 | Glaesener et al. |
| 2012/0038076 A1 | 2/2012 | Lausenhammer et al. |

FOREIGN PATENT DOCUMENTS

| | | |
|---|---|---|
| CN | 101100104 A | 1/2008 |
| EP | 0551099 A1 | 7/1993 |
| EP | 0381107 B1 | 6/1994 |
| EP | 0852176 A1 | 7/1998 |
| EP | 1136220 A2 | 9/2001 |
| EP | 1136220 B1 | 12/2004 |
| JP | S62178123 U | 11/1987 |
| JP | H03081127 A | 4/1991 |
| JP | 2004050465 A | 2/2004 |
| JP | 2004299783 A | 10/2004 |
| JP | 2006504557 A | 2/2006 |
| JP | 2006341426 A | 12/2006 |
| WO | WO 97/48539 A1 | 12/1997 |
| WO | WO 98/19850 A1 | 5/1998 |
| WO | 2004041507 A2 | 5/2004 |

OTHER PUBLICATIONS

European Search Report, 6 pages, Nov. 14, 2014.

\* cited by examiner

MOLDING APPARATUS HAVING AN IN-MOLD SHUTTER

CROSS-REFERENCE TO RELATED APPLICATIONS

This application is a divisional of U.S. patent application Ser. No. 13/202,799 filed Aug. 23, 2011, which is a U.S. National Stage entry of PCT/CA2010-001799, filed 17 Nov. 2010, which claims priority from U.S. Provisional patent applications 61/264,881 and 61/264,883 both filed 30 Nov. 2009, the disclosures of which are incorporated herein by reference thereto.

TECHNICAL FIELD

The non-limiting embodiments disclosed herein generally relate to a molding apparatus, and more particularly to an in-mold shutter and a molded article transfer device for use with an injection mold, and a controller with which to execute related molding processes.

BACKGROUND

U.S. Pat. No. 7,351,050 to Vanderploeg et al., published on Apr. 1, 2008 teaches a servo side shuttle apparatus and method for a molding machine includes structure and/or steps whereby a shuttle plate is disposed adjacent at least one of a first mold half and a second mold half of the molding machine. A guidance assembly is coupled to the mold half and guides the shuttle plate linearly across a molding face of the mold half. A drive mechanism is provided to drive the shuttle plate in a linear direction. An operation structure is coupled to the shuttle plate and is configured to perform an operation on a molded article disposed either in the mold cavity or on the mold core. The operation may include removing the molded article from a mold core, applying a label to a mold cavity, and/or closing the lid of a molded article while it is resident on the mold core.

U.S. Pat. No. 5,037,597 to McGinley et al., published on Aug. 6, 1991 teaches an injection molding apparatus and process for forming a plurality of first parts and a plurality of complementary second parts during a single molding cycle has a system for removing parts molded during each cycle and for assembling the parts into finished articles. The system includes a plurality of rotatable suction cups for removing the parts and for aligning them with and inserting them into a series of loading ports in a central mold member so as to mate respective ones of the first parts with respective ones of the second parts. The central mold member further has internal chute assemblies for conveying assembled articles away from the mold. A novel system for driving the rotatable suction cups uses a rotatable member mounted to various mold halves and a camming arrangement whereby relative movement of the mold halves during the mold closing and opening motions causes rotation of the suction cups.

U.S. Pat. No. 4,589,840 to Schad, published on May 20, 1986 teaches an apparatus for continuously receiving and collecting molded articles from a continuously cycling injection molding machine where the articles are collected sequentially and continuously in a uniform physical position or orientation.

U.S. Pat. No. 6,939,504 to Homann et al., published on Sep. 6, 2005 teaches a method and system for producing hollow rib structures for trim components and panels using gas assisted injection molding. Movable insert members are provided in the mold cavity, particularly at the ends of the structural rib members. After the plastic material is injected into the mold cavity, the plastic is packed in the mold, and the insert members are locked in position. Selectively activatable locking mechanisms are used to lock up the insert members. Thereafter, gas or another fluid is introduced into the rib members in order to provide hollow channels therein. Movement of the insert members provides a recess or groove for placement of the displaced resin from the rib members. The displaced resin material completes the formation of the molded plastic article.

U.S. Pat. No. 3,982,869 to Eggers, published on Sep. 28, 1976 teaches a multiple mold assembly is disclosed for molding articles in an injection molding apparatus. The assembly includes two molding sections that are alternatively shuttled from positions wherein one of the molding sections is in position for a molding operation, and the other molding section is in position for loading of inserts, performing preparatory or finishing operations, or removal of molded articles, to the reverse positions. The shuttle assembly of this invention is particularly adapted for use in a horizontal injection molding apparatus and for insert molding.

U.S. Pat. No. 4,981,634 to Maus et al., published on Jan. 1, 1991 teaches an injection molding process creates a micro clean room environment inside a mold cavity which can stay closed to airborne contaminants while ejecting and transferring the molded part out. The molded part is formed and solidified at a parting line plane within the mold cavity, then is carried rearward on the movable mold insert to a second plane where it is stripped off and transferred out through a discharge aperture which is open when the mold cavity is in the second plane but closed off when in the first plane. The aperture faces substantially downward to prevent entry by upwelling thermal air currents. External supplied filtered gas can provide positive pressure through vents within the moldset's internal space. This maximizes mold and part cleanliness while speeding up "mold-open" cycle; may eliminate HEPA filters/enclosures and robots. Optical disks, lenses, food packaging and medical parts are suggested uses.

U.S. Pat. No. 4,950,152 to Brun, published on Aug. 21, 1990 teaches a plurality of injection cores are inserted by a movable platen into corresponding injection cavities defined by mold inserts within a stationary platen, and the cores extend through corresponding split transfer mold cavities. After hollow preforms with threaded neck portions are molded within the cavities, the preforms are removed from the mold cavities, separated from the injection cores, and then shifted transversely by the split transfer molds to cooling or blow cavities defined by blow cavity inserts within the stationary platen on opposite sides of the corresponding injection cavities. The transfer molds return to receive the injection cores, and corresponding blow core units are inserted into the preforms within the blow cavities for pressurizing and expanding the preforms into firm contact with the blow inserts. The preforms are removed from the blow cavities by the blow cores on alternate cycles of press operation and are then released by retraction of the blow cores. The split transfer molds are shifted transversely in opposite directions and are opened and closed by a cam system which includes cam tracks mounted on the movable platen and incorporating cam track switches.

SUMMARY

According to a first aspect described herein, there is provided a molded article transfer device for use with an injection mold. The molded article transfer device includes a shuttle that is slidably arranged, in use, within the injection mold, the shuttle defining a first aperture, at least in part, that alternately accommodates: (i) a first mold stack arranged therein; and (ii) a first molded article received therein with opening of the first mold stack to retract it from the first aperture. The first molded article is transferable, in use, within the first aperture with shuttling movement of the shuttle.

According to a second aspect described herein, there is provided an injection mold that includes a first mold half, a second mold half, a molded article transfer device, and an in-mold shutter. The first mold half includes a first mold shoe with a first stack portion of a first mold stack connected thereto. The second mold half includes a second mold shoe with a second stack portion of the first mold stack connected thereto. The in-mold shutter being configured to position, in use, the first stack portion and the second stack portion relative to each other, along a mold-stroke axis, to close and open a molding cavity that is defined to therebetween for molding and ejecting, respectively, a first molded article. The molded article transfer device being configured to receive and transfer the first molded article with opening of the molding cavity.

According to a third aspect described herein, there is provided a controller including instructions being embodied in a controller-usable memory of the controller, the instructions for directing the controller to execute a molding process. The molding process includes: (i) closing a first mold stack of an injection mold to define a molding cavity therein, wherein the first mold stack is arranged within a first aperture that is defined by a shuttle of a molded article transfer device; (ii) molding a first molded article within the molding cavity; (iii) opening the first mold stack to retract it from the first aperture; (iv) arranging the first mold stack to eject the first molded article into the first aperture of the shuttle; and (v) shuttling of the shuttle to transfer the first molded article within the first aperture.

According to a fourth aspect described herein, there is provided an in-mold shutter for embedding in an injection mold. The in-mold shutter includes a shutter actuator that is configured to selectively engage a first mold shoe of an injection mold with a platen of a mold clamping assembly to hold the first mold shoe in an extended position, along a mold-stroke axis, during a step of molding a first molded article in the injection mold.

According to a fifth aspect described herein, there is provided an in-mold shutter for embedding in an injection mold. The in-mold shutter includes a shutter member that is associated, in use, with one of a platen of a mold clamping assembly and a first mold shoe of the injection mold. The in-mold shutter also includes a link member that is associated with a remaining one of the platen and the first mold shoe. The shutter member and the link member are configured to be selectively engageable, in use, to hold the first mold shoe in an extended position, along a mold-stroke axis, during a step of molding a first molded article in the injection mold.

According to a sixth aspect described herein, there is provided a controller including instructions being embodied in a controller-usable memory of the controller, the instructions for directing the controller to execute a molding process. The molding process includes: (i) closing a first mold stack of an injection mold to define a molding cavity therein; (ii) shuttering an in-mold shutter to engage a first mold shoe of the injection mold with one of a to moving platen and a stationary platen of a injection molding system; (iii) molding a first molded article within the molding cavity; (iv) un-shuttering the in-mold shutter to disengage the first mold shoe from the one of the moving platen and the stationary platen; and (v) selectively positioning the first mold shoe, along a mold-stroke axis.

These and other aspects and features will now become apparent to those skilled in the art upon review of the following description of specific non-limiting embodiments in conjunction with the accompanying drawings.

DETAILED DESCRIPTION OF THE DRAWINGS

The detailed description of illustrative (non-limiting) embodiments will be more fully appreciated when taken in conjunction with the accompanying drawings, in which.

Figure 14:
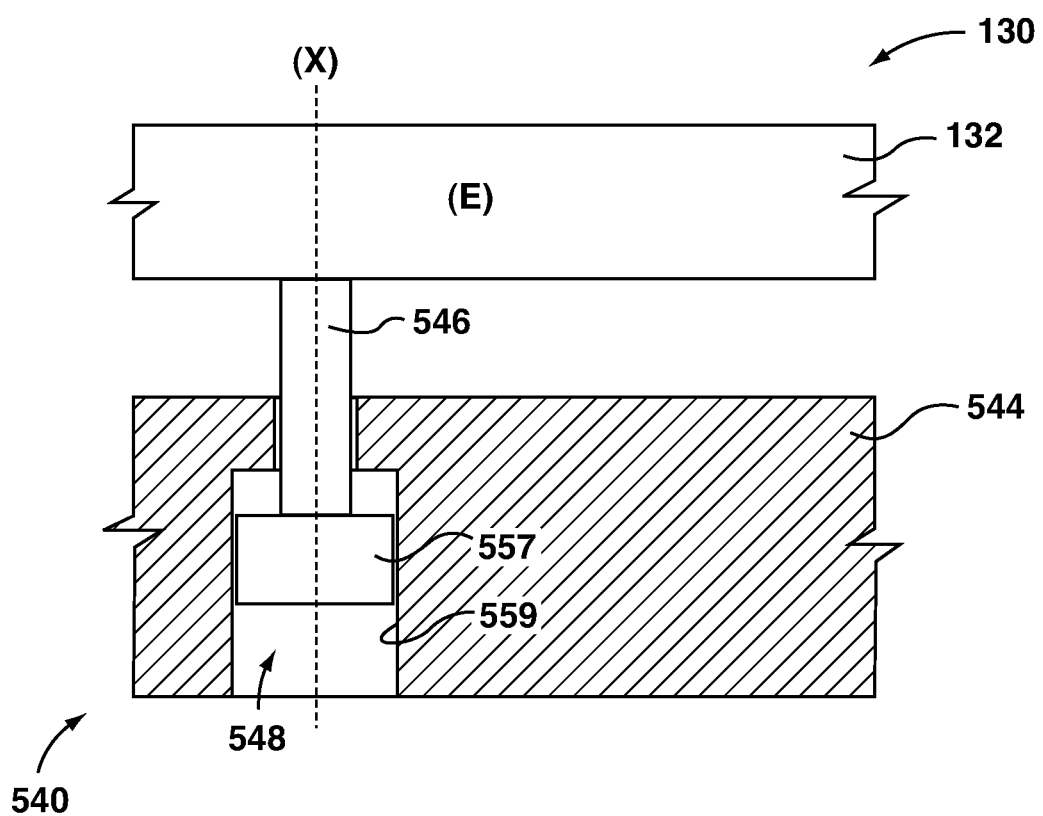

FIGS. 11A and 11B, 12A and 12B, and 13A and 13B depict various alternative non-limiting embodiments of an in-mold shutter in a shut position and an open position, respectively;

FIG. 14 depicts yet another alternative non-limiting embodiment of an in-mold shutter in a shut position.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Figure 1:
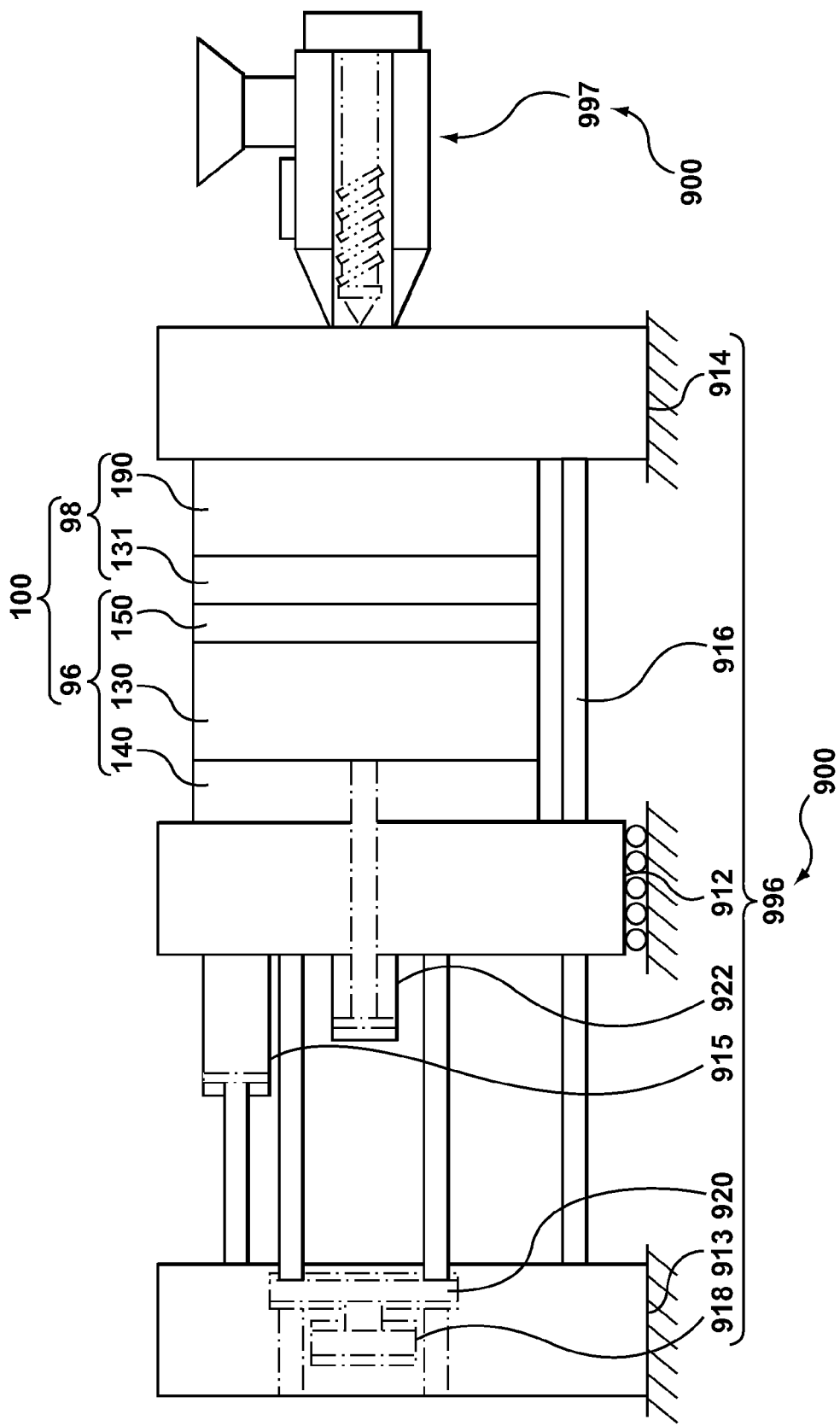
FIG. 1 depicts a schematic representation of an injection molding system having a non-limiting embodiment of an injection mold arranged therein.

FIG. 1 depicts a schematic representation of an injection molding system 900 with a non-limiting embodiment of an injection mold 100 arranged therein. The injection mold 100 is operable to mold a first molded article 102 (FIG. 2A) such as, for example, a container closure.

In the description of the injection molding system 900 and the injection mold 100 that follows many of the components thereof are known to persons skilled in the art, and as such these known components will not be described in detail herein. A detailed description of these known components may be referenced, at least in part, in the following reference books (for example): (i) "Injection Molding Handbook" authored by OSSWALD/TURNG/GRAMANN (ISBN: 3-446-21669-2), (ii) "Injection Molding Handbook" authored by ROSATO AND ROSATO (ISBN: 0-412-10581-3), (iii) "Injection Molding Systems" 3rd Edition authored by JOHANNABER (ISBN 3-446-17733-7) and/or (iv) "Runner and Gating Design Handbook" authored by BEAUMONT (ISBN 1-446-22672-9).

The injection molding system 900 shown in FIG. 1 is shown to include, but is not limited to, a mold clamping assembly 996 and an injection assembly 997.

By way of example, the mold clamping assembly 996 described hereafter is representative of a typical three-platen variety although no such specific limitation on the generality of the construction and/or operation thereof is intended. As such the mold clamping assembly 996 may have a different construction, such as, for example, one having only two-platens. That being said, the non-limiting embodiment of the mold clamping assembly 996 includes, amongst other things, a moving platen 912, a stationary platen 914, a clamp block 913, and a tie bar 916. The tie bar 916 links the stationary platen 914 with the clamp block 913, and moreover slidably supports the moving platen 912 thereon. While for the sake of simplicity of depiction only one tie bar 916 is shown, it is typical to provide four such tie bars 916, one extending between each of the four corners of the moving platen 912, the stationary platen 914, and the clamp block 913. The mold clamping assembly 996 also includes a platen-moving actuator 915 (such as, for example, a hydraulic actuator, a pneumatic actuator, an electro-mechanical actuator, or the like) that is connected between the moving platen 912 and the clamp block 913. The platen-moving actuator 915 is operable, in use, to move the moving platen 912 with respect to the stationary platen 914 and thus move a first mold half 96 with respect to a second mold half 98 that are mounted thereto, respectively. The mold clamping assembly 996 further includes a clamp actuator 918 and a clamp shutter 920 in association with the clamp block 913. The clamp shutter 920 is operable, in use, to selectively connect the clamp actuator 918 with the moving platen 912 for sake of a clamping together of the first mold half 96 and the second mold half 98. Lastly, the mold clamping assembly 996 may also include an ejector actuator 922 (such as, for example, a hydraulic actuator, a pneumatic actuator, an electro-mechanical actuator, or the like) that is associated with the moving platen 912. The ejector actuator 922 is connectable to a structure that is associated with the first mold half 96. The structure of the first mold half 96 is driven, in use, with actuation of the ejector actuator 922, whereby an operation is performed, such as, for example, ejecting the first molded article 102 from the first mold half 96.

By way of example, the injection assembly 997 described hereafter is representative of a typical reciprocating screw variety although no specific limitation on the generality of a construction and/or operation thereof is intended. As such the injection assembly 997 may have a different construction, such as, for example, one having separate plasticizing and injection means (i.e. so-called two stage variety). The injection assembly 997 is operable to melt and inject a molding material, such as, for example, Polyethylene or Polyethyleneterephthalate (PET) through a machine nozzle (not shown) and into a melt distribution apparatus 190 (e.g. hot runner, cold runner, insulated runner, or the like) that is associated with the second mold half 98. The melt distribution apparatus 190 in turn directs the molding material into one or more molding cavity 101 (FIG. 5A) that are defined within the injection mold 100 with the first mold half 96 and the second mold half 98 being closed and clamped together.

The first mold half 96 of the injection mold 100 is further shown as including an in-mold shutter 140, a molded article transfer device 150, and a first mold shoe 130 arranged therebetween. A detailed description of the structure and operation of the foregoing will follow. Broadly speaking, the in-mold shutter 140 is operable to selectively engage, in use, the first mold shoe 130 (FIG. 2A) of the first mold half 96 to one of the moving platen 912 and the stationary platen 914 of the mold clamping assembly 996, whereby the injection mold 100 may be opened or closed substantially without having to move the moving platen 912 relative to the stationary platen 914 (although such movement is not precluded). For its part, the first mold shoe 130 is structured to have a first stack portion 110 (FIG. 5A) of a first mold stack 106A connected thereto. Lastly, the molded article transfer device 150 is operable to transfer the first molded article 102A (FIG. 2A) that is received from the first mold stack 106A.

Figure 5A:
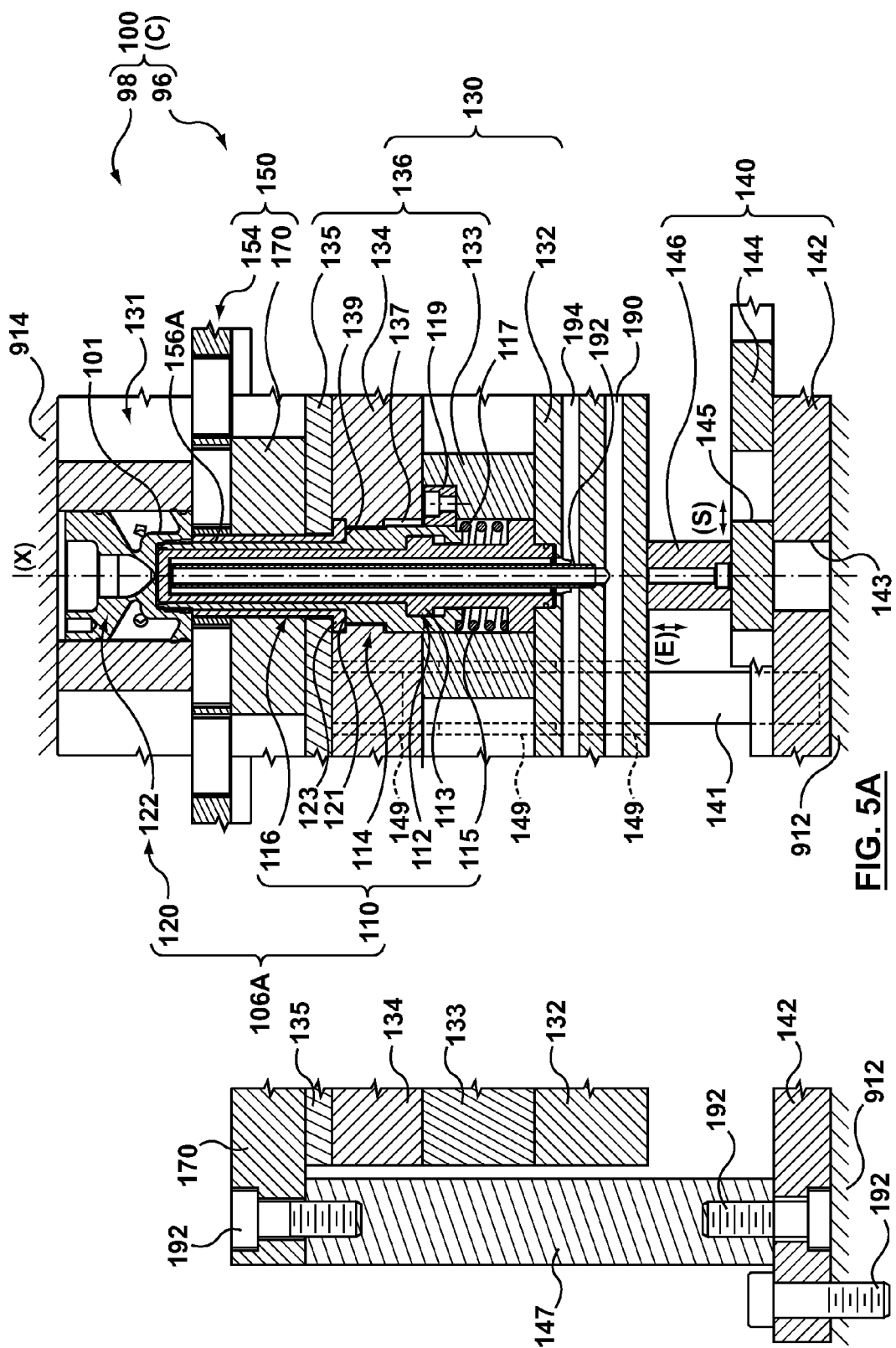
FIGS. 5A-5D depict a start-up molding process involving the injection mold, the molded article transfer device, and the in-mold shutter of FIG. 2A, wherein the injection mold, the molded article transfer device, and the in-mold shutter are each shown in section as taken along line A-A identified in FIGS. 2A and 2B.

A detailed construction of the non-limiting embodiment of the injection mold 100 may be appreciated with further reference to FIGS. 2A, 2B, 3, and 5A. As previously mentioned, and as best shown in FIG. 5A, the first stack portion 110 of the first mold stack 106A is shown connected to the first mold shoe 130 of the first mold half 96. Also shown is a second stack portion 120 of the first mold stack 106A that is connected to a second mold shoe 131 of the second mold half 98. The first stack portion 110 and the second stack portion 120 are positioned, in use, relative to each other, along a mold-stroke axis X of the injection mold 100, to close and open a molding cavity 101 that is defined therebetween for molding and ejecting, respectively, the first molded article 102A (FIG. 2A) therein.

The first stack portion 110 of the first mold stack 106A includes an inner core 112, an outer core 114, and a stripper sleeve 116 that cooperate, in use, with a cavity insert 122 of the second stack portion 120 to define the molding cavity 101.

The outer core 114 is slidably arranged around the inner core 112 to accommodate, in use, relative movement thereof along the mold-stroke axis X, a technical effect of which may include, for example, the release of a seal portion 103 (FIG. 5D) of the first molded article 102A. Likewise, the stripper sleeve 116 is slidably arranged around the outer core 114 to accommodate, in use, the relative movement thereof along the mold-stroke axis X, a technical effect of which may include, for example, the stripping of the first molded article 102A from the outer core 114.

As previously mentioned, the foregoing members of the first stack portion 110 are connected to the first mold shoe 130. Now, in more detail, the first mold shoe 130 includes a first core retainer 132 and a stripper retainer 136 that are slidably connected together to accommodate the relative movement thereof, in use, along the mold-stroke axis X, wherein the inner core 112 is connected to the first core retainer 132, and the stripper sleeve 116 is retained with the stripper retainer 136. As such, the stripper sleeve 116 is movable, in use, along the mold-stroke axis X, relative to the inner core 112, and to the outer core 114, albeit once the outer core 114 has reached its limit of travel with respect to the inner core 112, between a stripper sleeve molding position (FIG. 5A) and an ejection position (FIG. 5D), with relative movement between the first core retainer 132 and the stripper retainer 136.

Of note, the inner core 112 is shown to be connected to the first core retainer 132 in a fluid tight manner to isolate a coolant circuit that is defined therein. The coolant channel is defined between a coolant dispenser 193 and a space that is defined within the inner core 112 within which the coolant dispenser 193 is arranged. An end portion of the coolant dispenser 193 is connected to the first core retainer 132 and is otherwise arranged to direct coolant, in use, between a coolant inlet conduit 191 and a coolant outlet conduit 194 that are defined in the first core retainer 132. In operation, a coolant, such as water, is circulated through the coolant channel to remove heat from the inner core 112, and any of the other members of the first mold stack 106A that are thermally connected therewith, whereby the first molded article 102A may be rapidly cooled to ensure a faster molding cycle.

Figure 5B:
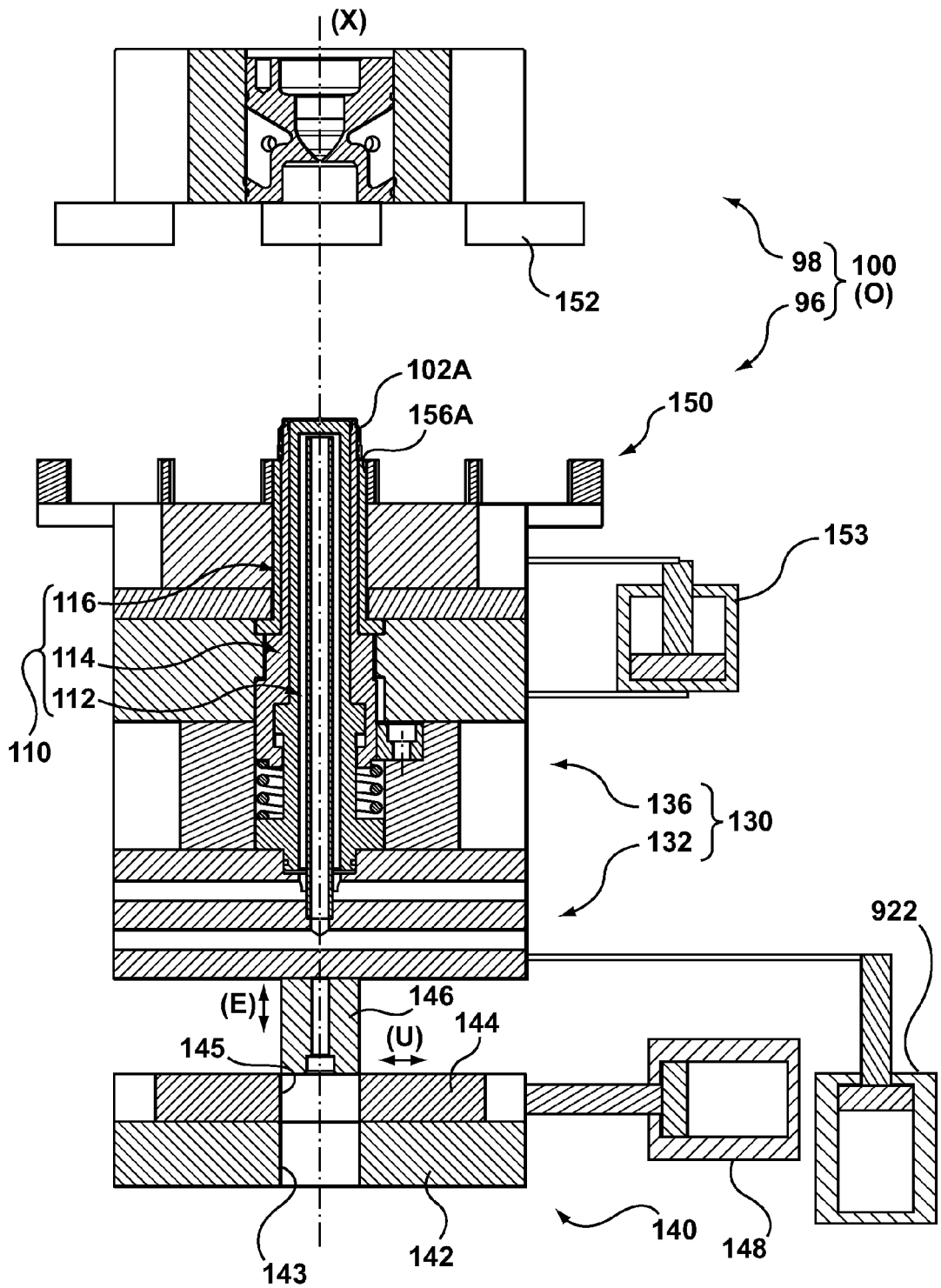

In this arrangement, the stripper sleeve 116 is fixedly arranged in a passageway 137 that is defined in the stripper retainer 136. More particularly, the stripper retainer 136 includes a base plate 133, an intermediate plate 134, and a top plate 135 that are fastened together, in use, with the passageway 137 being defined therethrough, wherein a flange portion 123 of the stripper sleeve 116 is retained between the intermediate plate 134 and the top plate 135. The outer core 114 is slidably arranged within the passageway 137 to accommodate relative movement between the outer core 114 and the stripper sleeve 116, along the mold-stroke axis X, with the movement of the outer core 114, from an outer core molding position (FIG. 5A) to a stripping position (FIG. 5D).

As previously alluded to, the outer core 114 and the inner core 112 are slidably retained together to limit, in use, the relative movement thereof, in use, along the mold-stroke axis X. For example, the inner core 112 may be structured to define a bayonet 113 and the outer core 114, 214, 314 structured to define a bayonet pocket 117, wherein the bayonet 113 and the bayonet pocket 117 are configured to cooperate, when rotatably engaged, to slidably retain the outer core 114 about the inner core 112. In operation the inner core 112 and the outer core 114 are kept rotatably engaged by a key 119 that is associated with the stripper retainer 136. The key 119 is fixedly arranged between the base plate 133 and the intermediate plate 134 with a portion thereof extending into the passageway 137 with which to cooperate with the outer core 114 to maintain an angular orientation thereof with respect to the inner core 112.

The first stack portion 110 further includes a resilient member 115 that is arranged between the inner core 112 and the outer core 114, and wherein the resilient member 115 is arranged to bias the outer core 114 towards a forward limit of travel with respect to the stripper sleeve 116 that corresponds with their relative arrangement during the molding of the first molded article 102A—as shown in FIG. 5A. The forward limit of travel of the outer core 114 with respect to the stripper sleeve 116 is provided through cooperation of a shoulder 121 that is defined on the outer core 114 and a step 139 that is defined in the passageway 137 across a bottom of the flange portion 123 of the stripper sleeve 116.

As previously mentioned, the injection mold 100 further includes the in-mold shutter 140 that is associated with the first mold half 96. As best shown with reference to FIG. 5A, the in-mold shutter 140 broadly includes a shutter member 144 and a link member 146. As shown, the shutter member 144 is associated with the moving platen 912 of the mold clamping assembly 996, and the link member 146 is associated with the first mold shoe 130. In operation, the shutter member 144 is alternately selectively positioned, in use, in: i) an open position U, and ii) a shut position S. As such, the in-mold shutter 140 further includes a shutter actuator 148 that is connected to the shutter member 144, the shutter actuator 148 being operable, in use, to drive the movement of the shutter member 144 between the open position U and the shut position S. With the shutter member 144 arranged in the shut position S, as shown in FIG. 5A, the shutter member 144 is engaged with the link member 146, whereby the first mold shoe 130 is engaged with the moving platen 912. With the shutter member 144 arranged in the open position U, as shown in FIG. 5B or 5F, the shutter member 144 is disengaged from the link member 146, whereby the first mold shoe 130 may be moved, in use, along the mold-stroke axis X. The movement of the first mold shoe 130, along the mold-stroke axis X, may be driven, for example, by the ejector actuator 922 of the mold clamping assembly 996. The foregoing is schematically shown with reference to FIG. 5B, wherein the ejector actuator 922 is shown to be connected to the first core retainer 132.

The in-mold shutter 140 further includes a support base 142 upon which the shutter member 144 is slidably coupled, and wherein the support base 142 is structured to be fixedly connected, in use, by a fastener 192, or the like, to the moving platen 912. Furthermore, the link member 146 is connected to a back face of the first core retainer 132 of the first mold shoe 130. In this arrangement, the link member 146 is aligned with the first stack portion 110 of the first mold stack 106A. Likewise, where the injection mold 100 includes a plurality of mold stacks, included in which is the first mold stack 106A, with which to define a plurality molding cavities to mold, in use, a plurality of molded articles, such as that shown with reference to FIGS. 2A and 2B, the in-mold shutter 140 may further include a plurality of link members, included in which is the link member 146, wherein each of the plurality of link members is aligned with one of the plurality of mold stacks. That being said, no such specific limitation as to the number and arrangement of the link members is intended.

Figure 5C:
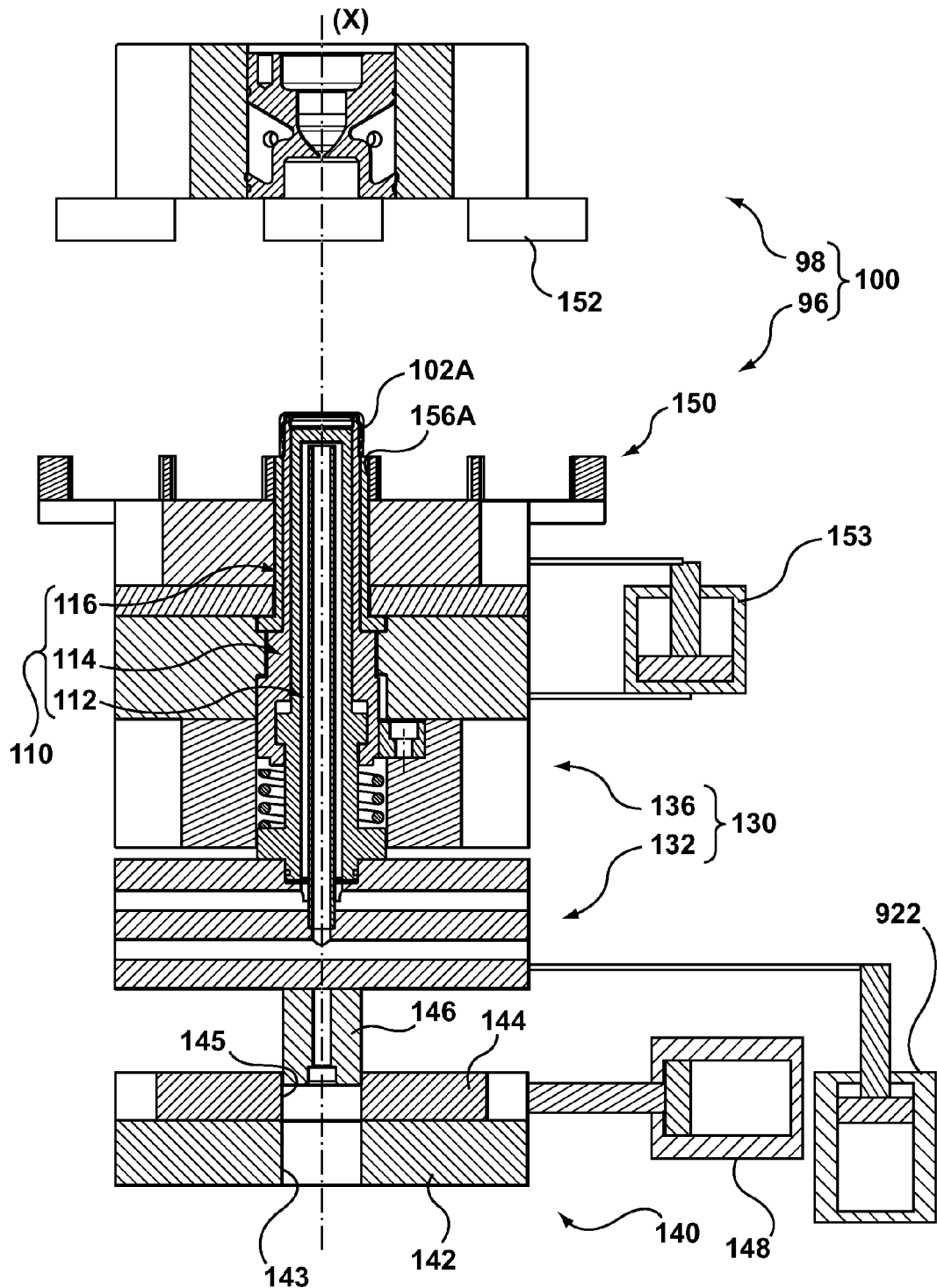
Figure 5D:
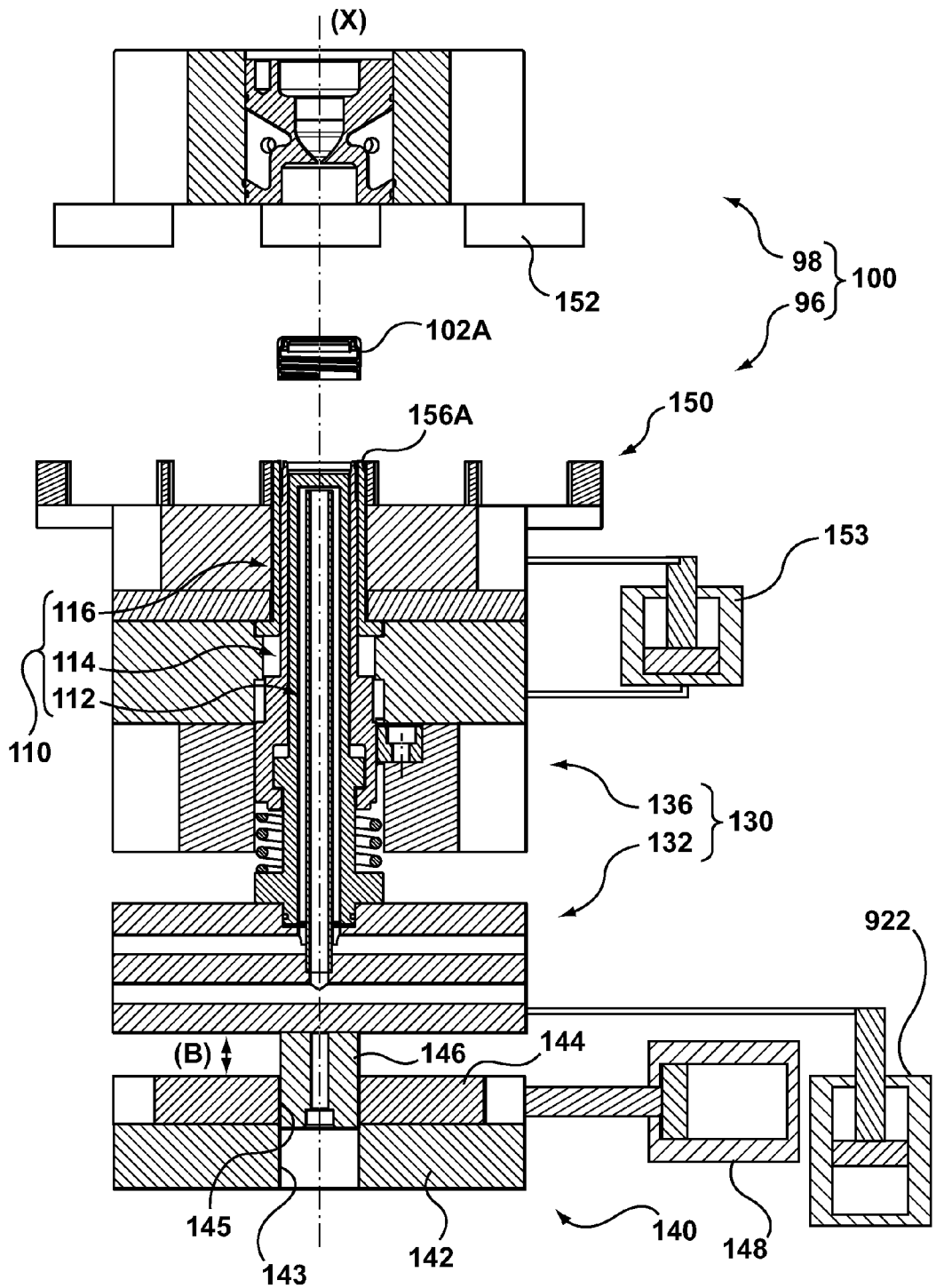
Figure 5E:
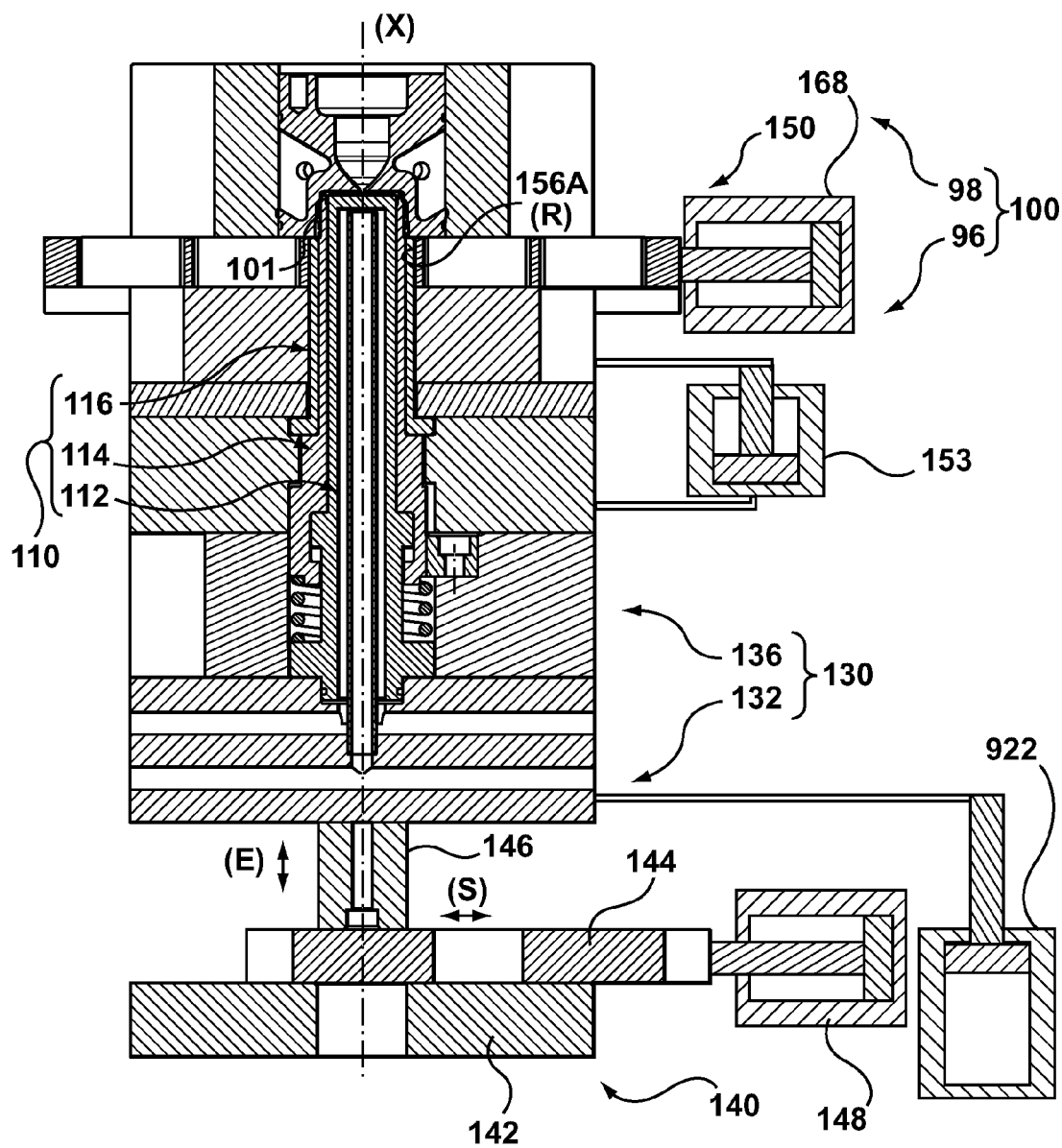
FIGS. 5E-5K depict a production molding process involving the injection mold, the molded article transfer device, and the in-mold shutter of FIG. 2A.
Figure 5F:
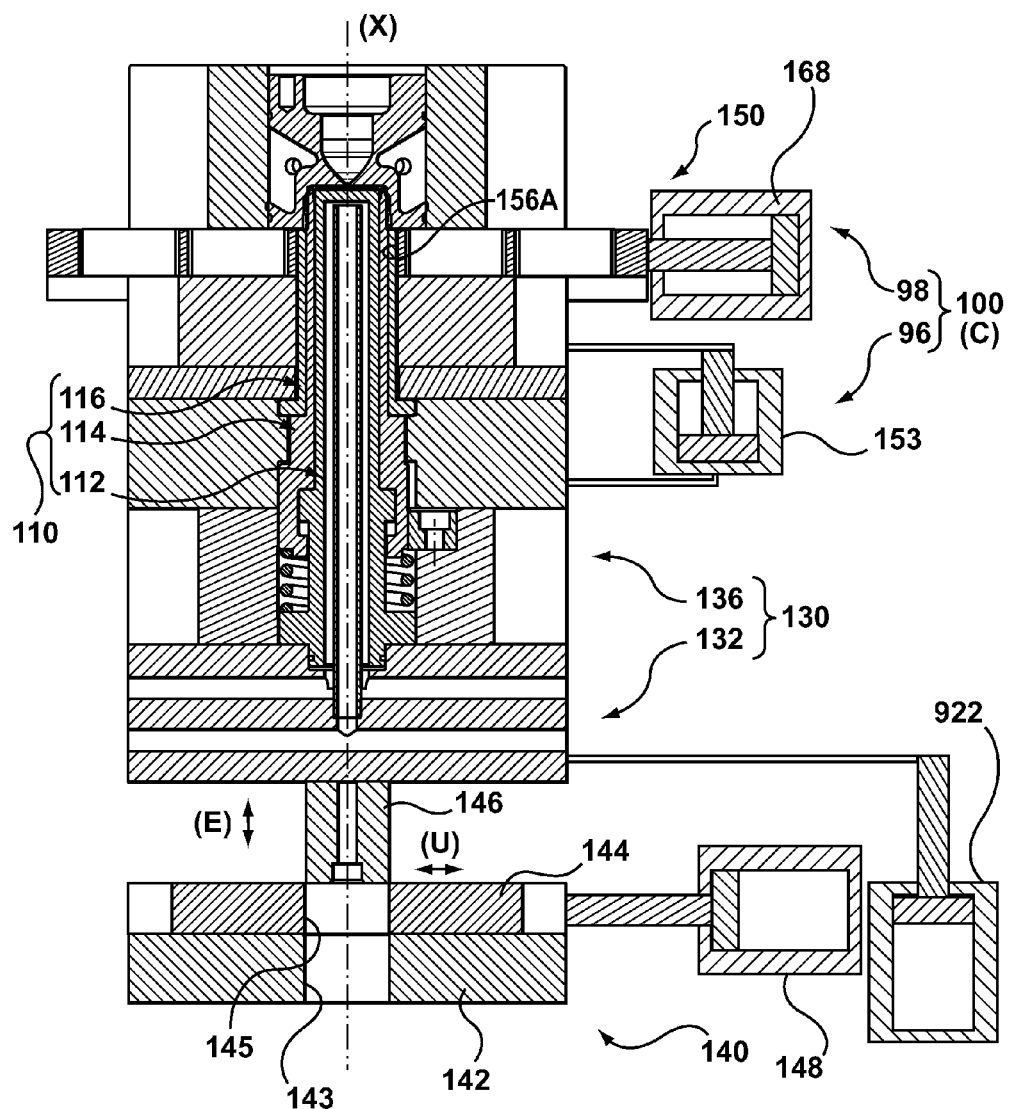
Figure 5G:
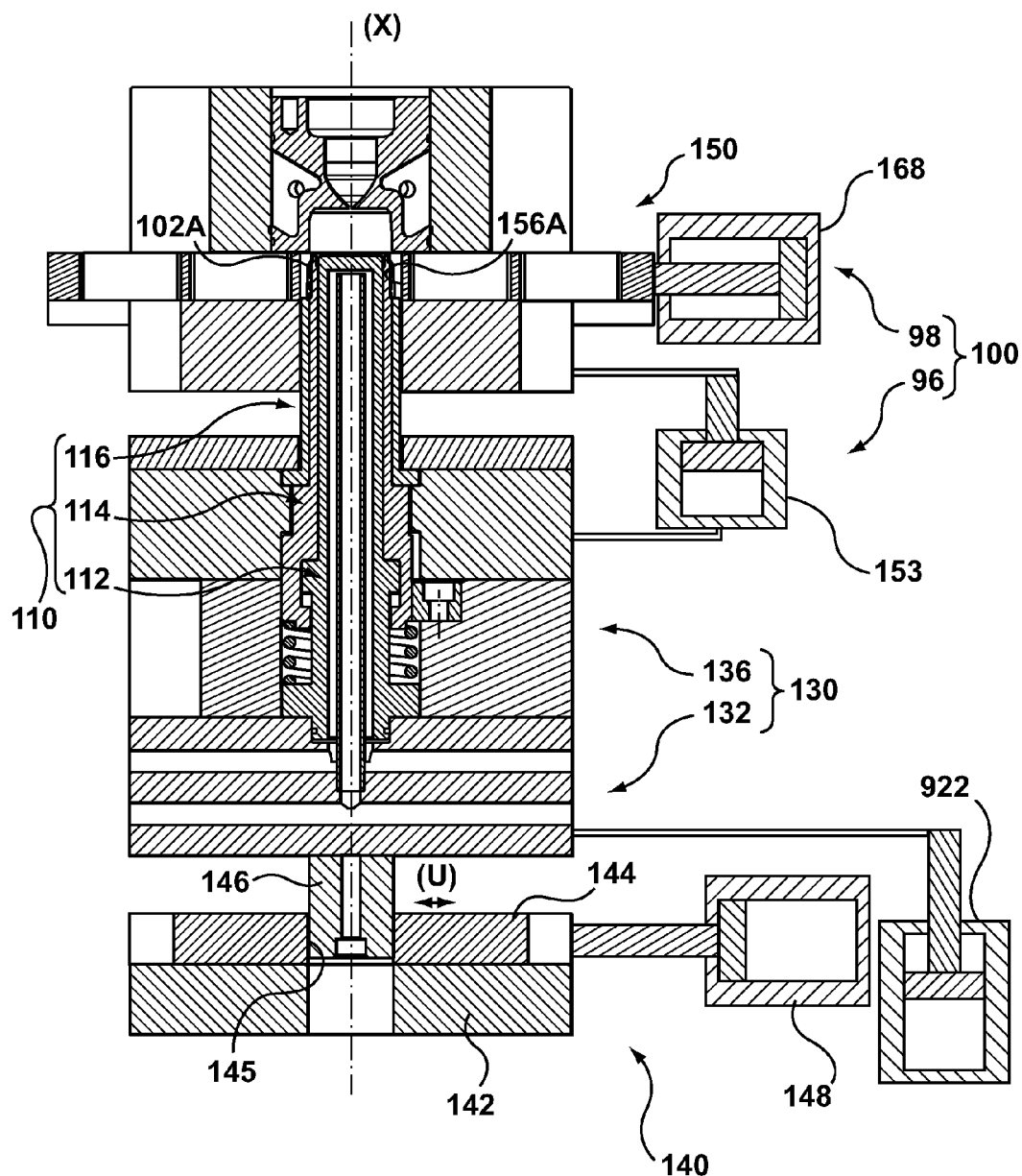
Figure 5H:
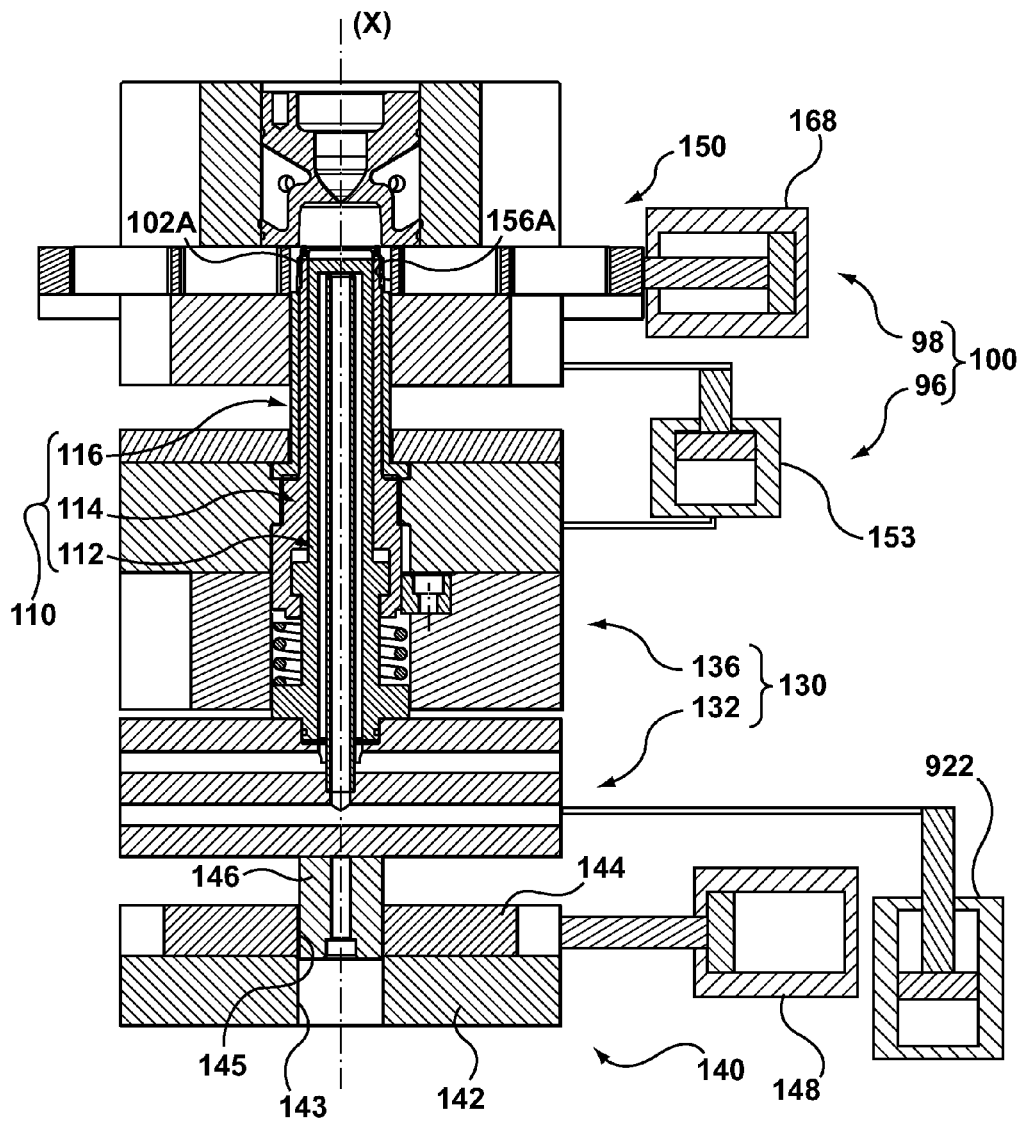
Figure 5I:
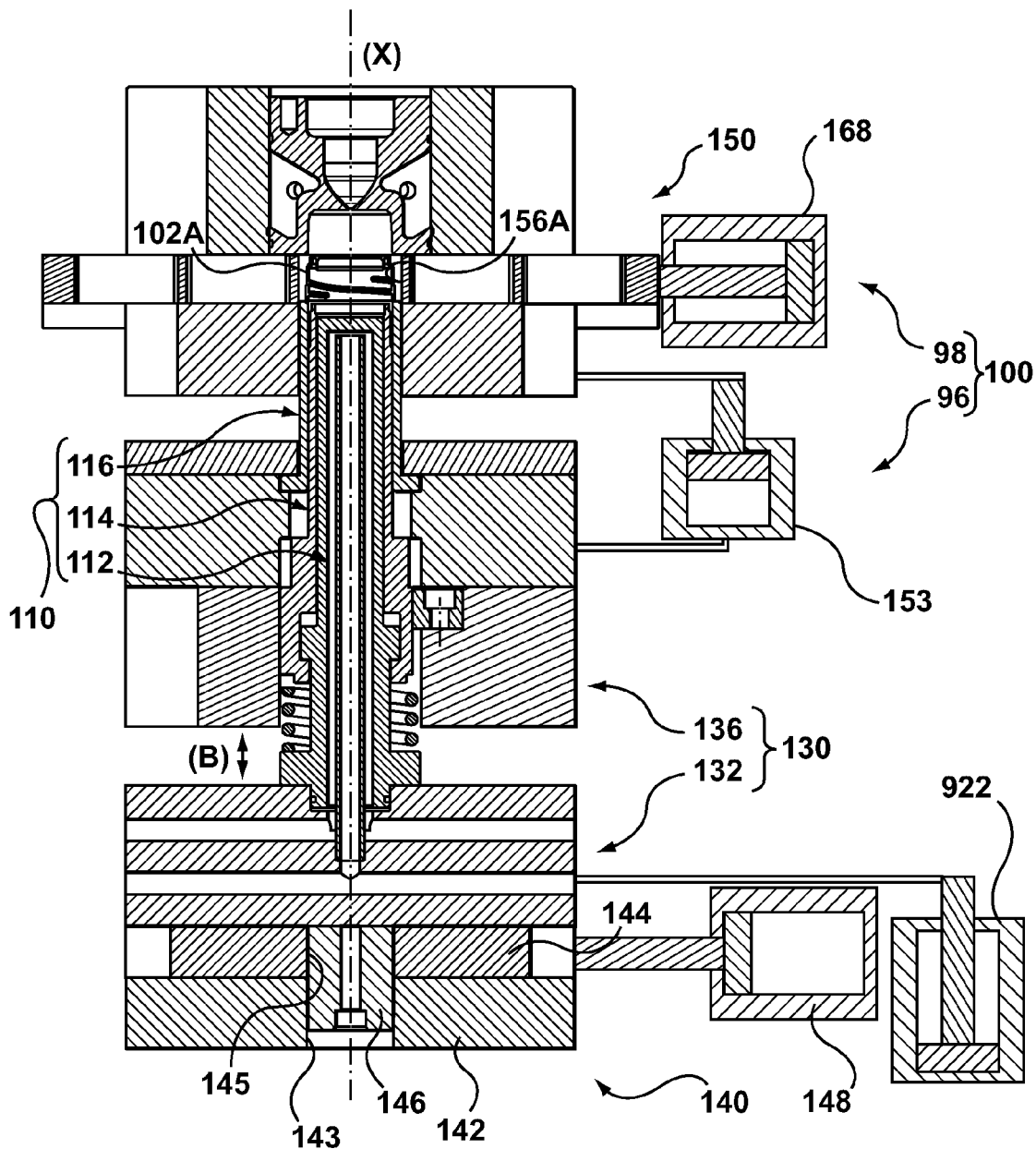

The shutter member 144 further defines a first clearance aperture 145 that is configured to accommodate the link member 146 being arranged therein, in use, with the shutter member 144 being positioned in the open position U (FIG. 5B or 5F) and with the movement of the first mold shoe 130, along the mold-stroke axis X, towards a retracted position B (FIG. 5D or 5I). Depending on the required stroke of the first mold shoe 130, the first clearance aperture 145 may be structured to extend, as shown, through the shutter member 144. Furthermore, the support base 142 may also define a second clearance aperture 143 that is aligned, in use, with the first clearance aperture 145, with positioning of the shutter member 144 into the open position U. As such, the second clearance aperture 143 is configured to accommodate the link member 146 being arranged therein, in use, with the shutter member 144 being positioned in the open position U and with the movement of the first mold shoe 130, along the mold-stroke axis X, towards the retracted position B, as shown in FIG. 5D or 5I.

The shape and size of the link member 146 in relation to those of the first clearance aperture 145 and the second clearance aperture 143 is not particularly limited so long as the link member 146 is arrangeable therethrough. In the present non-limiting example, the link member 146 has a cylindrical body, and wherein the first clearance aperture 145 and the second clearance aperture 143 are provided as complementary cylindrical bores.

As mentioned previously, the first core retainer 132 and the stripper retainer 136 are slidably connected together to accommodate the relative movement thereof, in use, along the mold-stroke axis X. Furthermore, the first core retainer 132 and the stripper retainer 136 are also slidably connected to the in-mold shutter 140. As such, and as shown with reference to FIG. 5A, the in-mold shutter 140 further includes a guide member 141 with which to guide the members of the first mold shoe 130 along the mold-stroke axis X. More particularly, the guide member 141 may include one or more leader pins, or the like, that are fixed to the support base 142, wherein the guide member 141 is slidably received within a bushing 149 that is arranged in each of the first core retainer 132 and the stripper retainer 136.

Various other alternative non-limiting embodiments of the injection mold 100 including the in-mold shutter 140 are contemplated, although not shown. For example, the in-mold shutter 140 may be associated with the second mold half 98 instead of the first mold half 96, and as such cooperates, in use, with the stationary platen 914 (FIG. 1). As a further example, the association of the shutter member 144 and the link member 146 may be interchanged, wherein the shutter member 144 is associated with the first mold shoe 130, and the link member 146 is associated with the moving platen 912. More generally, within the various other alternative non-limiting embodiments of the injection mold 100 one of the shutter member 144 and the link member 146 is associated, in use, with one of the moving platen 912 and the stationary platen 914 of the injection molding system 900, and wherein a remaining one of the shutter member 144 and the link member 146 is associated, in use, with the first mold shoe 130.

As previously mentioned, the injection mold 100 also includes the molded article transfer device 150. As shown with reference to FIGS. 2A, 2B, 3, 4, and 5A, the molded article transfer device 150 broadly includes a shuttle 154 that is slidably arranged, in use, within the injection mold 100. The shuttle 154 defining a first aperture 156A, at least in part, that alternately accommodates: i) the first mold stack 106A arranged therein, as shown in FIG. 5A; and ii) the first molded article 102A received therein, as shown in FIG. 5I, wherein the first molded article 102A being transferable, in use, within the first aperture 156A with shuttling movement of the shuttle 154.

Figure 3:
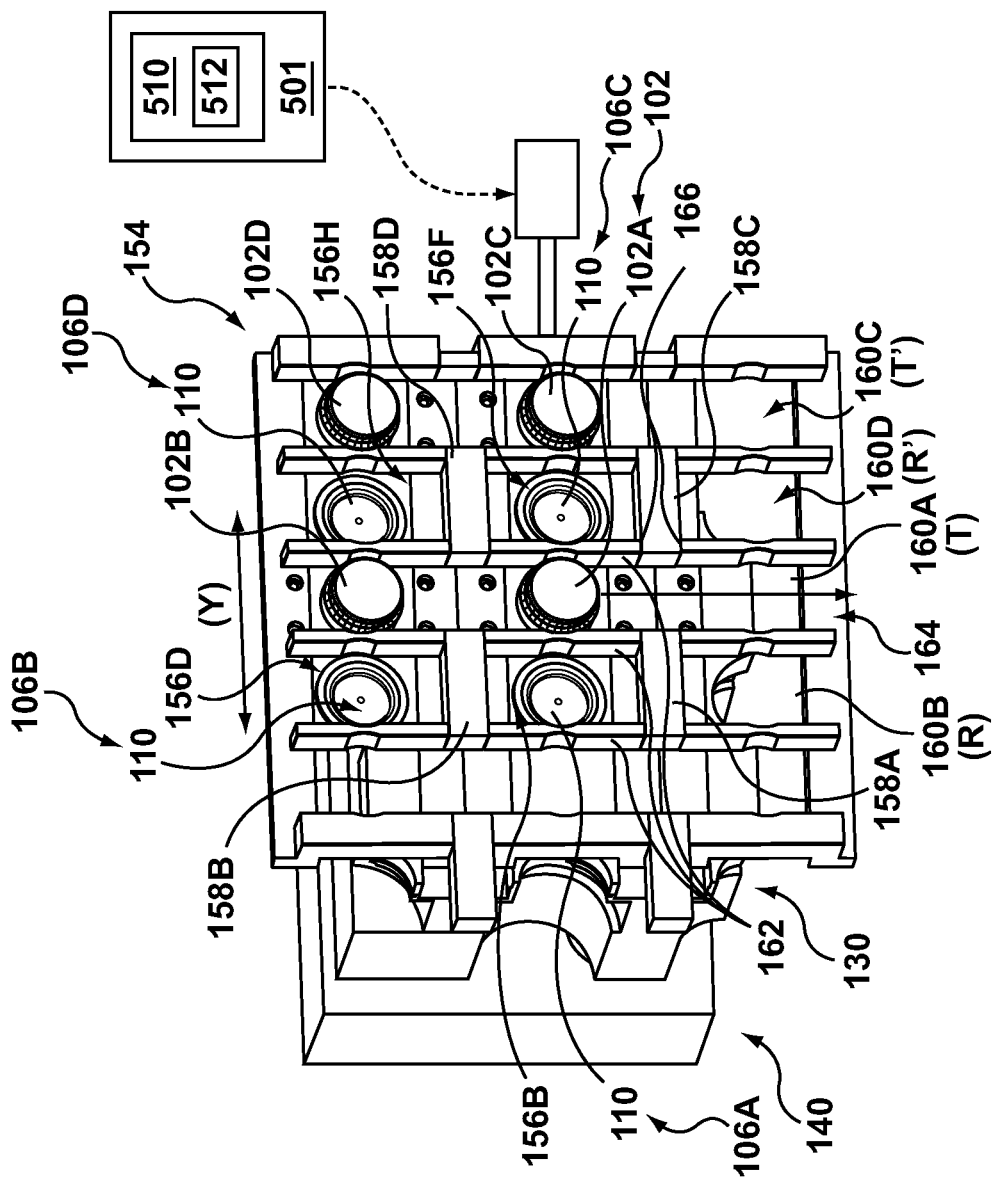
FIG. 3 depicts another perspective view of the portion of the molded article transfer device of FIG. 2A.
Figure 4:
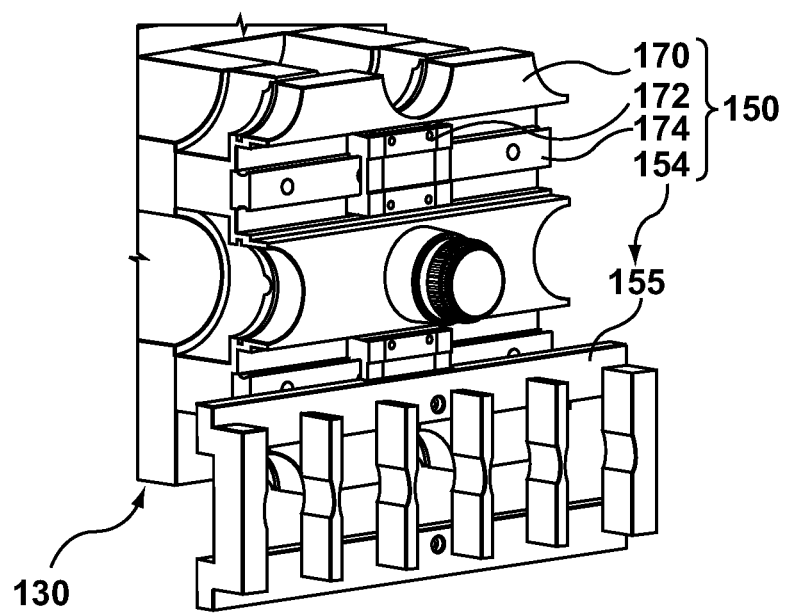
FIG. 4 depicts a further perspective view of the portion of the molded article transfer device of FIG. 2A in a partially assembled state.

More particularly, the shuttle 154 is slidably arranged between the first mold shoe 130 and the second mold shoe 131 of the injection mold 100 to accommodate the shuttling movement therebetween, in use, along a shuttling axis Y (FIG. 3) that is generally perpendicular to the mold-stroke axis X (FIG. 5A). As shown with reference to FIG. 5A, the first aperture 156A is configured to accommodate, when positioned in a first receiving position R, the first stack portion 110 of the first mold stack 106A being retractably arranged therein during molding, in use, of the first molded article 102A (FIG. 5B). As shown with reference to FIG. 5I, the first aperture 156A is further configured to receive, while still positioned in the first receiving position R, the first molded article 102A therein with retraction of the first stack portion 110 therefrom and with ejection thereof from the first stack portion 110. Thereafter, the first molded article 102A is transferred, in use, within the first aperture 156A, with the shuttling movement of the shuttle 154 from the first receiving position R to a first transfer position T (FIG. 3). To provide for the shuttling movements of the shuttle 154 the molded article transfer device 150 is further provided with a shuttle actuator 168 that is connected to the shuttle 154, the shuttle actuator 168 being operable, in use, to drive the shuttling movement of the shuttle 154.

In this arrangement the shuttle 154 is slidably arranged to accommodate the shuttling movement thereof with the first mold half 96 and the second mold half 98 of the injection mold 100 being positioned in a mold closed configuration C (FIG. 5A). That is, the first mold half 96 and the second mold half 98 of the injection mold 100 need not be rearranged into a mold open configuration O (FIG. 5B) in order to accommodate the shuttling movement of the shuttle 154. As such, the molded article transfer device 150 further includes a base plate 170 upon which the shuttle 154 is slidably connected for the shuttling movement thereof, in use, along the shuttling axis Y. The base plate 170 is associated, as shown in FIG. 5A, with the first mold half 96 of the injection mold 100. The manner in which the shuttle 154 is slidably connected to the base plate 170 is not particularly limited. For example, in the present non-limiting embodiment the shuttle 154 is slidably connected to a face of the base plate 170 using a linear bearing arrangement. More particularly, for ease of manufacture, service, and assembly, the shuttle 154 may be provided as a plurality of interconnected shuttle modules 155, as shown with reference to FIG. 2A, each of which is connected to a bearing block 172, as shown with reference to FIG. 4, that is in turn slidably connected to a linear race 174 that is mounted to the base plate 170.

As previously mentioned, the base plate 170 is associated, as shown in FIG. 5A, with the first mold half 96 of the injection mold 100. As such, the in-mold shutter 140 is further provided with an ejector box 147 with which to frame the first mold shoe 130 and otherwise couple, in use, the base plate 170 of the molded article transfer device 150 with the moving platen 912 of the injection molding system 900. More particularly, a fastener 192 connects the base plate 170 to a top of the ejector box 147 and another fastener 192 connects the support base 142 of the in-mold shutter 140 to a bottom of the ejector box 147, recalling that the support base 142 is fixedly connected, in use, by a fastener 192, or the like, to the moving platen 912. Furthermore, the ejector box 147 defines a space 151 within which the first mold shoe 130 may be moved, in use, along the mold-stroke axis X, to provide for positioning of the members of the mold stacks. As previously mentioned, the movement of the first mold shoe 130, along the mold-stroke axis X, may be driven, at least in part, by the ejector actuator 922 of the mold clamping assembly 996. More particularly, the ejector actuator 922 is shown to be connected to the first core retainer 132 for a repositioning thereof. Furthermore, and as shown in FIG. 5B, the injection mold 100 further includes a stripper actuator 153 with which to connect the molded article transfer device 150 with the stripper retainer 136, the stripper actuator 153 being operable, in use, to drive the relative movement of the stripper retainer 136 along the mold-stroke axis X.

Figure 2:
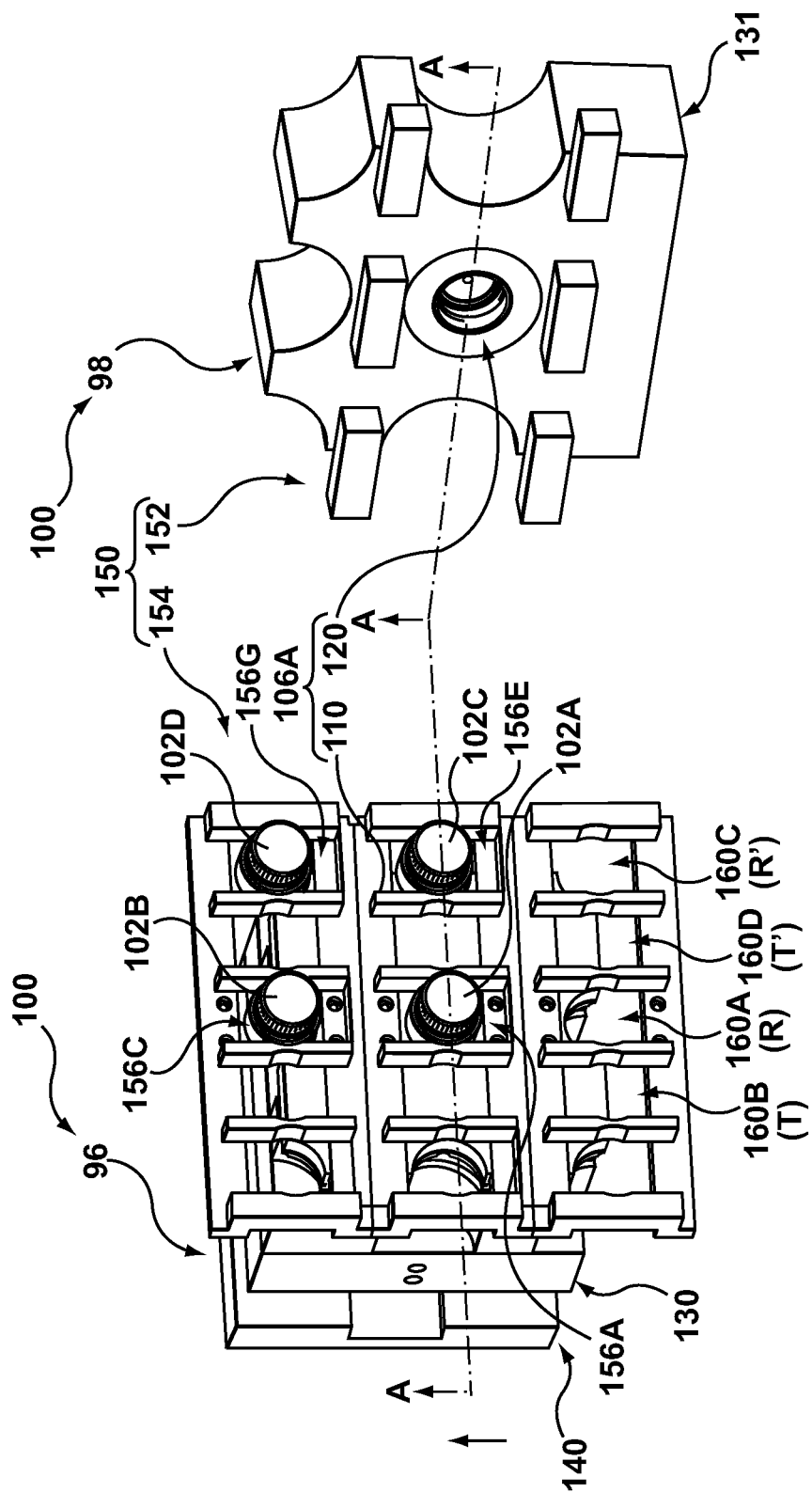
FIG. 2A depicts a perspective view of a portion of a first mold half of the injection mold of FIG. 1 and of portions of non-limiting embodiments of a molded article transfer device and of an in-mold shutter that are associated therewith.
FIG. 2B depicts a perspective view of a portion of a second mold half of the injection mold of FIG. 1 and of a further portion of the molded article transfer device of FIG. 2A that is associated therewith.

As shown with reference to FIGS. 2B and 5A, the molded article transfer device 150 further includes a first barricade 158A that is associated the second mold half 98. The first barricade 158A is configured to cooperate with the shuttle 154, as shown in FIG. 5A, to further define the first aperture 156A when positioned in the first receiving position R.

Returning to the description of the non-limiting embodiment, and with reference to FIG. 2A, it is shown that the shuttle 154 further defines a first channel 160A. The first channel 160A and the first barricade 158A are configured to cooperate, in use, to define the first aperture 156A with the first barricade 158A being positioned, by the shuttling movement of the shuttle 154, within the first channel 160A. The foregoing arrangement is not clearly shown in the figures but may otherwise be appreciated with reference to FIG. 3 wherein a second channel 160B and the first barricade 158A are configured to cooperate to define a second aperture 156B with the first barricade 158A being positioned within the second channel 160B. With positioning, in use, of the first channel 160A into the first receiving position R, as shown in FIG. 2A, by the shuttling movement of the shuttle 154, the first channel 160A is positioned to accommodate the first stack portion 110, 210, 310 being retractably arranged therein during molding of the first molded article 102A.

With reference to FIG. 3, it may be appreciated that the first channel 160A is further configured to accommodate the first molded article 102A passing therealong, towards an exit 164 thereof, with positioning, in use, of the first channel 160A into the first transfer position T, by the shuttling movement of the shuttle 154, wherein the first channel 160A is positioned beside the first stack portion 110, 210, 310 and the first barricade 158A.

As previously mentioned, the shuttle 154 further defines a second channel 160B. The second channel 160B is adjacent to, and generally parallel with, the first channel 160A, wherein with one of the first channel 160A and the second channel 160B being positioned in the first receiving position R a remaining one of the first channel 160A and the second channel 160B is positioned in the first transfer position T. The foregoing arrangement may be appreciated by contrasting FIGS. 2A and 3, wherein the shuttle 154 has undergone a shuttling movement, and that in FIG. 2A the first channel 160A is registered in the first receiving position R and the second channel 160B is in the first transfer position T, whereas in FIG. 3 the situation is reversed in that the first channel 160A is in the first transfer position T and the second channel 160B is in the first receiving position R.

As shown in FIG. 3, the second channel 160B and the first barricade 158A are configured to cooperate, in use, to define the second aperture 156B with the first barricade 158A being positioned within the second channel 160B, with positioning, in use, of the second channel 160B into the first receiving position R, by the shuttling movement of the shuttle 154, wherein the second channel 160B is positioned to accommodate the first stack portion 110 being retractably arranged therein during molding of another of the first molded article 102A. Likewise, the second channel 160B is further configured to accommodate the another of the first molded article 102A passing therealong, not shown, towards the exit thereof, with positioning, in use, of the second channel 160B into the first transfer position T, as shown in FIG. 2A, by the shuttling movement of the shuttle 154, wherein the second channel 160B is positioned beside the first stack portion 110 and the first barricade 158A.

As may be appreciated with reference to FIGS. 2A and 3, the first channel 160A and the second channel 160B each include a straight portion within which the first aperture 156A and the second aperture 156B are defined, respectively. As such, the first channel 160A and the second channel 160B are defined between cooperating pairs of guide bars 162 that are associated with the shuttle 154. The pairs of guide bars 162 define gaps 166 therein through which the first barricade 158A is slid, in use, with relative movement of the shuttle 154 with respect to the first barricade 158A.

As may be appreciated with reference to FIG. 2A, the injection mold 100 includes several columns of mold stacks with which to simultaneously mold a plurality of molded articles. Of note, while the portion of the second mold half 98 shown in FIG. 2A depicts only the second stack portion 120 of the first mold stack 106A, the second mold half 98 would, in its entirety, further include other second stack portions, not shown, with which to cooperate with the other mold stacks.

As shown with reference to FIGS. 2A and 3, the columns of mold stacks includes a first column of mold stacks, within which is the first mold stack 106A with which to mold the first molded article 102A and a second mold stack 106B with which to mold a second molded article 102B. The molded article transfer device 150 further comprises a second barricade 158B that is associated with the second mold half 98. The first channel 160A and the second barricade 158B are configured to cooperate, in use, to define a third aperture 156C with the second barricade 158B being positioned within the first channel 160A, with positioning, in use, of the first channel 160A into the first receiving position R, by the shuttling movement of the shuttle 154, wherein the first channel 160A is positioned to accommodate the first stack portion 110 of the second mold stack 106B being retractably arranged therein during molding of the second molded article 102B. As shown with reference to FIG. 3, the first channel 160A is further configured to accommodate the second molded article 102B passing therealong, towards the exit 164 thereof, with positioning, in use, of the first channel 160A into the first transfer position T, by the shuttling movement of the shuttle 154, wherein the first channel 160A is positioned beside the first column of mold stacks, the first barricade 158A and the second barricade 158B. Likewise, as shown again with reference to FIG. 3, the second channel 160B and the second barricade 158B are configured to cooperate, in use, to define a fourth aperture 156D with the second barricade 158B being positioned within the second channel 160B, with positioning, in use, of the second channel 160B into the first receiving position R, by the shuttling movement of the shuttle 154, wherein the second channel 160B is positioned to accommodate the first stack portion 110 of the second mold stack 106B being retractably arranged therein during molding of another of the second molded article 102B (not shown). As shown with reference to FIG. 3, the second channel 160B is further configured to accommodate the another of the second molded article 102B (not shown) passing therealong, not shown, towards the exit 164 thereof, with positioning, in use, of the second channel 160B into the first transfer position T, by the shuttling movement of the shuttle 154, wherein the second channel 160B is positioned beside the first stack portion 110, 210, 310 of the first column of mold stacks, the first barricade 158A and the second barricade 158B.

Also shown with reference to FIGS. 2A and 3 is that the columns of mold stacks also includes a second column of mold stacks having a third mold stack 106C with which to mold a third molded article 102C and a fourth mold stack 106D with which to mold a fourth molded article 102D. As such, the molded article transfer device 150 further includes a third barricade 158C and a fourth barricade 158D that are associated with the second mold half 98. Furthermore, the shuttle 154 further defines a third channel 160C and a fourth channel 160D that are adjacent to, and generally parallel with, the first channel 160A and the second channel 160B, wherein with one of the third channel 160C and the fourth channel 160D being positioned in a second receiving position R' a remaining one of the third channel 160C and the fourth channel 160D is positioned in a second transfer position T'. As shown in FIG. 2A, the third channel 160C and the third barricade 158C are configured to cooperate, in use, to define a fifth aperture 156E with the third barricade 158C being positioned within the third channel 160C, with positioning, in use, of the third channel 160C into the second receiving position R', by the shuttling movement of the shuttle 154, wherein the third channel 160C is positioned to accommodate the first stack portion 110 of the third mold stack 106C being retractably arranged therein during molding of the third molded article 102C. Likewise, and as shown in FIG. 3, the fourth channel 160D and the third barricade 158C are configured to cooperate, in use, to define a sixth aperture 156F with the third barricade 158C being positioned within the fourth channel 160D, with positioning, in use, of the fourth channel 160D into the second receiving position R', by the shuttling movement of the shuttle 154, wherein the fourth channel 160D is positioned to accommodate the first stack portion 110, 210, 310 of the third mold stack 106C being retractably arranged therein during molding of another of the third molded article 102C (not shown).

Likewise, and as shown in FIG. 2A, the third channel 160C and the fourth barricade 158D are configured to cooperate, in use, to define a seventh aperture 156G with the fourth barricade 158D being positioned within the third channel 160C, with positioning, in use, of the third channel 160C into the second receiving position R', by the shuttling movement of the shuttle 154, wherein the third channel 160C is positioned to accommodate the first stack portion 110, 210, 310 of the fourth mold stack 106D being retractably arranged therein during molding of the fourth molded article 102D. Lastly, and as shown in FIG. 3, the fourth channel 160D and the fourth barricade 158D are configured to cooperate, in use, to define an eighth aperture 156H with the fourth barricade 158D being positioned within the fourth channel 160D, with positioning, in use, of the fourth channel 160D into the second receiving position R', by the shuttling movement of the shuttle 154, wherein the fourth channel 160D is positioned to accommodate the first stack portion 110, 210, 310 of the fourth mold stack 106D being retractably arranged therein during molding of another of the fourth molded article 102D (not shown). Furthermore, the third channel 160C and the fourth channel 160D are further configured to accommodate the third molded article 102C and the fourth molded article 102D, and alternately the another of the third molded article 102C and the another of the fourth molded article 102D, respectively, passing therealong, towards the exit 164 thereof, with sequential arranging, in use, of the third channel 160C and the fourth channel 160D into the second transfer position T', by the shuttling movement of the shuttle 154, wherein the third channel 160C and the fourth channel 160D are positioned beside the second column of mold stacks, the third barricade 158C and the fourth barricade 158D.

Thus, having just described the non-limiting embodiment of the injection mold 100, and prior to discussing the detailed operation of the foregoing, it is worth noting that a simple reconfiguration of the foregoing is possible, albeit not shown, wherein the base plate 170 is associated with the second mold half 98 of the injection mold 100, and as such the first barricade 158A, and the like, would instead be associated the first mold half 96.

The operation of the foregoing non-limiting embodiment of the injection mold 100 will now be described with reference to a start-up molding process, as shown in FIGS. 5A through 5D, and thereafter a production molding process, as shown in FIGS. 5E through 5J. Where reference is made to the operation of the first mold stack 106A the same operation applies to the remaining mold stacks in the injection mold 100 even though not specifically mentioned.

As the name implies, the start-up molding process would typically be executed, although not exclusively, when starting the injection mold 100. As generally known, the start-up of an injection mold often requires manual intervention by a molding system operator to clear short-shots (i.e. molded articles that are only partially molded), to remove molded articles that stubbornly resist ejection (e.g. typically due to an over cooling thereof), or to remove flash (i.e. molding material that has seeped outside of the molding cavity 101), and the like. Thus, during start-up it may be necessary to position the first mold half 96 and the second mold half 98, along the mold-stroke axis X, into the mold open configuration O, as shown in FIG. 5B, with relative repositioning of the moving platen 912 and the stationary platen 914, to provide ready access to each of the first stack portion 110 and the second stack portion 120.

The start-up molding process begins, as shown in FIG. 5A, with the injection mold 100 being positioned in the mold closed configuration C with the first mold shoe 130 being positioned, along the mold-stroke axis X, in an extended position E such that the first mold stack 106A is closed to define the molding cavity 101 therein. Furthermore, the shutter member 144 of the in-mold shutter 140 is in the shut position S, whereby the first mold shoe 130 is engaged with the moving platen 912. Accordingly, the injection mold 100 is configured for molding of the first molded article 102A. Thereafter, molding of the first molded article 102A (not shown) is performed with injection of molding material into the molding cavity 101.

The start-up molding process next includes, as shown with reference to FIG. 5B, opening of the first mold stack 106A with positioning of the first mold half 96 and the second mold half 98, along the mold-stroke axis X, into the mold open configuration O, with positioning of the moving platen 912 (FIG. 1) away from the stationary platen 914 (FIG. 1) through control of the platen-moving actuator 915 (FIG. 1). In so doing, the first molded article 102A is withdrawn with the first stack portion 110. With the opening of the injection mold 100 there is also an un-shuttering of the in-mold shutter 140 to disengage the first mold shoe 130 from the moving platen 912. The un-shuttering of the shutter member 144 includes shifting the shutter member 144 into the open position U, through control of the shutter actuator 148, wherein the shutter member 144 is disengaged from the link member 146.

The start-up molding process next includes, as shown with reference to FIG. 5C, stripping of a seal portion 103 of the first molded article 102A from where it was molded in between the inner core 112 and the outer core 114 with relative movement thereof. The foregoing involves holding the position of the stripper retainer 136 against the base plate 170, through control of the stripper actuator 153, to keep the stripper sleeve 116 that is fixed thereto in the stripper sleeve molding position, while at the same time retracting the first core retainer 132, along the mold-stroke axis X, through control of the ejector actuator 922, and thereby retract the inner core 112 that is retained thereto, a distance that is sufficient to strip the seal portion 103.

The start-up molding process next includes, as shown with reference to FIG. 5D, ejecting of the first molded article 102A from the first stack portion 110 with relative movement between the outer core 114 and the stripper sleeve 116, wherein the stripper sleeve 116 pushes the first molded article 102A off of the outer core 114. The foregoing involves holding the position of the stripper retainer 136 against the base plate 170, through control of the stripper actuator 153, to keep the stripper sleeve 116 that is fixed thereto in the stripper sleeve molding position, while at the same retracting the first core retainer 132, along the mold stroke axis X, into a retracted position B, through control of the ejector actuator 922, to retract the inner core 112 that is retained thereon a distance that is sufficient to further move the outer core 114 into stripping position by virtue of the inner core 112 having reached its rearward limit of travel relative to the outer core 114 as defined by the bayonet 113 in cooperation with the bayonet pocket 117.

The start-up molding process ends, as shown with reference to FIG. 5E, with closing of the first mold stack 106A with positioning of the first mold half 96 and the second mold half 98, along the mold-stroke axis X, into the mold closed configuration C, with positioning of the moving platen 912 towards the stationary platen 914 through control of the platen-moving actuator 915 (FIG. 1). The closing of the first mold stack 106A further includes extending the first core retainer 132, along the mold stroke axis X, into an extended position E, through control of the ejector actuator 922, to extend the inner core 112 that is retained thereon into an inner core molding position and in so doing push the outer core 114 into the outer core molding position by virtue of the inner core 112 having reached its forward limit of travel relative to the outer core 114, as defined by the bayonet 113 in cooperation with the bayonet pocket 117. With the closing of the injection mold 100 there is also a shuttering of the in-mold shutter 140 to engage the first mold shoe 130 to the moving platen 912 (FIG. 1). The shuttering of the shutter member 144 includes shifting the shutter member 144 into the shut position S, through control of the shutter actuator 148, wherein the shutter member 144 is once again engaged with the link member 146. The start-up molding process may be repeated many times, dependent on the operational status of the injection mold 100 (e.g. each of the plurality of molding stacks molding molded articles of acceptable quality), prior to execution of the production molding process.

The production molding process for the injection mold 100 will be discussed next. As the name implies, the production molding process would typically be executed, although not exclusively, after completion of the start-up molding process. The production molding process is different from the start-up molding process in that it further involves, amongst other things, operating steps relating to the use of the molded article transfer device 150, and furthermore does not include the steps of opening and closing of the injection mold 100. That is, the production molding process does not require re-arranging of the first mold half 96 and the second mold half 98 between the mold open configuration O and the mold closed configuration C, and thus the relative movement of the moving platen 912 (FIG. 1) and the stationary platen 914 (FIG. 1). A technical effect of the foregoing may include, amongst others, a shortening of the molding cycle time, wherein a component of time that was formerly contributed by the certain operations of the mold clamping assembly 996 have been removed. That is, the production cycle no longer involves waiting for the clamp shutter 920 to be successively (i.e. with each molding cycle) un-shuttered and re-shuttered, and nor does it require waiting for the movements, to and fro, of the moving platen 912 (FIG. 1). That being said, the rearranging of the first mold half 96 and the second mold half 98 is not precluded.

The production molding process begins, as shown in FIG. 5E, with the injection mold 100 being positioned in the mold closed configuration C with the first mold shoe 130 being positioned, along the mold-stroke axis X, in an extended position E such that the first mold stack 106A is closed to define the molding cavity 101 therein. In so doing, the first mold stack 106A is arranged within the first aperture 156A that is defined by the shuttle 154 of the molded article transfer device 150, the first aperture 154A being positioned in the first receiving position R. Furthermore, the shutter member 144 of the in-mold shutter 140 is in the shut position S, whereby the first mold shoe 130 is engaged with the moving platen 912 (FIG. 1). Accordingly, the injection mold 100 is configured for molding of the first molded article 102A. Thereafter, molding of the first molded article 102A (not shown) is performed with injection of molding material into the molding cavity 101.

The production molding process next includes, as shown with reference to FIG. 5F, the un-shuttering of the in-mold shutter 140 to disengaged the first mold shoe 130 from the moving platen 912 (FIG. 1). The un-shuttering of the shutter member 144 includes shifting the shutter member 144 into the open position U, through control of the shutter actuator 148, wherein the shutter member 144 is disengaged from the link member 146.

The production molding process next includes, as shown with reference to FIG. 5G, opening of the first mold stack 106A with retracting the first stack portion 110, along the mold-stroke axis X, to position the first molded article 102A that is arranged thereon in the first aperture 156A. This involves retracting the stripper retainer 136 and the first core retainer 132, in tandem, along the mold-stroke axis X, and thus the retracting of the stripper sleeve 116 and the inner core 112 that are retained thereto, respectively, wherein the outer core 114 retracts with the inner core 112 and the stripper sleeve 116 by virtue being linked together therewith by the first molded article 102A. The retracting of the stripper retainer 136 and the first core retainer 132 is provided through control of the stripper actuator 153 and the ejector actuator 922, respectively.

The production molding process next includes, as shown with reference to FIG. 5H, a first stage of arranging the first stack portion 110 to eject the first molded article 102A into the first aperture 156A of the shuttle 154, and more particularly the stripping of the seal portion 103 of the first molded article 102A from where it was molded in between the inner core 112 and the outer core 114 with relative movement thereof. The foregoing involves holding the position of the stripper retainer 136, through control of the stripper actuator 153 (which in this case is made quite simple given that the stripper actuator 153 has reached its rearward limit of travel), to keep the stripper sleeve 116 that is fixed thereto immobile, whereby the first molded article 102A is held in the first aperture 156A. The foregoing further involves retracting the first core retainer 132, through control of the ejector actuator 922, to retract the inner core 112 that is retained thereon, along the mold stroke axis X, a distance, relative to the outer core 114 which is kept immobile by virtue of being arranged within the first molded article 102A, that is sufficient to strip the seal portion 103.

The production molding process next includes, as shown with reference to FIG. 5I, a final stage of arranging the first stack portion 110 to eject the first molded article 102A into the first aperture 156A of the shuttle 154, and furthermore retracting of the first stack portion 110 from the first aperture 156A. The foregoing involves continuing to hold the position of the stripper retainer 136, through control of the stripper actuator 153, to keep the stripper sleeve 116 that is fixed thereto immobile, whereby the first molded article 102A is held in the first aperture 156A. The foregoing further involves retracting the first core retainer 132, along the mold stroke axis X, into the retracted position B, through control of the ejector actuator 922, to retract the inner core 112 that is retained thereon a distance that is sufficient to further move the outer core 114 into stripping position by virtue of the inner core 112 having reached its rearward limit of travel relative to the outer core 114 as defined by the bayonet 113 in cooperation with the bayonet pocket 117. The first molded article 102A is stripped from the outer core 114 as it is held in the first aperture 156A, through supporting contact with a top of the stripper sleeve 116, and the outer core 114 is retracted therefrom with its retraction to the stripping position.

Figure 5J:
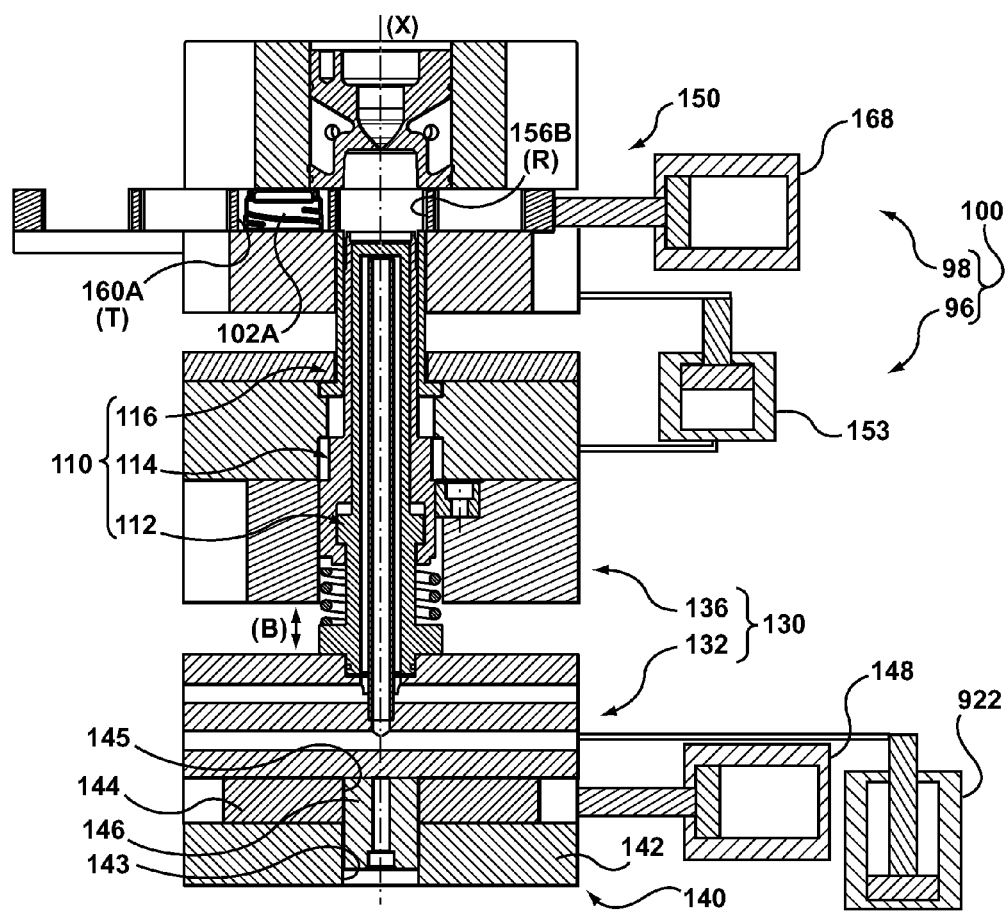

The production molding process next includes, as shown with reference to FIG. 5J, shuttling of the shuttle 154 to transfer the first molded article 102A within the first aperture 156A. The foregoing involves shuttling movement of the shuttle 154 between the first mold half 96 and the second mold half 98 of the injection mold 100, along the shuttling axis Y (FIG. 3), through control of the shuttle actuator 168, wherein the first channel 160A (i.e. the movable part of the first aperture 156A), and with it the first molded article 102A, is moved from the first receiving position R (FIG. 5E) to the first transfer position T.

Figure 5K:
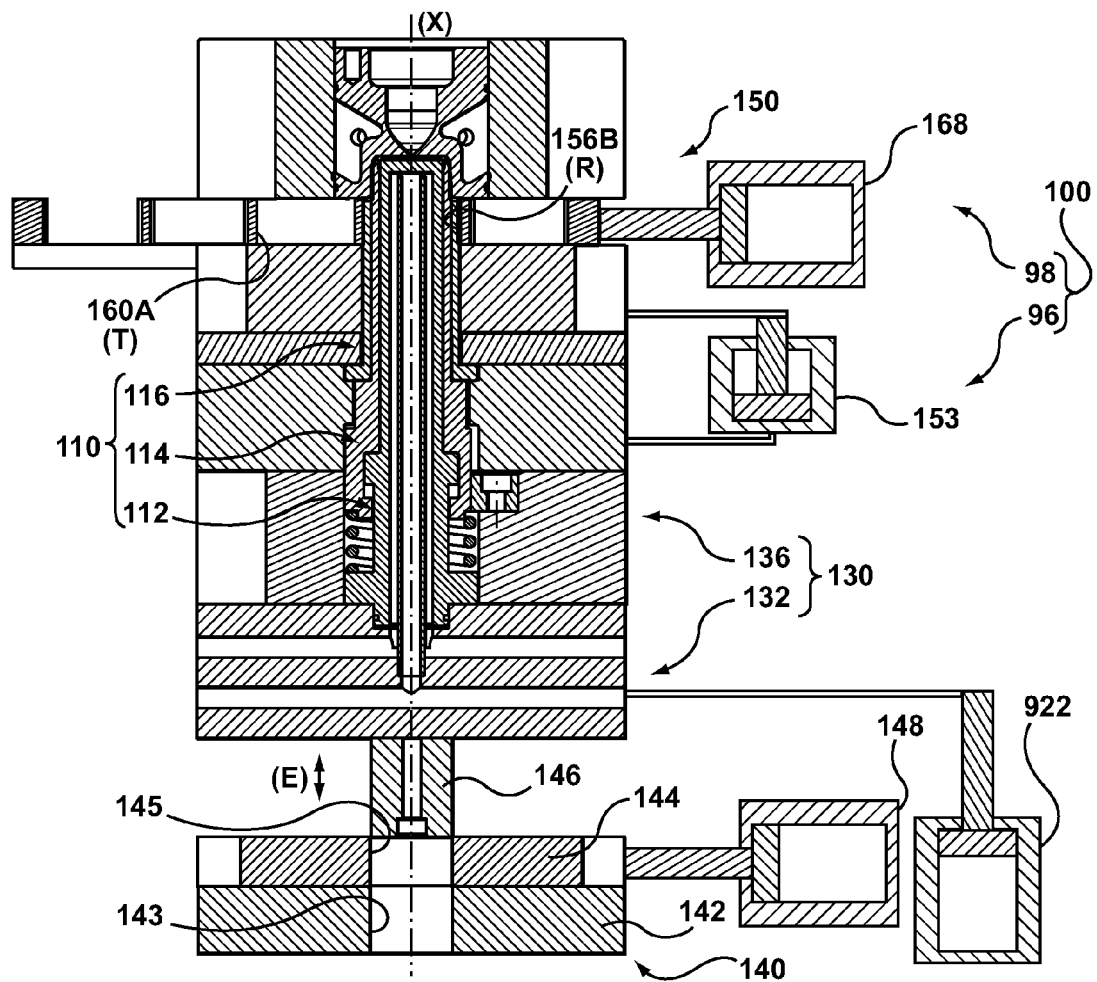

The production molding process ends, as shown with reference to FIG. 5K, with the passing of the first molded article 102A along the first channel 160A towards the exit 164 (FIG. 3) thereof (shown only by virtue of the disappearance of the first molded article 102A from the first channel 160A), and closing of the first mold stack 106A. The closing of the first mold stack 106A involves rearranging the first mold shoe 130 into the extended position E with extension of the first core retainer 132, along the mold stroke axis X, through control of the ejector actuator 922, to extend the inner core 112 that is retained thereon into the inner core molding position and in so doing push the outer core 114 into the outer core molding position by virtue of the inner core 112 having reached its forward limit of travel relative to the outer core 114, as defined by the bayonet 113 in cooperation with the bayonet pocket 117. In so doing, the first stack portion 110 is arranged within the second aperture 156B that is defined by the shuttle 154 of the molded article transfer device 150, the second aperture 154B being positioned in the first receiving position R. While not shown, prior to molding of the another of the first molded article 102A, there is a further requirement for shuttering of the in-mold shutter 140 to engage the first mold shoe 130 to the moving platen 912 (FIG. 1).

In view of the foregoing, those persons of skill in the art would undoubtedly recognize alternative non-limiting embodiments of the injection mold including one or both of the molded article transfer device 150 and/or an in-mold shutter 140. One such example of an alternative non-limiting embodiment may be appreciated with reference to the injection mold 200 shown in FIG. 6A. The injection mold 200 is structured similarly to the injection mold 100 of FIG. 5A, and as such only the differences of construction and operation thereof will be described in detail in the description that follows.

The injection mold 200 includes an alternative non-limiting embodiment of a first mold half 196, and the second mold half 98 described previously.

The first mold half 196 of the injection mold 200 includes the same in-mold shutter 140 and molded article transfer device 150 that were described previously, between which an alternative non-limiting embodiment of a first mold shoe 230 is arranged.

The first mold shoe 230 is structured to have a first stack portion 210 of a first mold stack 206A connected thereto. Much the same as the first stack portion 110 described previously, the first stack portion 210 of the first mold stack 206A includes an inner core 212, an outer core 214, and the stripper sleeve 116, as described previously, that cooperate, in use, with the cavity insert 122 of the second stack portion 120 to define the molding cavity 101. As such, the outer core 214 is slidably arranged around the inner core 212 to accommodate, in use, relative movement thereof along the mold-stroke axis X. Likewise, the stripper sleeve 116 is slidably arranged around the outer core 214 to accommodate, in use, the relative movement thereof along the mold-stroke axis X.

Figure 6A:
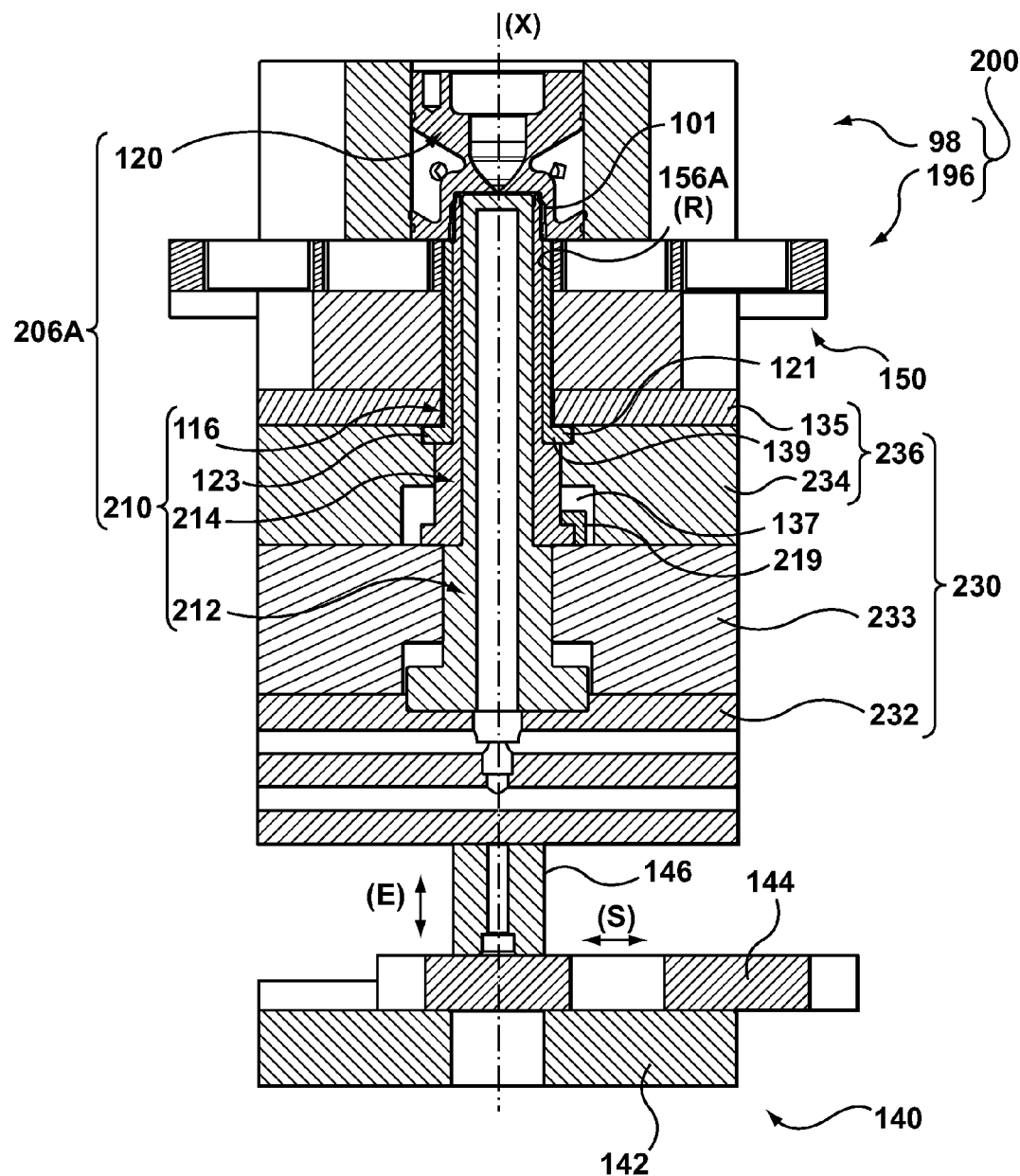
FIGS. 6A-6G depict an alternative production molding process involving an alternative non-limiting embodiment of the injection mold, and the molded article transfer device and the in-mold shutter of FIG. 2A.

Much like the first mold shoe 130 described previously, the first mold shoe 230 includes a first core retainer 232 and a stripper retainer 236 that are slidably connected together to accommodate the relative movement thereof, in use, along the mold-stroke axis X, wherein the inner core 212 is connected to the first core retainer 232, and the stripper sleeve 116 is connected to the stripper retainer 236. The stripper sleeve 116 is fixedly arranged in a passageway 237 that is defined in the stripper retainer 236. More particularly, the stripper retainer 236 includes a base plate 234 and the top plate 135, as described previously, that are fastened together, in use, with the passageway 237 being defined therethrough, wherein the flange portion 123 of the stripper sleeve 116 is retained between the base plate 234 and the top plate 135. The outer core 214 is slidably arranged within the passageway 237 to accommodate relative movement between the outer core 214 and the stripper sleeve 116, in use, along the mold-stroke axis X, with the movement of the outer core 214, from an outer core molding position (FIG. 6A) to a stripping position (FIG. 6E).

The first mold shoe 230 further includes a second core retainer 233. The second core retainer 233 is slidably connected between the first core retainer 232 and the stripper retainer 236 to accommodate the relative movement thereto, in use, along the mold-stroke axis X. The outer core 214 is connected to the second core retainer 233 for movement therewith.

Figure 6B:
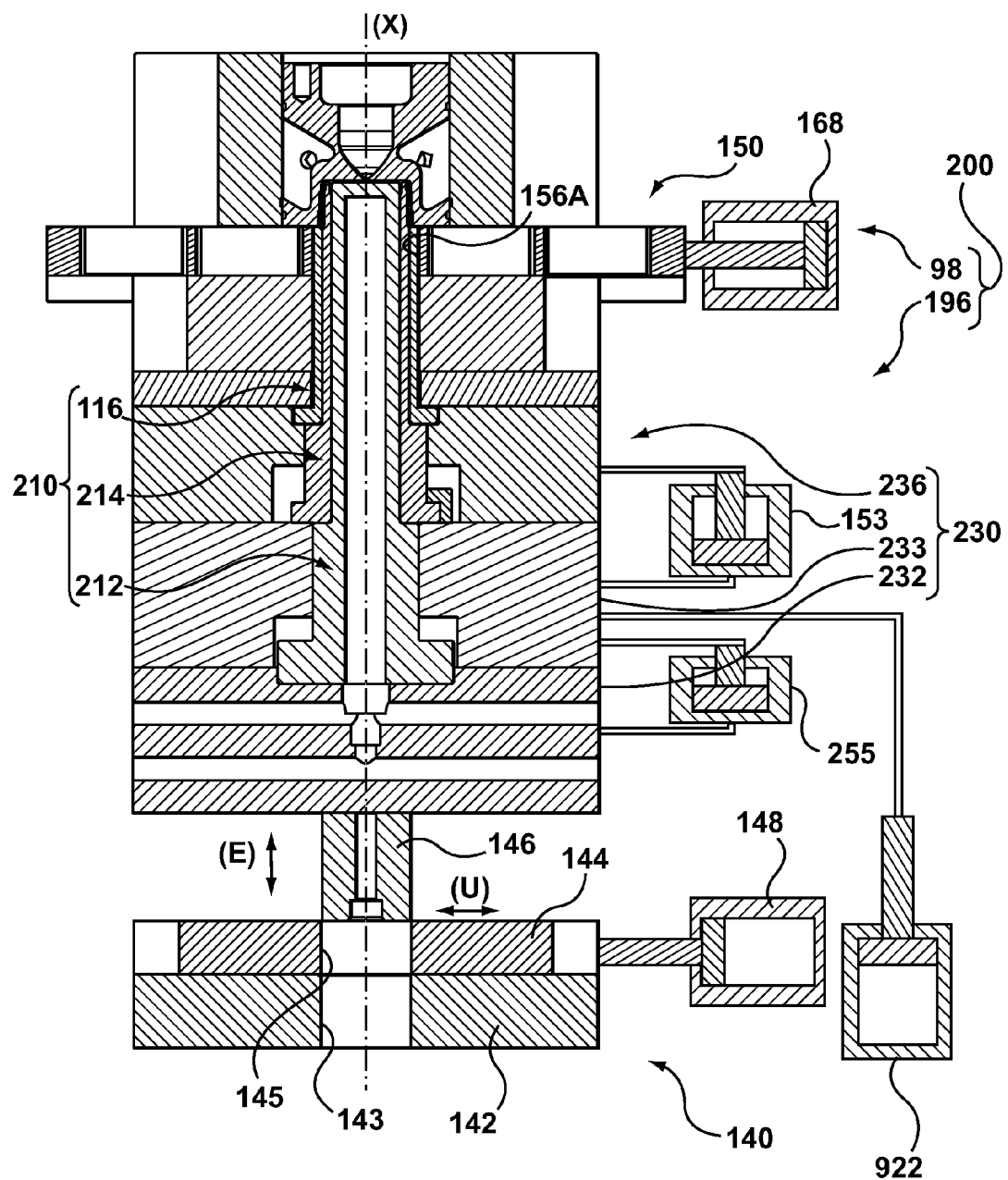

With reference to FIG. 6B, the first mold shoe 230 also includes the stripper actuator 153, as described previously, except that in this non-limiting embodiment it serves to connect the stripper retainer 236 with the second core retainer 233, the stripper actuator 153 being operable, in use, to drive the relative movement thereof along the mold-stroke axis X. Furthermore, the first mold shoe 230 includes a core actuator 255 that connects the first core retainer 232 and the second core retainer 233, the core actuator 255 being operable, in use, to drive the relative movement thereof along the mold-stroke axis X. Lastly, the second core retainer 233 is shown to be connected, in use, with the ejector actuator 922 of the mold clamping assembly 996 (FIG. 1) for movement thereof, in use, along the mold-stroke axis X.

The start-up and production molding processes for the injection mold 200 are similar to those described previously. That being said, the production molding process for the injection mold 200 will be further described owing to the differences in execution of the various actuators that are connected to the first mold shoe 230.

The production molding process begins, as shown in FIG. 6A, with the injection mold 200 being positioned in the mold closed configuration C with the first mold shoe 230 being positioned, along the mold-stroke axis X, in an extended position E such that the first mold stack 206A is closed to define the molding cavity 101 therein. In so doing, the first mold stack 206A is arranged within the first aperture 156A that is defined by the shuttle 154 of the molded article transfer device 150, the first aperture 154A being positioned in the first receiving position R. Furthermore, the shutter member 144 of the in-mold shutter 140 is in the shut position S, whereby the first mold shoe 230 is engaged with the moving platen 912 (FIG. 1). Accordingly, the injection mold 200 is configured for molding of the first molded article 102A (not shown). Thereafter, molding of the first molded article 102A (not shown) is performed with injection of molding material into the molding cavity 101.

The production molding process next includes, as shown with reference to FIG. 6B, and as described previously, the un-shuttering of the in-mold shutter 140 to disengaged the first mold shoe 130 from the moving platen 912 (FIG. 1).

Figure 6C:
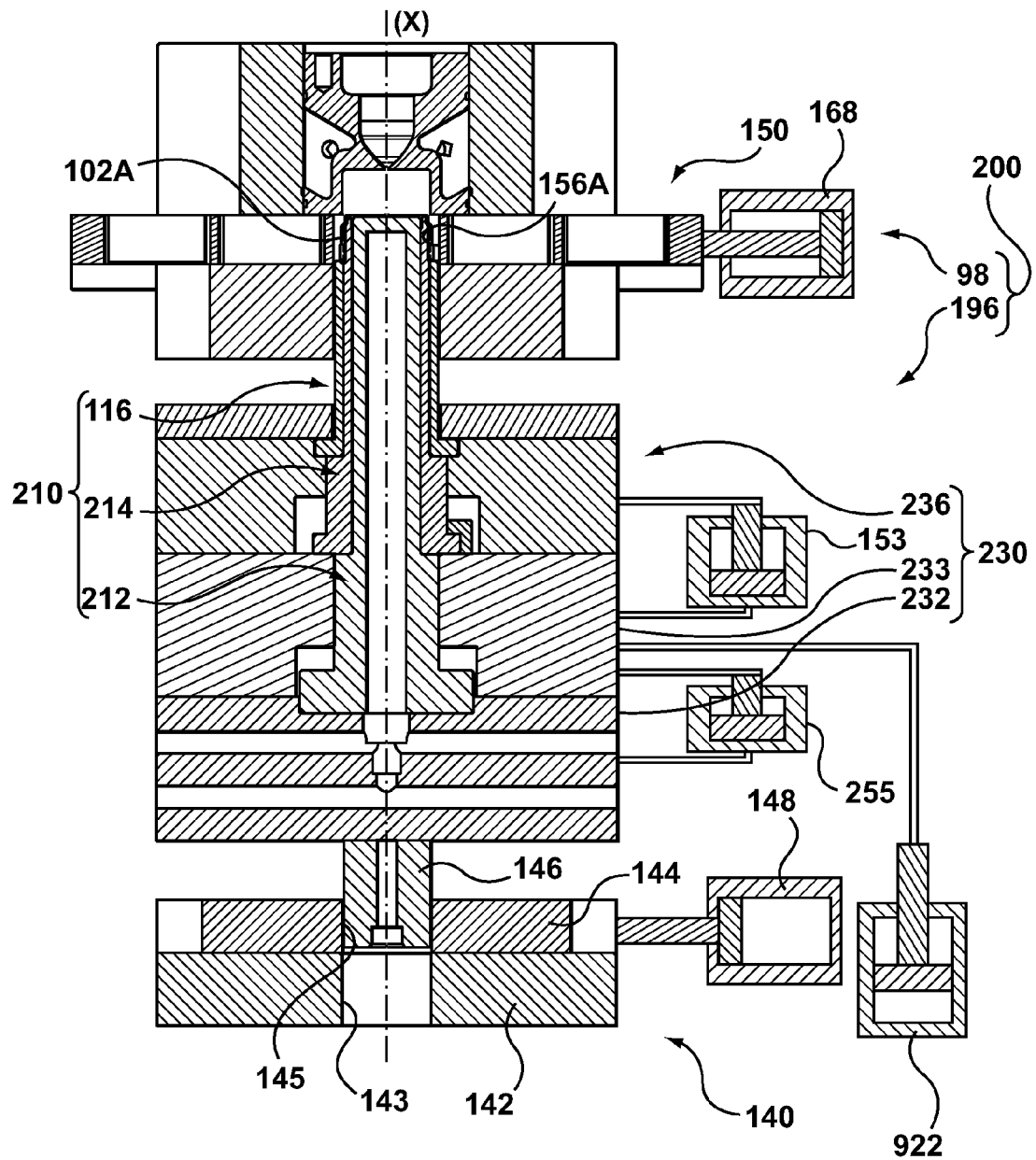

The production molding process next includes, as shown with reference to FIG. 6C, opening of the first mold stack 206A with retracting the first stack portion 210, along the mold-stroke axis X, to position the first molded article 102A that is arranged thereon in the first aperture 156A. This involves retracting the stripper retainer 236, the second core retainer 233, and the first core retainer 232, in tandem, along the mold-stroke axis X, and thus the retracting of the inner core 112, the outer core 114, and the stripper sleeve 116 that are retained thereto, respectively. The foregoing movements are provided through control of the ejector actuator 922 for retracting of the second core retainer 233, wherein the first core retainer 232 and the stripper retainer 236 follow, in tandem, by virtue of further control of the core actuator 255 to hold the first core retainer 232 in contact with a bottom face of the second core retainer 233, and likewise, control of the stripper actuator 153 to keep the stripper retainer 236 in contact with a top face of the second core retainer 233.

Figure 6D:
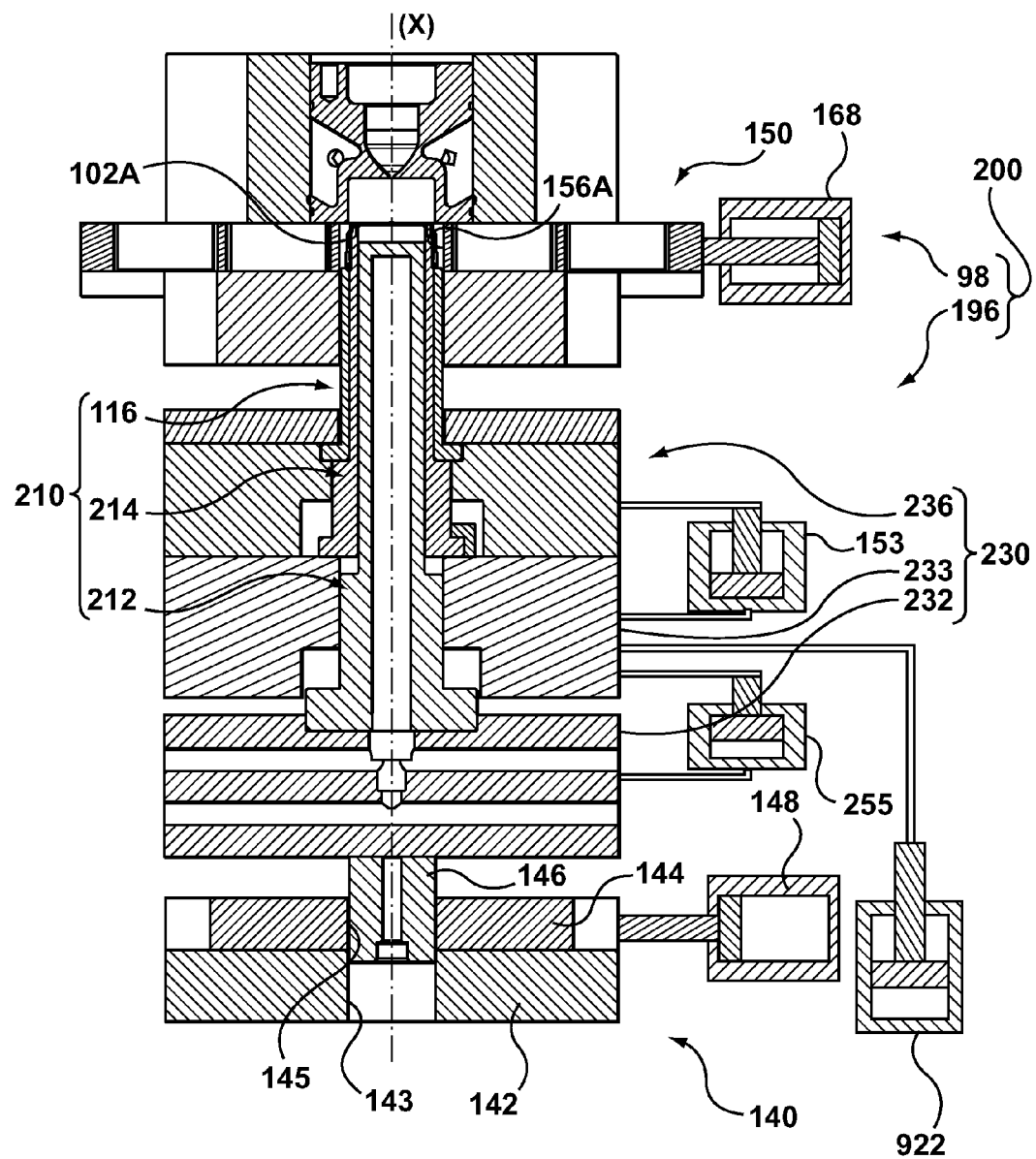
Figure 6E:
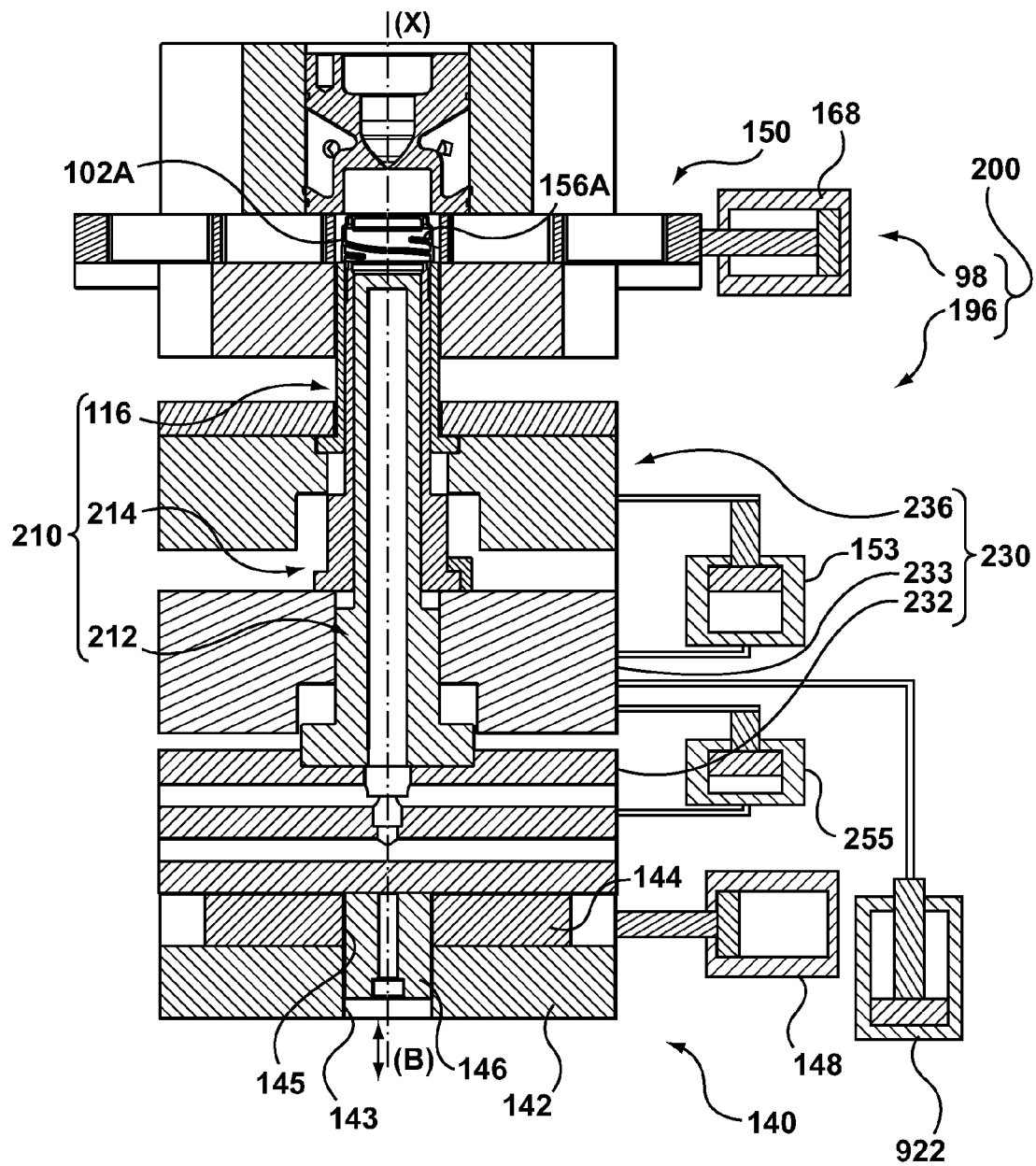

The production molding process next includes, as shown with reference to FIG. 6D, a first stage of arranging the first stack portion 210 to eject the first molded article 102A into the first aperture 156A of the shuttle 154, and more particularly the stripping of the seal portion 103 of the first molded article 102A from where it was molded in between the inner core 212 and the outer core 214 with relative movement thereof. To do so, involves holding the position of the stripper retainer 236, to keep the stripper sleeve 116 that is fixed thereto immobile, whereby the first molded article 102A is held in the first aperture 156A, while further holding of the position of the second core retainer 233, to keep the outer core 114 that is fixed thereto immobile, and then retracting the first core retainer 232 relative thereto, and in effect retract the inner core 112 that is retained thereon relative to the outer core 114, along the mold stroke axis X, a distance that is sufficient to strip the seal portion 103. To do so, the position of the second core retainer 233 is held through control of the ejector actuator 922, while the position of the stripper retainer 236 is held through control of the stripper actuator 153 to keep the stripper retainer 236 in contact with the top face of the second core retainer 233. The movement of the first core retainer 132 is provided through control of the core actuator 255 to retract the first core retainer 232 relative to the second core retainer 233.

The production molding process next includes, as shown with reference to FIG. 6E, a final stage of arranging the first stack portion 210 to eject the first molded article 102A into the first aperture 156A of the shuttle 154, and furthermore retracting of the first stack portion 210 from the first aperture 156A. To do so involves continuing to hold the position of the stripper retainer 236, to keep the stripper sleeve 116 that is fixed thereto immobile, whereby the first molded article 102A is held in the first aperture 156A, and then retracting, in tandem, the first core retainer 232 and the second core retainer 233 relative thereto, and in effect retract the inner core 212 and the outer core 214 that are retained thereon relative to the stripper sleeve 116. The first molded article 102A is stripped from the outer core 214 as it is held in the first aperture 156A, through supporting contact with a top of the stripper sleeve 116, and the outer core 214 is retracted therefrom with its retraction to the stripping position. The foregoing involves coordinated control of the stripper actuator 153 and of the ejector actuator 922, wherein the stripper actuator 153 and the ejector actuator 922 are directed to extend with equal displacement, and in the opposite directions, while the core actuator 255 is controlled to maintain the position of the first core retainer 232 relative to the second core retainer 233, and in effect retract therewith.

Figure 6F:
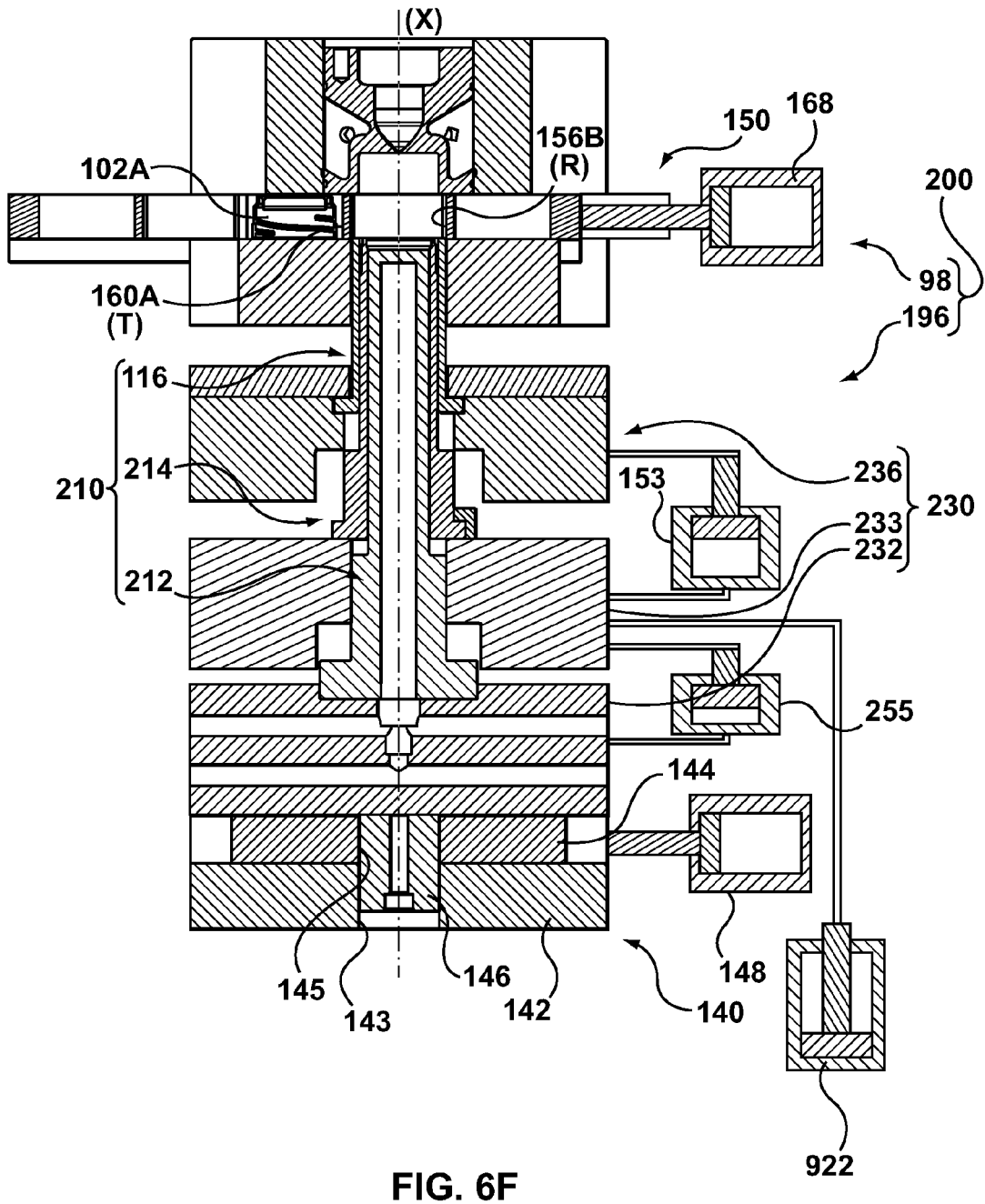

The production molding process next includes, as shown with reference to FIG. 6F, and as described previously, shuttling of the shuttle 154 to transfer the first molded article 102A within the first aperture 156A.

Figure 6G:
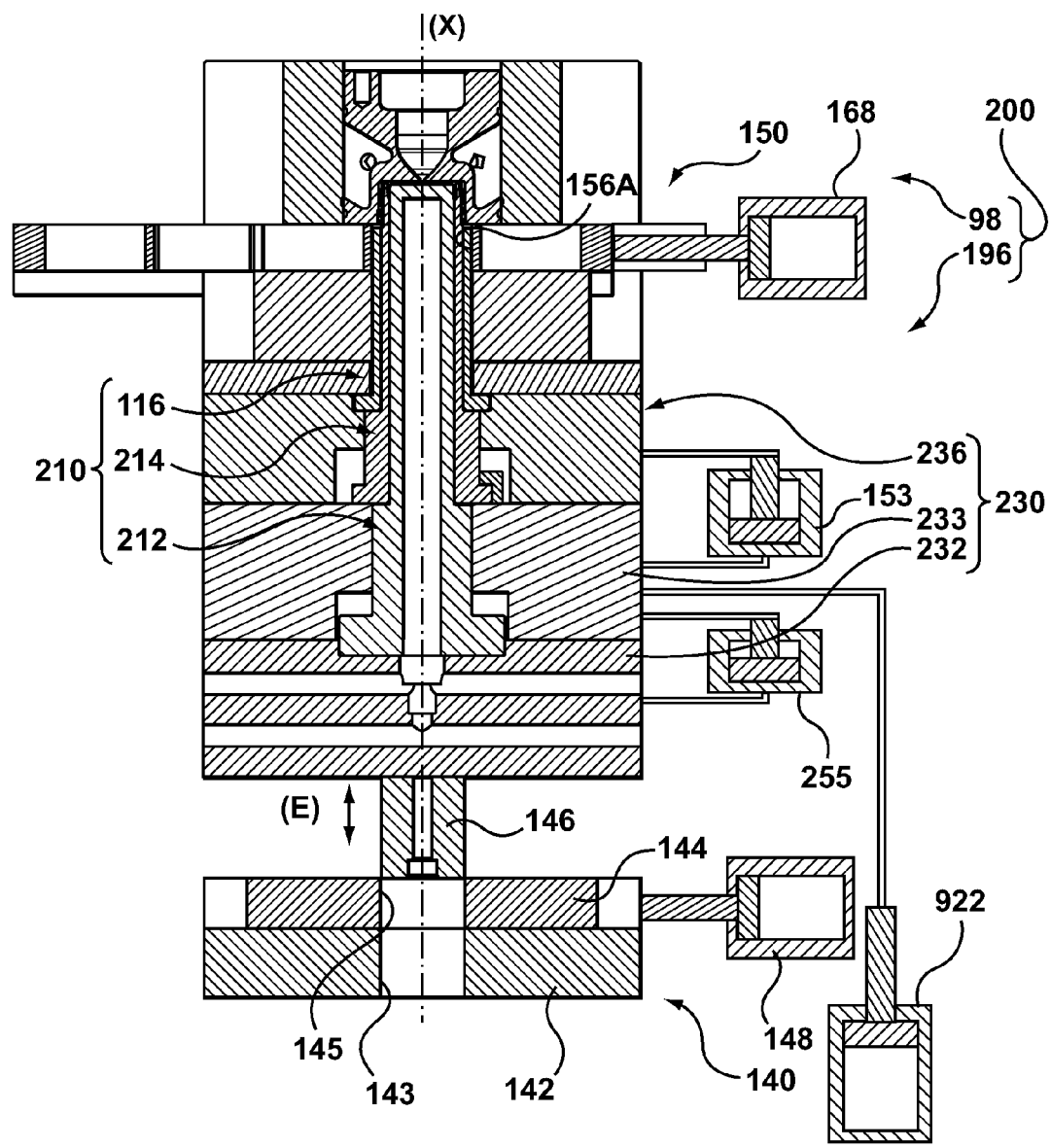

The production molding process ends, as shown with reference to FIG. 6G, with the passing of the first molded article 102A along the first channel 160A towards the exit 164 (FIG. 3) thereof (shown only by virtue of the disappearance of the first molded article 102A from the first channel 160A), and closing of the first mold stack 206A. The closing of the first mold stack 206A involves rearranging the first mold shoe 230 into the extended position E with extension of the first core retainer 232, the second core retainer 233, and the stripper retainer 236, along the mold stroke axis X, to position the inner core 212, the outer core 214, and the stripper sleeve 116 that are retained thereon into their respective molding positions. The foregoing movements are provided through control of the ejector actuator 922 for extending of the second core retainer 233, wherein the first core retainer 232 and the stripper retainer 236 follow, in tandem, by virtue of further control of the core actuator 255 to bring the first core retainer 232 into contact with the bottom face of the second core retainer 233, and likewise, control of the stripper actuator 153 to bring the stripper retainer 236 into contact with the top face of the second core retainer 233. In so doing, the first stack portion 210 is arranged within the second aperture 156B that is defined by the shuttle 154 of the molded article transfer device 150, the second aperture 154B being positioned in the first receiving position R. While not shown, prior to molding of the another of the first molded article 102A, there is a further requirement for shuttering of the in-mold shutter 140 to engage the first mold shoe 230 to the moving platen 912 (FIG. 1).

Figure 7A:
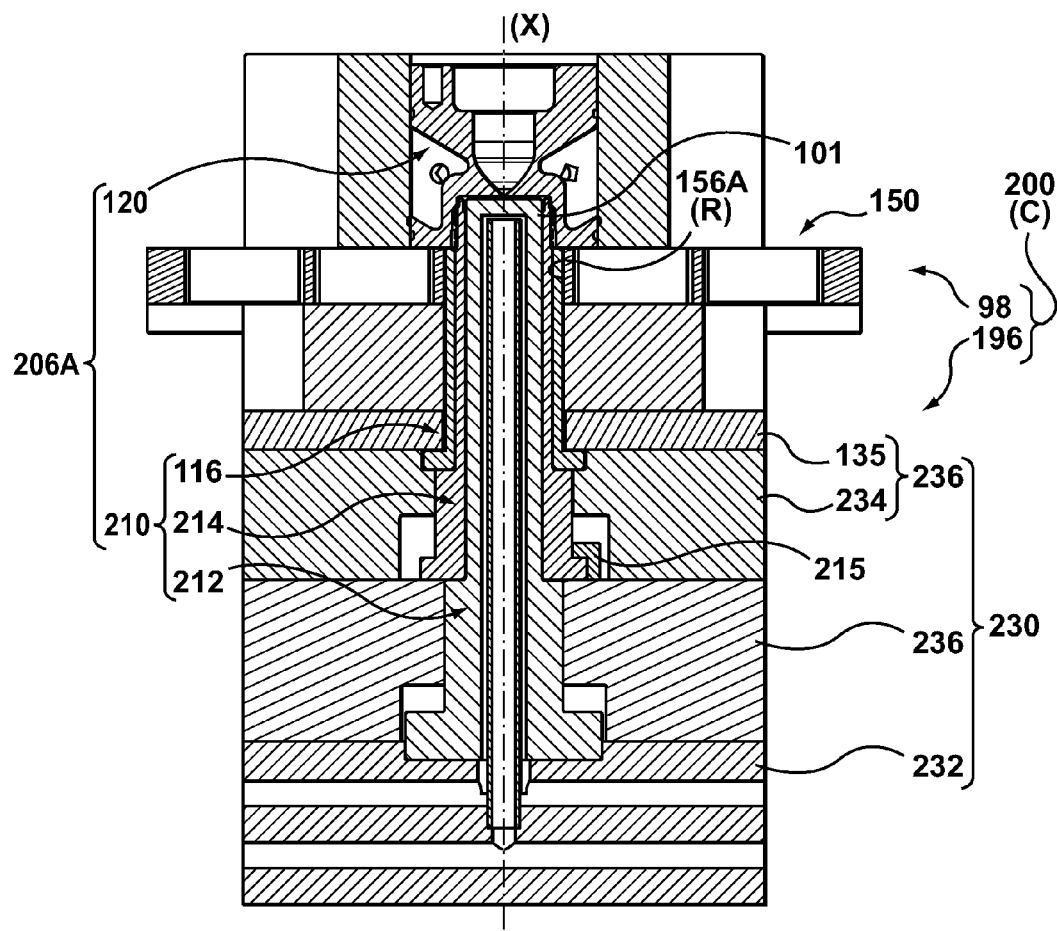
FIGS. 7A-7F depict another alternative production molding process involving the injection mold and the in-mold part transfer device of FIG. 6A, and that does not involve the in-mold shutter of FIG. 2A.

Another alternative non-limiting embodiment may be appreciated with reference to the injection mold 200 without the in-mold shutter 140 as shown in FIG. 7A. That is, the injection mold 200 is the same as that previously described except for removal of the in-mold shutter 140, and as such the first mold shoe 130 thereof is structured for direct mounting to the moving platen 912 (FIG. 1).

The start-up and production molding processes for the reconfigured injection mold 200 are similar to that described previously. That being said, the production molding process for the injection mold 200 will be further described for sake of differences in execution of the various actuators that are connected to the first mold shoe 230, and more particularly owing to the further involvement of the platen-moving actuator 915.

The production molding process begins, as shown in FIG. 7A, with the reconfigured injection mold 200 being positioned in the mold closed configuration C with the first mold stack 206A closed to define the molding cavity 101 therein. In so doing, the first mold stack 206A is arranged within the first aperture 156A that is defined by the shuttle 154 of the molded article transfer device 150, the first aperture 154A being positioned in the first receiving position R. Accordingly, the reconfigured injection mold 200 is configured for molding of the first molded article 102A (not shown). Thereafter, molding of the first molded article 102A (not shown) is performed with injection of molding material into the molding cavity 101.

Figure 7B:
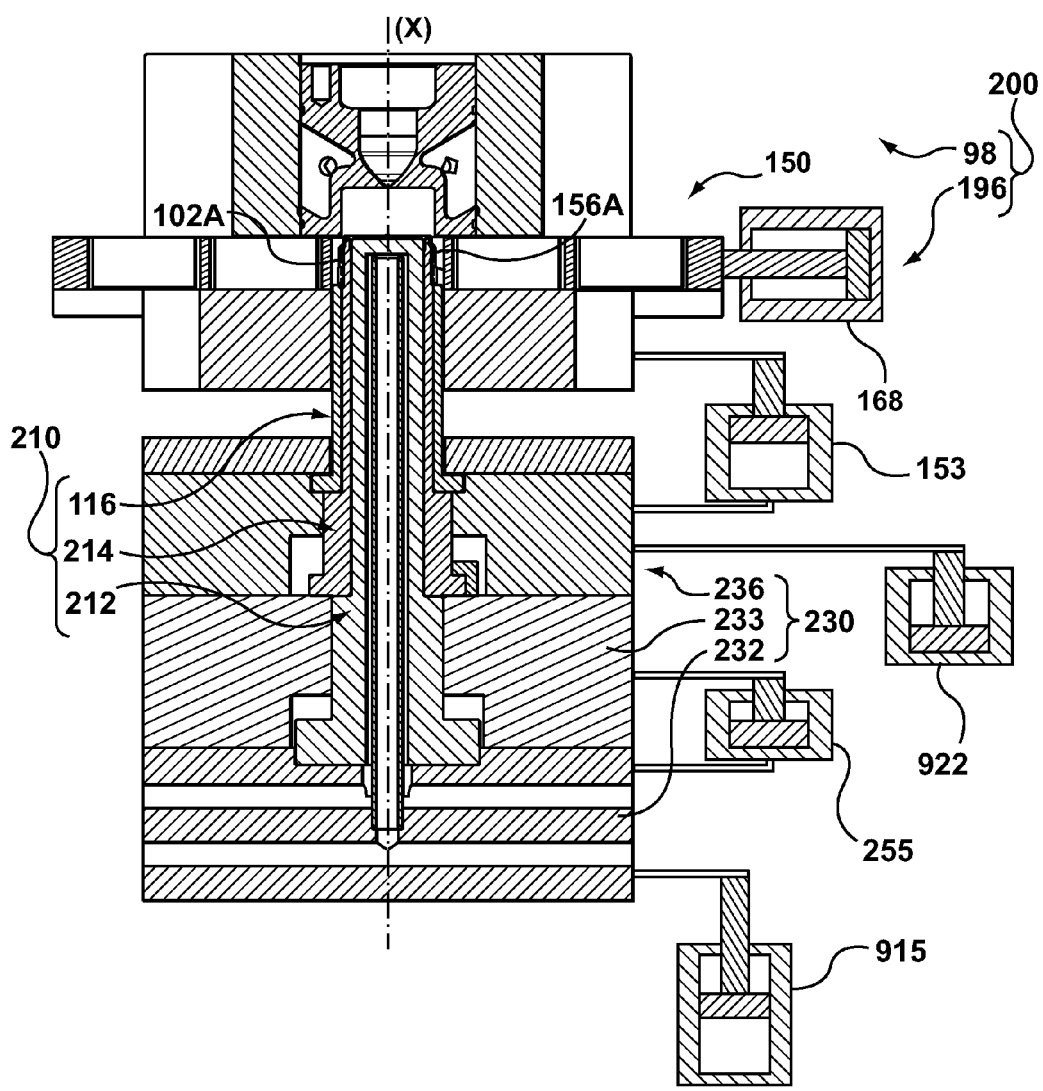

The production molding process next includes, as shown with reference to FIG. 7B, opening of the first mold stack 206A with positioning of the first mold half 196 and the second mold half 98, along the mold-stroke axis X, into the mold open configuration O, and holding the position of the molded article transfer device 150 in relation to the second mold half 98, wherein the first molded article 102A that is arranged on the first stack portion 210 is positioned in the first aperture 156A. The positioning of the first mold half 196 and the second mold half 98 involves un-shuttering of the clamp shutter 920 (FIG. 1) and positioning of the moving platen 912 (FIG. 1) away from the stationary platen 914 (FIG. 1) through control of the platen-moving actuator 915 (FIG. 1). Furthermore, the opening involves control of the ejector actuator 922 and the core actuator 255 to fix the positions of the first core retainer 232, the second core retainer 233, and the stripper retainer 236 relative to the moving platen 912 for movement therewith. The holding the position of the molded article transfer device 150 in relation to the second mold half 98 involves coordinated control of the stripper actuator 153 and the platen-moving actuator 915, wherein the stripper actuator 153 is directed to extend with equal displacement and in the opposite direction to the platen-moving actuator 915 with the positioning of the first mold half 196 and the second mold half 98 into the mold open configuration O.

Figure 7C:
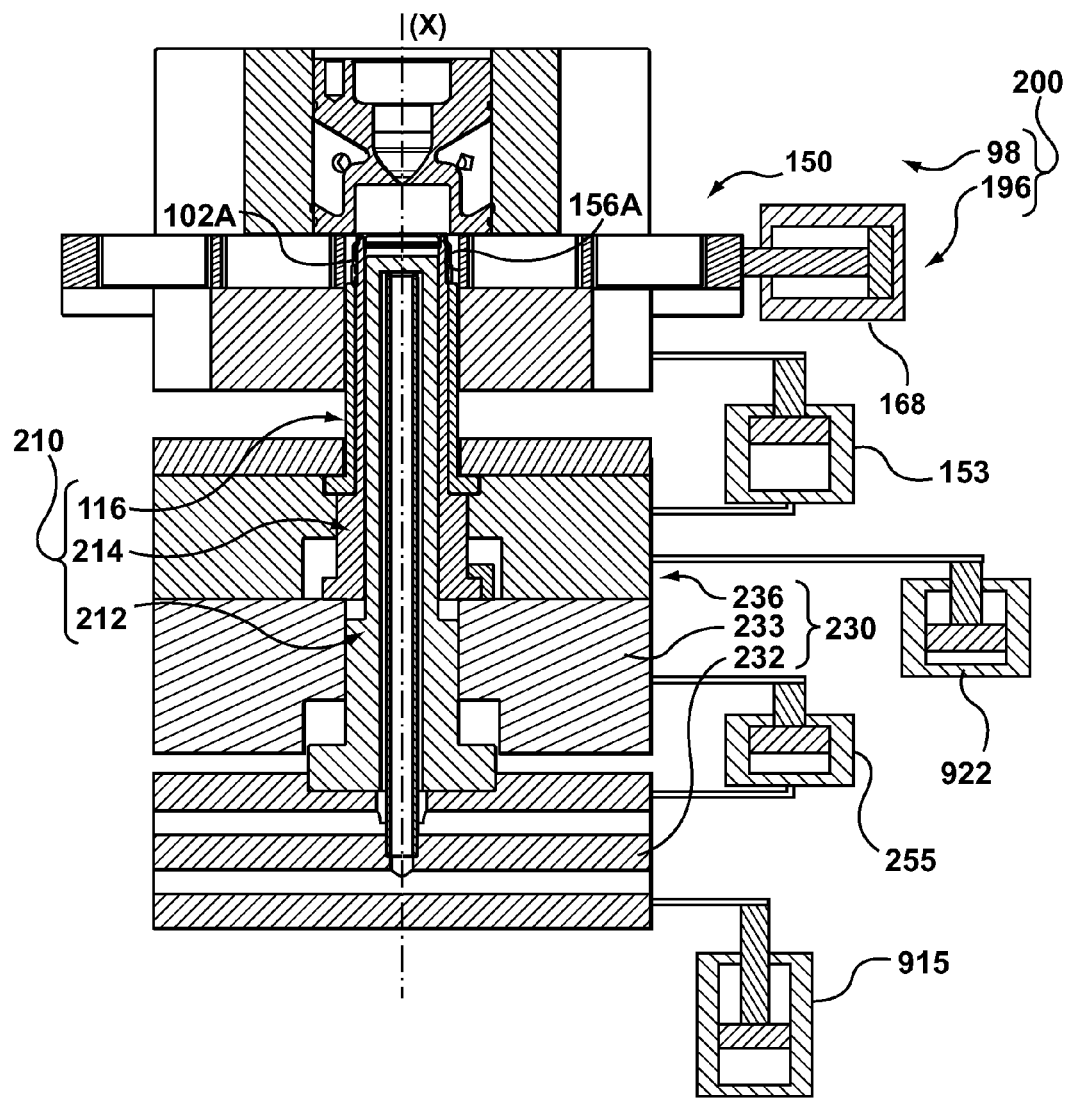

The production molding process next includes, as shown with reference to FIG. 7C, a first stage of arranging the first stack portion 210 to eject the first molded article 102A into the first aperture 156A of the shuttle 154, and more particularly the stripping of the seal portion 103 of the first molded article 102A from where it was molded in between the inner core 212 and the outer core 214 with relative movement thereof. To do so, involves holding the position of the stripper retainer 236, to keep the stripper sleeve 116 that is fixed thereto immobile, whereby the first molded article 102A is held in the first aperture 156A, while further holding of the position of the second core retainer 233, to keep the outer core 114 that is fixed thereto immobile, and then retracting the first core retainer 232 relative thereto, and in effect retract the inner core 112 that is retained thereon relative to the outer core 114, along the mold stroke axis X, a distance that is sufficient to strip the seal portion 103. The foregoing involves coordinated control of the core actuator 255, the ejector actuator 922, and the platen-moving actuator 915, wherein the core actuator 255 and the ejector actuator 922 are directed to extend with equal displacement, and in the opposite direction, to the platen-moving actuator 915 while the stripper actuator 153 is controlled to maintain the position of the molded article transfer device 150 relative to the second mold half 98.

Figure 7D:
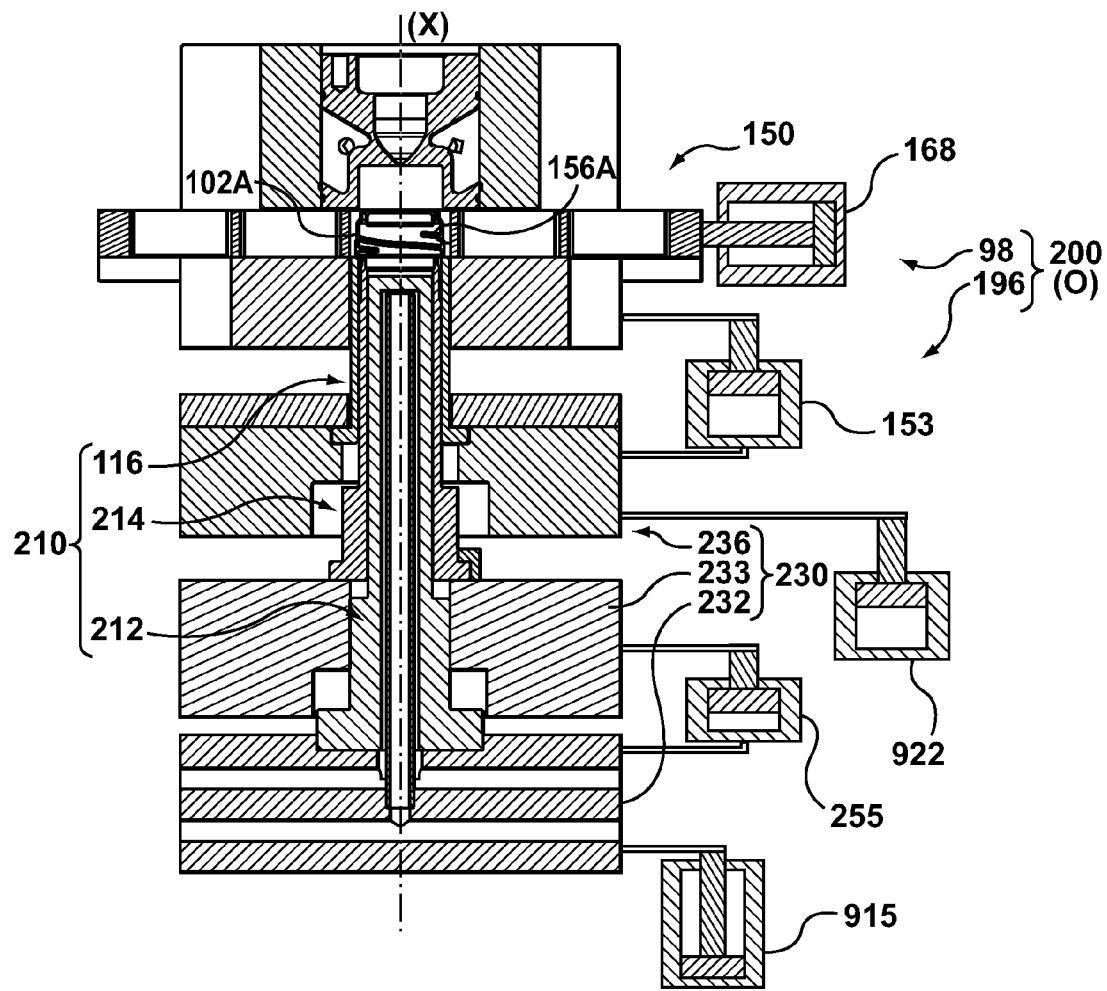

The production molding process next includes, as shown with reference to FIG. 7D, a final stage of arranging the first stack portion 210 to eject the first molded article 102A into the first aperture 156A of the shuttle 154, and furthermore retracting of the first stack portion 210 from the first aperture 156A. To do so involves continuing to hold the position of the stripper retainer 236, to keep the stripper sleeve 116 that is fixed thereto immobile, whereby the first molded article 102A is held in the first aperture 156A, and then retracting, in tandem, the first core retainer 232 and the second core retainer 233 relative thereto, and in effect retract the inner core 212 and the outer core 214 that are retained thereon relative to the stripper sleeve 116. The first molded article 102A is stripped from the outer core 214 as it is held in the first aperture 156A, through supporting contact with a top of the stripper sleeve 116, and the outer core 214 is retracted therefrom with its retraction to the stripping position. The foregoing involves coordinated control of the ejector actuator 922 and the platen-moving actuator 915, wherein the ejector actuator 922 is directed to extend with equal displacement, and in the opposite direction, to the platen-moving actuator 915 while the stripper actuator 153 is controlled to maintain the position of the molded article transfer device 150 relative to the second mold half 98 and the core actuator 255 is controlled to maintain the position of the second core retainer 233 relative to the first core retainer 232.

Figure 7E:
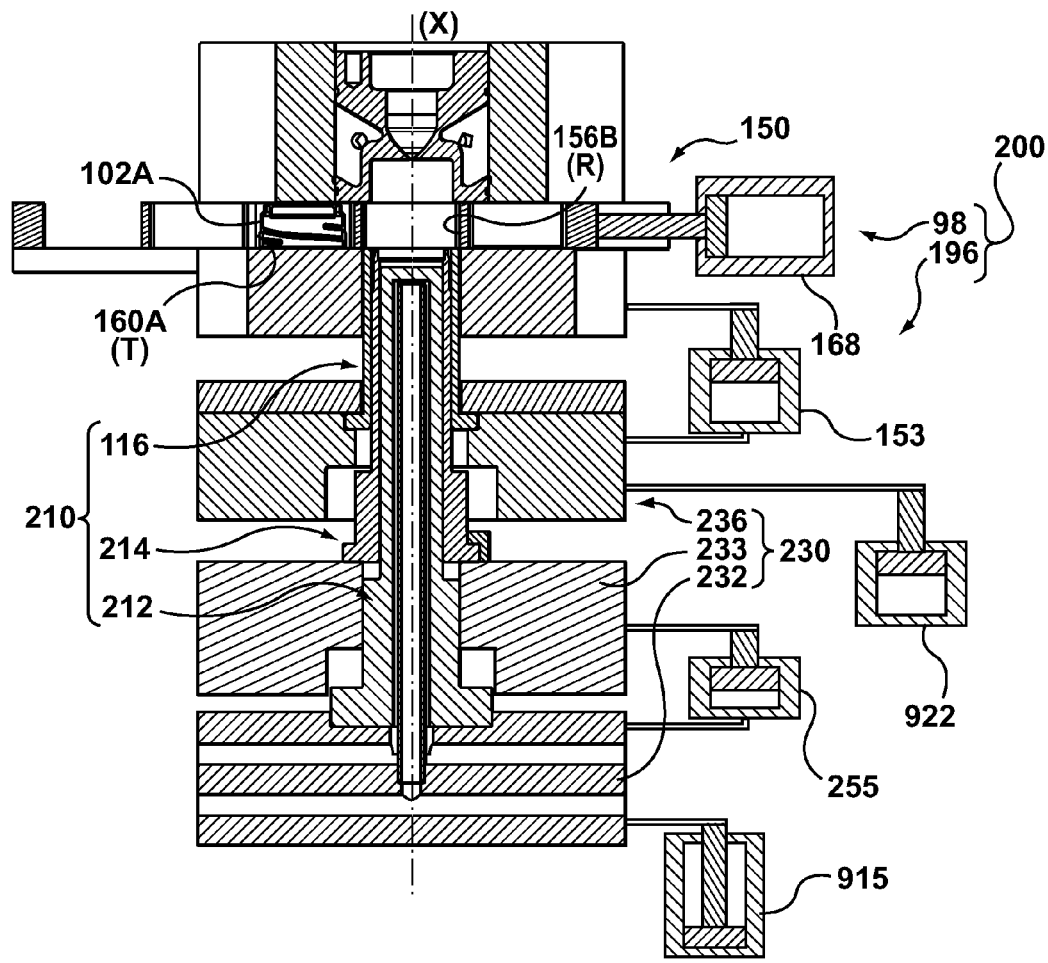

The production molding process next includes, as shown with reference to FIG. 7E, and as described previously, shuttling of the shuttle 154 to transfer the first molded article 102A within the first aperture 156A.

Figure 7F:
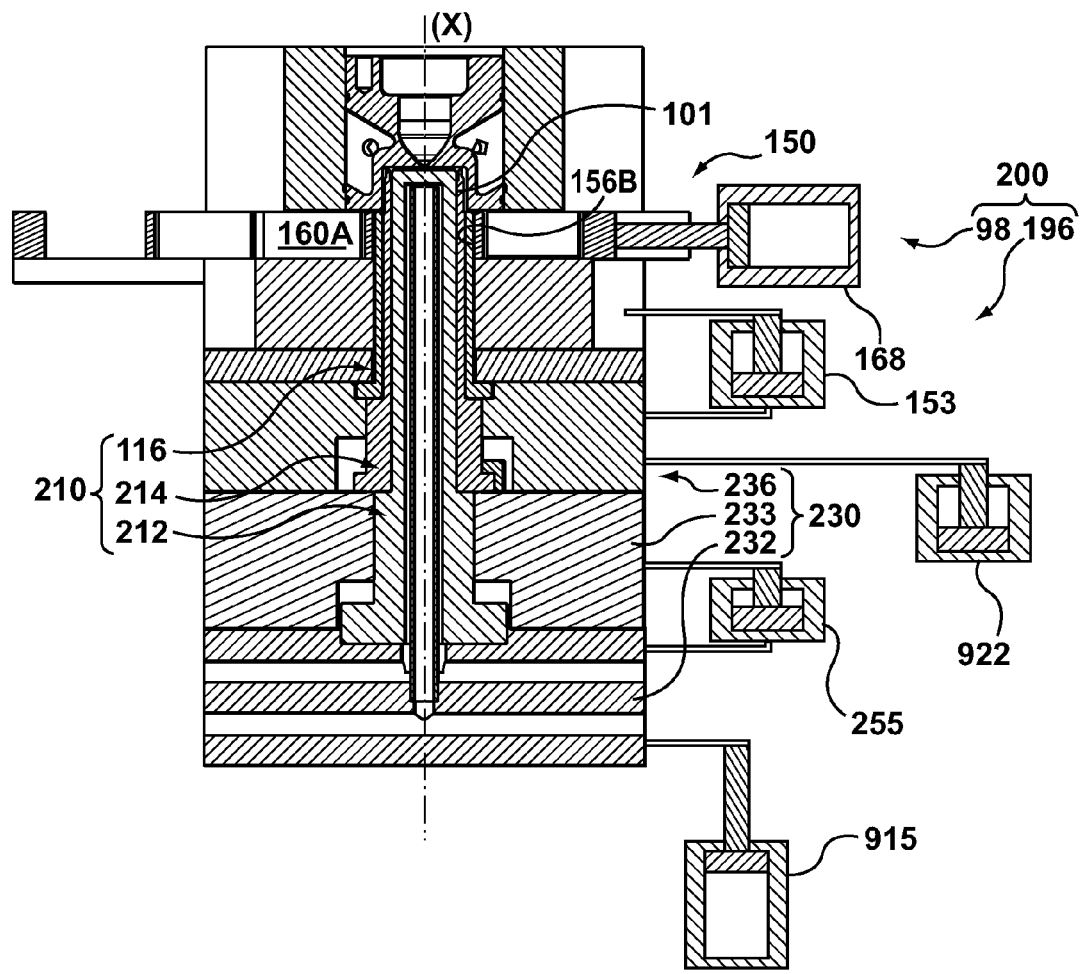

The production molding process ends, as shown with reference to FIG. 7F, with the passing of the first molded article 102A along the first channel 160A towards the exit 164 (FIG. 3) thereof (shown only by virtue of the disappearance of the first molded article 102A from the first channel 160A), and the closing of the first mold stack 206A. The closing of the first mold stack 206A involves closing of the first mold shoe 230 and positioning of the first mold half 196 and the second mold half 98, along the mold-stroke axis X, into the mold closed configuration C. In so doing, the first mold stack 206A is arranged within the second aperture 156B that is defined by the shuttle 154 of the molded article transfer device 150, the second aperture 154B being positioned in the first receiving position R. The closing of the first mold shoe 230 involves the coordinated control of the stripper actuator 153, the ejector actuator 922 (FIG. 1) and the core actuator 255 to retract, along the mold-stroke axis X, the molded article transfer device 150 into contact with the stripper retainer 236, the stripper retainer 236 into contact with the second core retainer 233, and the second core retainer 233 into contact with the first core retainer 232. The positioning of the first mold half 196 and the second mold half 98 involves positioning of the moving platen 912 (FIG. 1) towards the stationary platen 914 (FIG. 1) through control of the platen-moving actuator 915 (FIG. 1) and shuttering of the clamp shutter 920 (FIG. 1). While not shown, prior to molding of the another of the first molded article 102A, there is a further requirement for shuttering of the in-mold shutter 140 to engage the first mold shoe 230 to the moving platen 912 (FIG. 1).

Figure 8A:
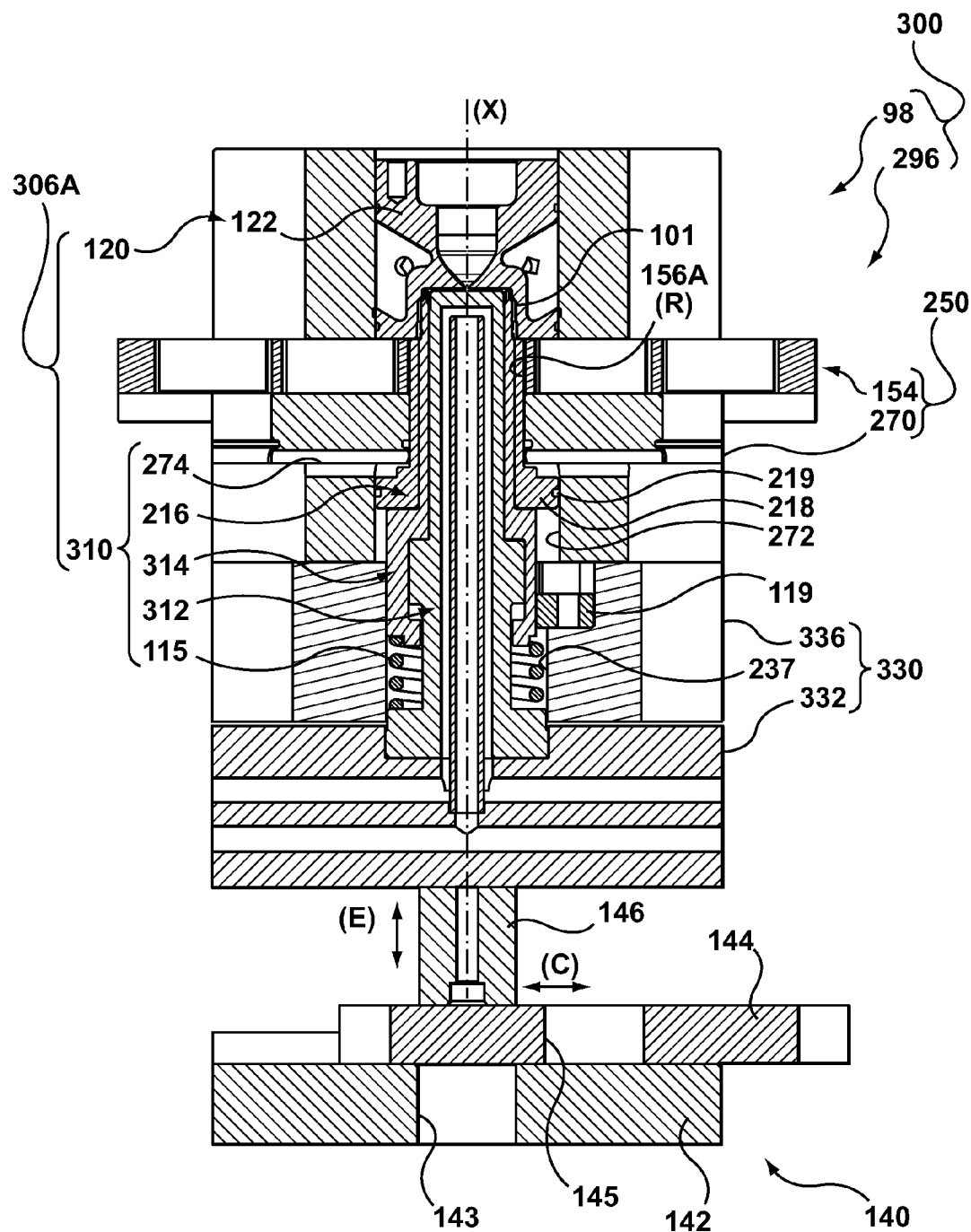
FIGS. 8A-8G depict an alternative production molding process involving an alternative non-limiting embodiment of the injection mold, an alternative non-limiting embodiment of the molded article transfer device, and the in-mold shutter of FIG. 2A.

Yet another alternative non-limiting embodiment may be appreciated with reference to the injection mold 300 shown in FIG. 8A. The injection mold 300 is structured similarly to the injection mold 100 of FIG. 5A, and as such only the differences of construction and operation thereof will be described in detail in the description that follows.

The injection mold 300 includes an alternative non-limiting embodiment of a first mold half 296, and the second mold half 98 described previously.

The first mold half 296 of the injection mold 300 includes the same in-mold shutter 140 that was described previously, an alternative non-limiting embodiment of a molded article transfer device 250, between which another alternative non-limiting embodiment of a first mold shoe 330 is arranged.

The first mold shoe 330 is structured to have a first stack portion 310 of a first mold stack 306A connected thereto. Much the same as the first stack portion 110 described previously, the first stack portion 310 of the first mold stack 306A includes an inner core 312, an outer core 314, and a stripper sleeve 316, that cooperate, in use, with the cavity insert 122 of the second stack portion 120 to define the molding cavity 101. As such, the outer core 314 is slidably arranged around the inner core 312 to accommodate, in use, relative movement thereof along the mold-stroke axis X. Likewise, the stripper sleeve 316 is slidably arranged around the outer core 314 to accommodate, in use, the relative movement thereof along the mold-stroke axis X.

Much like the first mold shoe 130 described previously, the first mold shoe 330 includes a first core retainer 332 and a stripper retainer 336 that are slidably connected together to accommodate the relative movement thereof, in use, along the mold-stroke axis X, wherein the inner core 212 is connected to the first core retainer 232, and the stripper sleeve 316 is arranged within the stripper retainer 336.

The inner core 312 and the outer core 314 are slidably retained together in the same manner as the inner core 112 and the outer core 114 that were described previously, and as such, are kept rotatably engaged within the first mold shoe 330 by the key 119 that is associated with the stripper retainer 336.

Figure 8B:
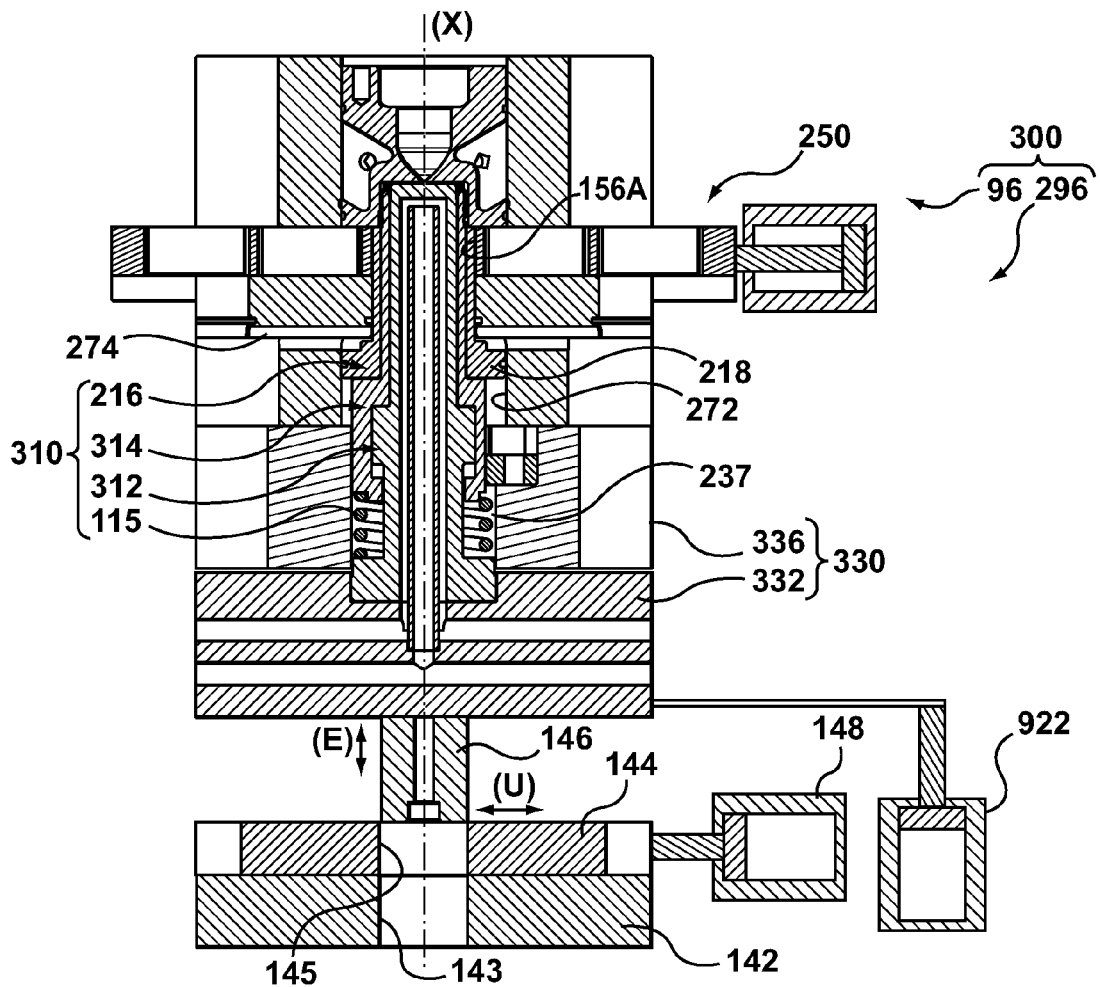
Figure 8C:
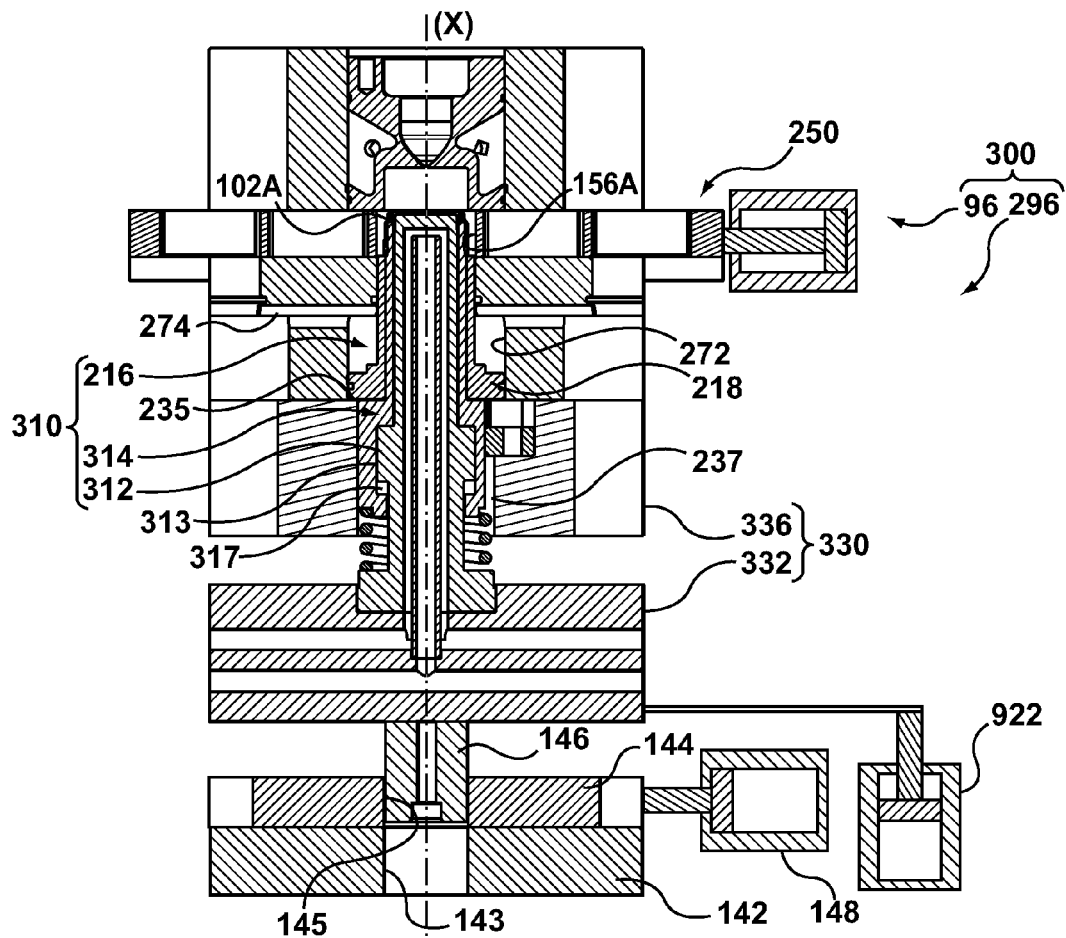

In contrast to the injection mold 100, wherein the stripper sleeve 116 is fixedly retained to the stripper retainer 136 for movement therewith, the stripper sleeve 316 of the injection mold 300 is slidably arranged within a passageway 337 that is defined in the stripper retainer 336 and as such is movable relative thereto to accommodate, in use, movement thereof, along the mold-stroke axis X, from the stripper sleeve molding position (FIG. 8A) to the ejection position (FIG. 8C). Furthermore, the stripper sleeve 216 defines a piston portion 218 that is slidably received in a piston cylinder 272 that is defined in a base plate 270 of the molded article transfer device 250. The base plate 270 further defines a channel 274 therein with which to connect, in use, the piston cylinder 272 with a source or sink of a working fluid (e.g. air, hydraulic fluid, etc.).

In further contrast to the injection mold 100, the stripper retainer 236 of the injection mold 300 is connected to a bottom face of the base plate 270, wherein a top face 235 of the stripper retainer 236 is arranged to retain, in use, the piston portion 218 of the stripper sleeve 316 in the piston cylinder 272 and to otherwise provide a rear limit of travel for the stripper sleeve 316 that corresponds with an ejection position thereof.

In operation, the stripper sleeve 316 is biased to move from the stripper sleeve molding position towards the ejection position, along the mold-stroke axis X, with connection of the channel 274 to the source of the working fluid and thus is able to retract with the outer core 314. The stripper sleeve 316 is otherwise pushed back to the stripper sleeve molding position, along the mold-stroke axis X, by the outer core 314, wherein a shoulder 315 that is defined on the outer core 314 engages a bottom face of the piston portion 218.

The structure and operation of the molded article transfer device 250 is otherwise the same as the molded article transfer device 150 that was described previously.

The production molding process for the injection mold 300 will be discussed next.

The production molding process begins, as shown in FIG. 8A, with the injection mold 300 being positioned in the mold closed configuration C with the first mold shoe 330 being positioned, along the mold-stroke axis X, in an extended position E such that the first mold stack 306A is closed to define the molding cavity 101 therein. In so doing, the first mold stack 306A is arranged within the first aperture 156A that is defined by the shuttle 154 of the molded article transfer device 250, the first aperture 154A being positioned in the first receiving position R. Furthermore, the shutter member 144 of the in-mold shutter 140 is in the shut position S, whereby the first mold shoe 330 is engaged with the moving platen 912 (FIG. 1). Accordingly, the injection mold 300 is configured for molding of the first molded article 102A. Thereafter, molding of the first molded article 102A (not shown) is performed with injection of molding material into the molding cavity 101.

The production molding process next includes, as shown with reference to FIG. 8B, and as described previously, the un-shuttering of the in-mold shutter 140 to disengaged the first mold shoe 330 from the moving platen 912 (FIG. 1).

The production molding process next includes, as shown with reference to FIG. 8C, opening of the first mold stack 306A with retracting the first stack portion 310, along the mold-stroke axis X, to position the first molded article 102A that is arranged thereon in the first aperture 156A. This involves retracting the first core retainer 332, along the mold-stroke axis X, whereby the inner core 112 that is connected thereto is retracted, along with the outer core 314 that is arranged thereon, and furthermore connecting the channel 274 to the source of working fluid to bias the stripper sleeve 316 to retract with the outer core 314. The retracting of the first core retainer 332 is provided through control of the ejector actuator 922.

Figure 8D:
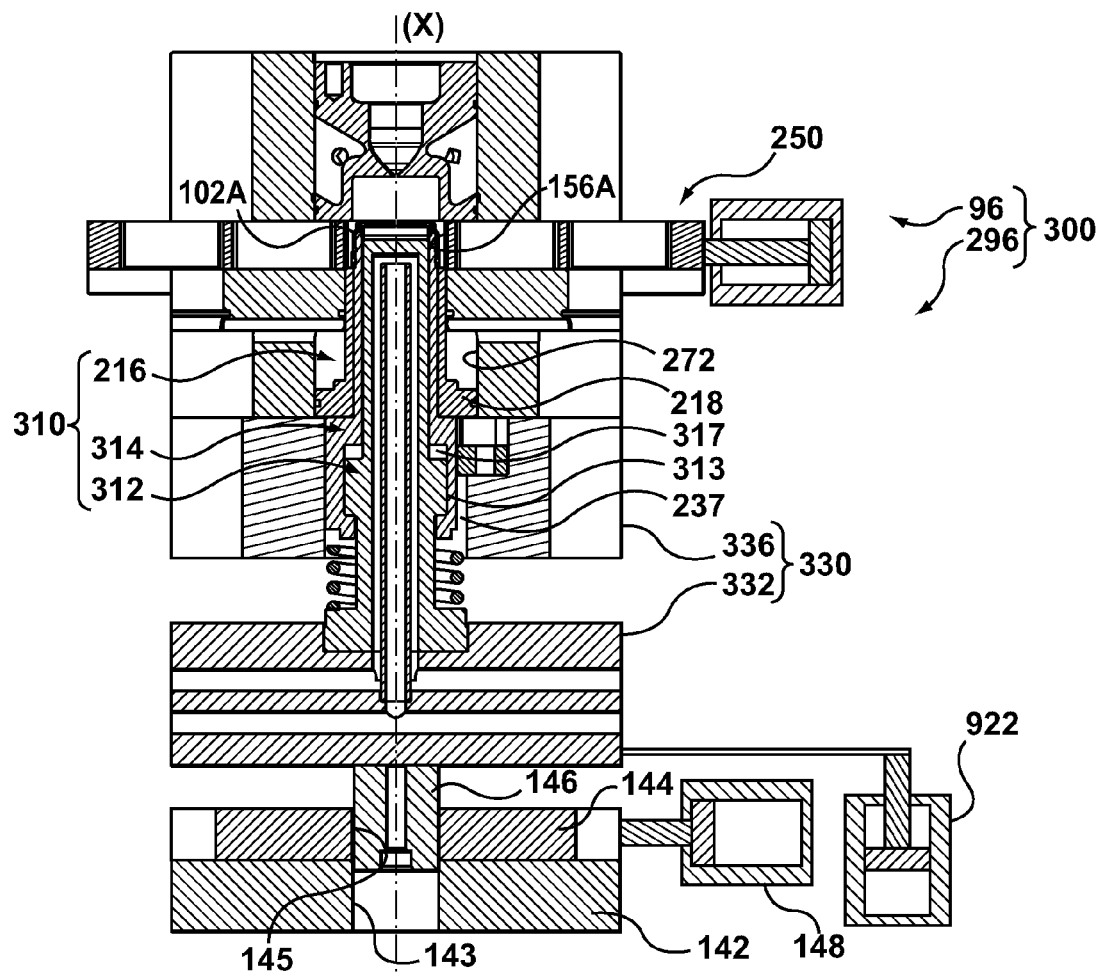

The production molding process next includes, as shown with reference to FIG. 8D, a first stage of arranging the first stack portion 310 to eject the first molded article 102A into the first aperture 156A of the shuttle 154, and more particularly the stripping of the seal portion 103 of the first molded article 102A from where it was molded in between the inner core 312 and the outer core 314 with relative movement thereof. The foregoing operation is made simple, relative to the foregoing non-limiting embodiments, in that it requires only retracting of the first core retainer 132, through control of the ejector actuator 922, to retract the inner core 112 that is retained thereon, along the mold stroke axis X, a distance, relative to the outer core 114 which is kept immobile by virtue of being arranged within the first molded article 102A, that is sufficient to strip the seal portion 103.

Figure 8E:
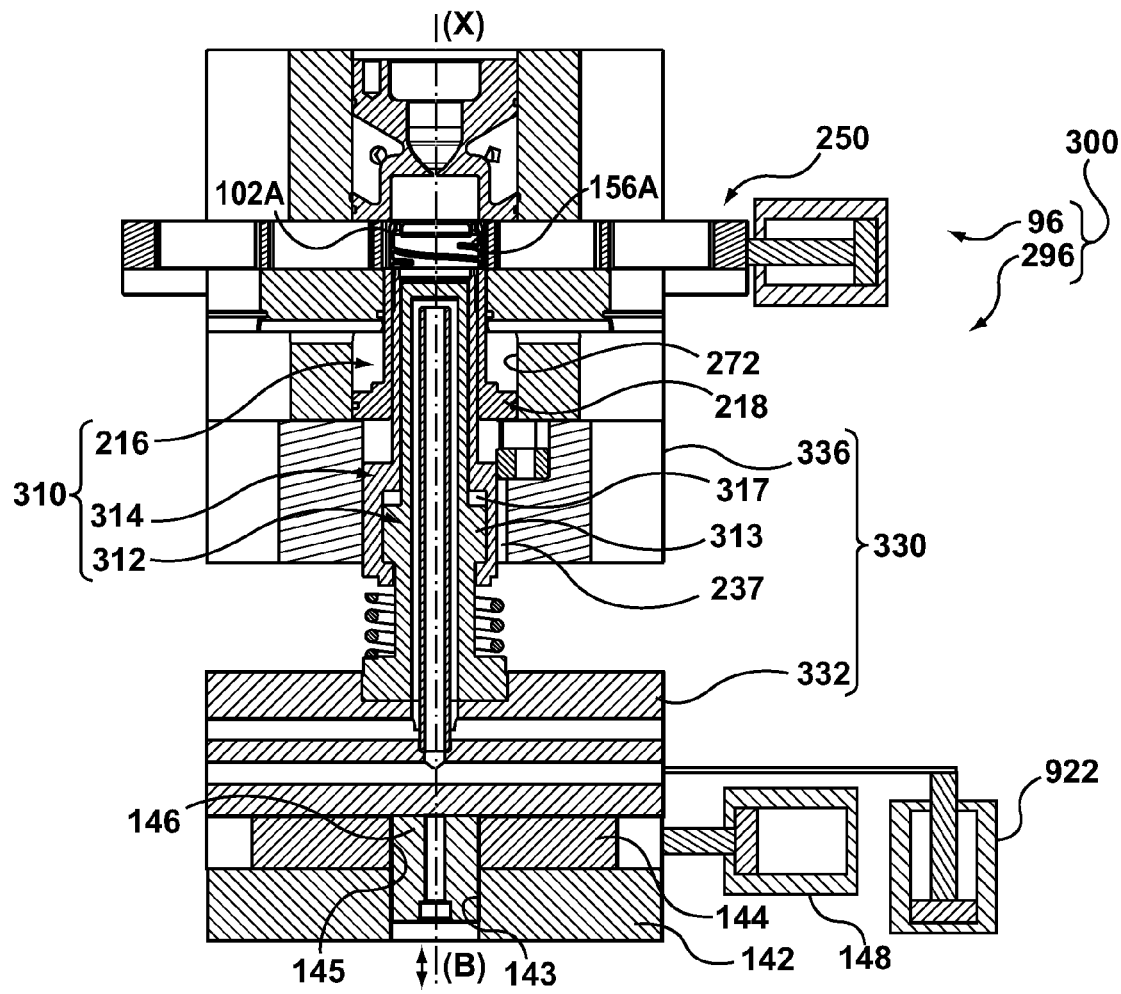

The production molding process next includes, as shown with reference to FIG. 8E, a final stage of arranging the first stack portion 310 to eject the first molded article 102A into the first aperture 156A of the shuttle 154, and furthermore retracting of the first stack portion 110 from the first aperture 156A. The foregoing involves retracting the first core retainer 332, along the mold stroke axis X, into the retracted position B, through control of the ejector actuator 922, to retract the inner core 112 that is retained thereon a distance that is sufficient to further move the outer core 314 into stripping position by virtue of the inner core 312 having reached its rearward limit of travel relative to the outer core 314. The first molded article 102A is stripped from the outer core 314 as it is held in the first aperture 156A, through supporting contact with a top of the stripper sleeve 116, and the outer core 314 is retracted therefrom with its retraction to the stripping position.

Figure 8F:
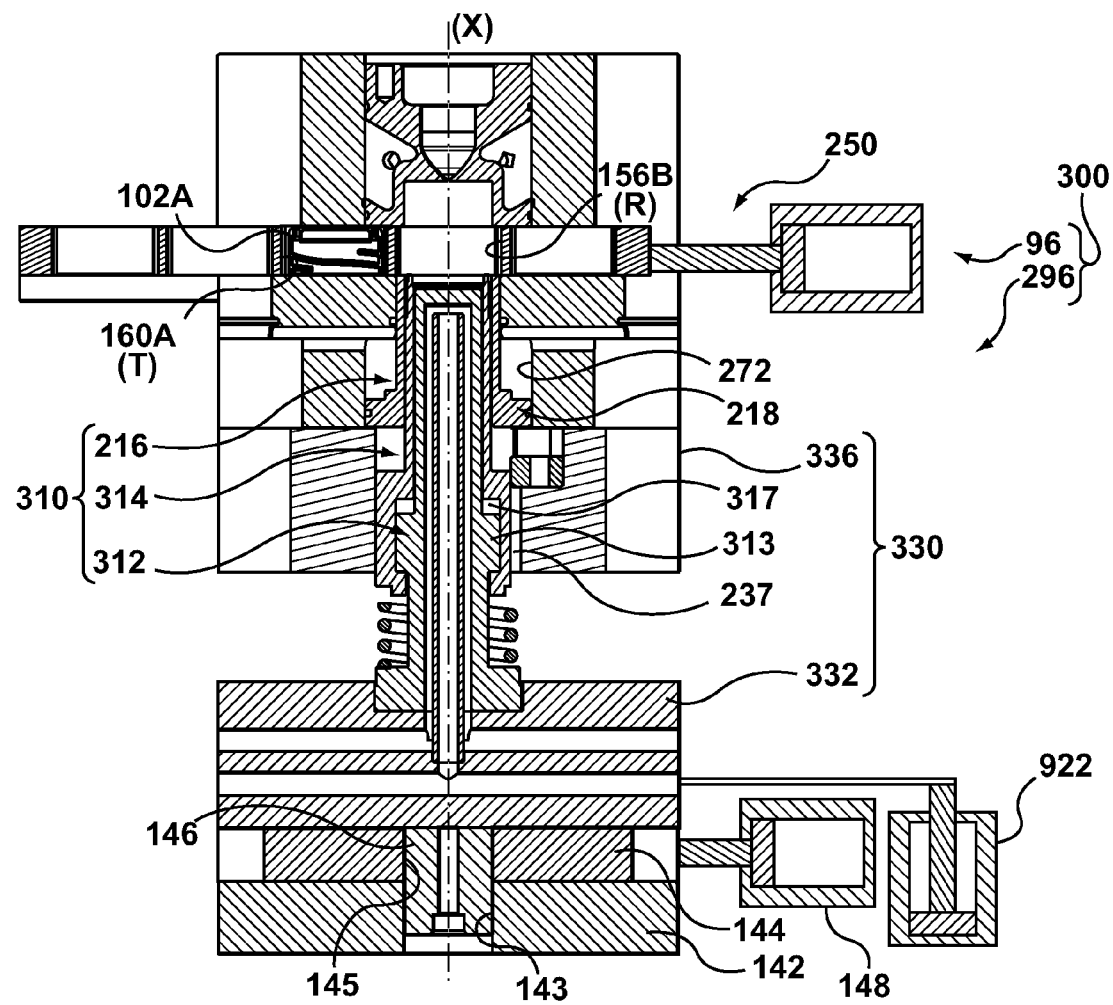

The production molding process next includes, as shown with reference to FIG. 8F, and as described previously, shuttling of the shuttle 154 to transfer the first molded article 102A within the first aperture 156A.

Figure 8G:
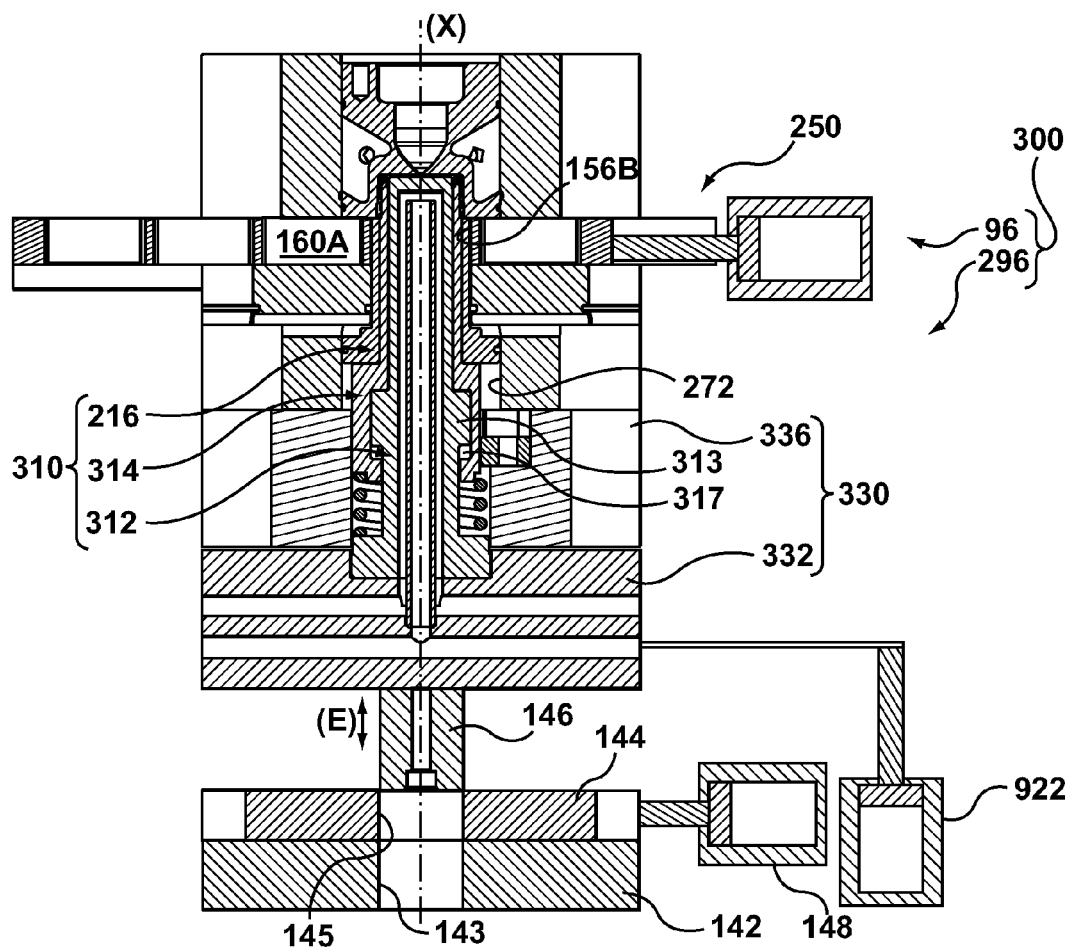

The production molding process ends, as shown with reference to FIG. 8G, with the passing of the first molded article 102A along the first channel 160A towards the exit 164 (FIG. 3) thereof (shown only by virtue of the disappearance of the first molded article 102A from the first channel 160A), and closing of the first mold stack 306A. The closing of the first mold stack 306A involves connecting the channel 274 to the sink of the working fluid and rearranging the first mold shoe 330 into the extended position E with extension of the first core retainer 332, along the mold stroke axis X, through control of the ejector actuator 922, to extend the inner core 312 that is retained thereon into the inner core molding position and in so doing push the outer core 314 into the outer core molding position by virtue of the inner core 312 having reached its forward limit of travel relative to the outer core 114. In so doing, the first stack portion 310 is arranged within the second aperture 156B that is defined by the shuttle 154 of the molded article transfer device 150, the second aperture 154B being positioned in the first receiving position R. While not shown, prior to molding of the another of the first molded article 102A, there is a further requirement for shuttering of the in-mold shutter 140 to engage the first mold shoe 330 to the moving platen 912 (FIG. 1).

Thus, having described the structure and operation of several non-limiting embodiments of the injection mold 100, 200, 300, having one or both of the molded article transfer device 150, 250, and the in-mold shutter 140, those persons of skill in the art would undoubtedly recognize further alternative non-limiting embodiments thereof. And, whereas the production molding processes involving the foregoing have been conveyed in quite specific terms, no such limit on the generality and applicability thereof is intended. As such, a molding process 600 involving the molded article transfer device 150, 250 and another molding process 700 involving the in-mold shutter 140 will be presented next. These molding processes may be practiced separately or, as demonstrated previously, in concert with one another.

Figure 9:
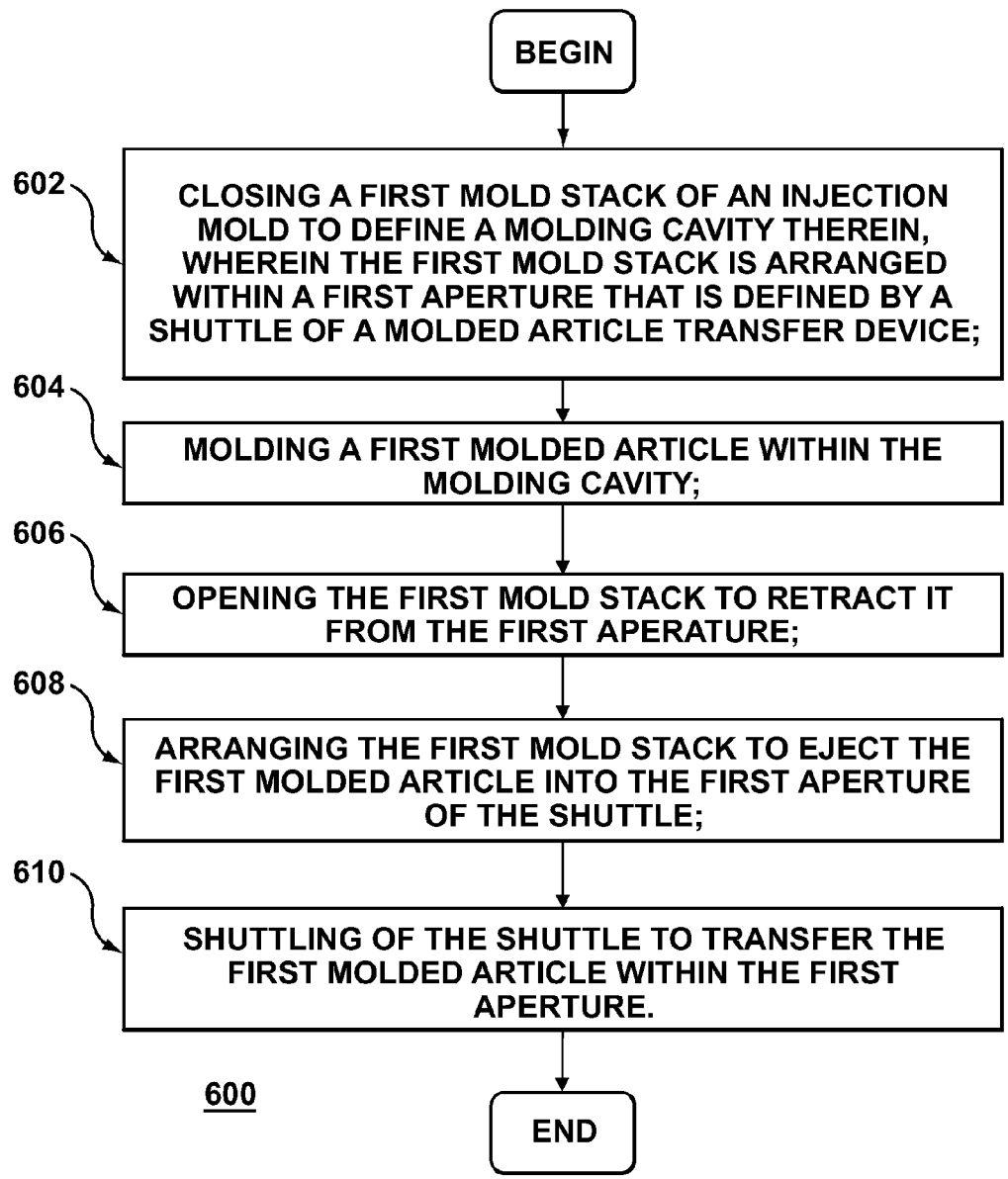
FIG. 9 depicts a flow chart of a first aspect of the production molding process.

A flow chart outlining the steps of the molding process 600 is shown with reference to FIG. 9. The molding process 600 begins with a closing 602 of the first mold stack 106A, 206A, 306A of the injection mold 100, 200, 300 to define the molding cavity 101 therein, wherein the first mold stack 106A, 206A, 306A is arranged within the first aperture 156A that is defined by the shuttle 154 of the molded article transfer device 150, 250. Next, the molding process 600 involves molding 604 of the first molded article 102A within the molding cavity 101. Next, the molding process 600 involves opening 606 of the first mold stack 106A, 206A, 306A to retract it from the first aperture 156A. Next, the molding process 600 involves arranging 608 the first mold stack 106A, 206A, 306A to eject the first molded article 102A into the first aperture 156A of the shuttle 154. The molding process 600 ends with shuttling 610 of the shuttle 154 to transfer the first molded article 102A within the first aperture 156A.

Figure 10:
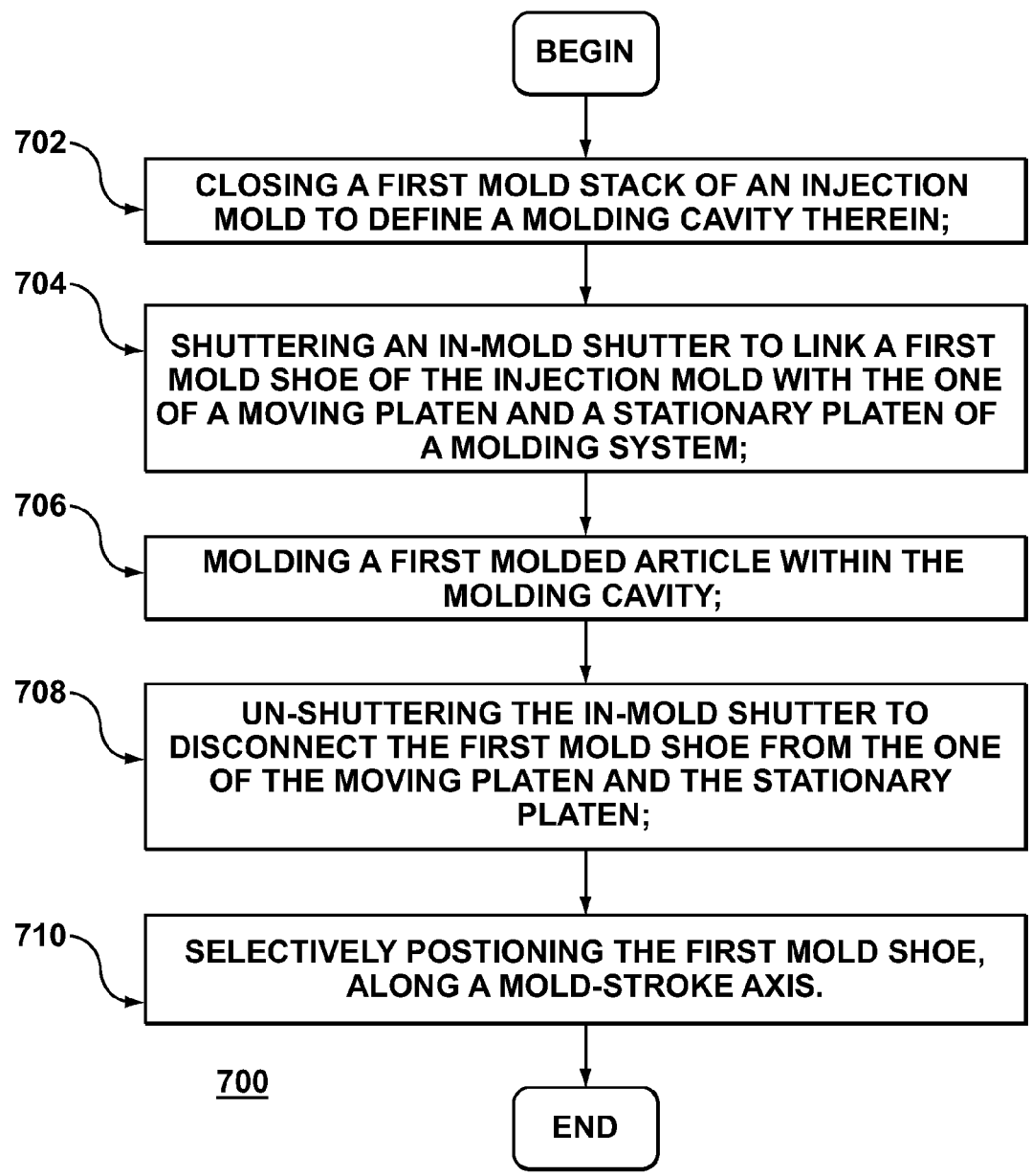
FIG. 10 depicts a flow chart of a second aspect of the production molding process.

A flow chart outlining the steps of the molding process 700 is shown with reference to FIG. 10. The molding process 700 begins with closing 702 of the first mold stack 106A, 206A, 306A of the injection mold 100, 200, 300 to define the molding cavity 101 therein. Next, the molding process 700 involves shuttering 704 of the in-mold shutter 140 to engage the first mold shoe 130, 230, 330 of the injection mold 100, 200, 300 with one of the moving platen 912 and the stationary platen 914 of an injection molding system 900. Next, the molding process 700 involves molding 706 the first molded article 102A within the molding cavity 101. Next, the molding process 700 involves un-shuttering 708 the in-mold shutter 140 to disengage the first mold shoe 130, 230, 330 from the one of the moving platen 912 and the stationary platen 914. The molding process 700 ends with selectively positioning 710 the first mold shoe 130, 230, 330, along the mold-stroke axis X, whereby the first stack portion 110, 210, 310 and a second stack portion 120 of the first mold stack 106A are repositioned relative to each other substantially without relative movement between the moving platen 912 and the stationary platen 914 (i.e. although movement is not precluded).

The foregoing steps of the molding processes 600, 700 are executable, in practice, on a controller 501, as shown with reference to FIG. 3, such as the one that is typically associated with the injection molding system 900 (FIG. 1). The controller 501 is shown to be connected to the shuttle actuator 168 for the control thereof. Likewise, some or all of the remaining actuators that are associated with the injection mold 100, 200, 300, as discussed previously, would be similarly connected thereto. The steps of the molding processes 600, 700 are embodied in instructions 512 that are retained in a controller-usable memory 510 of the controller 501, the instructions 512 directing the controller 501 to execute the molding process 600, 700.

Figure 11A:
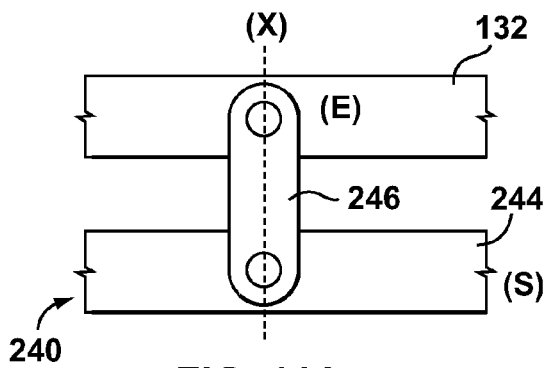
Figure 11B:
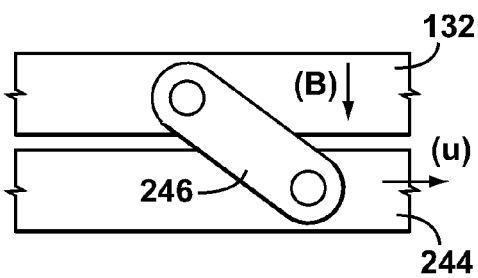

FIGS. 11A and 11B depict an alternative non-limiting embodiment of an in-mold shutter 240 for selectively engaging, in use, a first mold shoe 130 (only the first core retainer 132 of which is shown) with a platen (not shown) of the mold clamping assembly (not shown).

The in-mold shutter 240 includes a shutter member 244 that is slidably coupled, for example, to a support base (not shown), in the manner described previously with reference to the description of the in-mold shutter 140, or directly to the platen (not shown), and a link member 246. The link member 246 pivotally connects the first core retainer 132 (or other such member of the first mold shoe) with the shutter member 244. In this way, the first core retainer 132 of the first mold shoe is rendered movable, in use, along the mold-stroke axis X, between the extended position E (FIG. 11A) and a retracted position B (FIG. 11B), with movement of the shutter member 244, by the shutter actuator (not shown), between a shut position S (FIG. 11A) and an open position U (FIG. 11B), respectively.

In operation, with the first mold shoe 130 having been positioned into the extended position E (FIG. 11A), the link member 246 is oriented to engage the first core retainer 132 of the first mold shoe with the platen (not shown) in a manner that holds the first mold shoe 130 in the extended position E during molding of the first molded article 102A (not shown). Where the form of the link member 246 is a simple elongate body it is best able to support (i.e. link an applied mold clamping force between the first mold shoe and the platen) when oriented substantially parallel to the mold-stroke axis X.

Figure 12A:
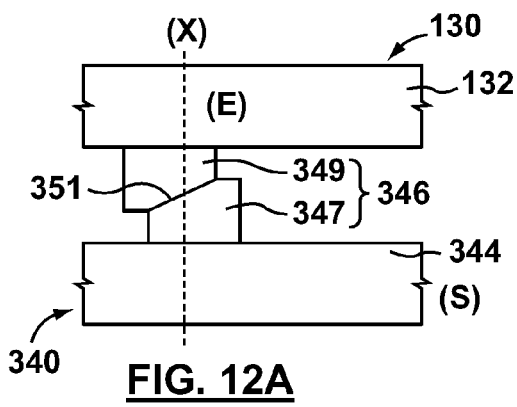
Figure 12B:
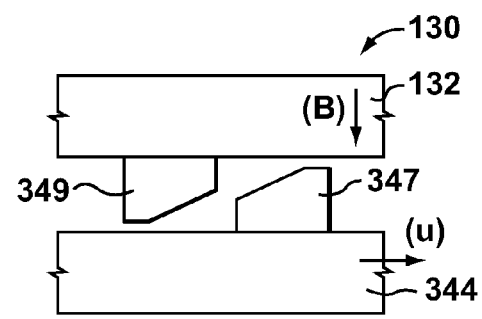

FIGS. 12A and 12B depict another alternative non-limiting embodiment of an in-mold shutter 340 for selectively engaging, in use, a first mold shoe 130 (only the first core retainer 132 of which is shown) with a platen (not shown) of the mold clamping assembly (not shown).

The in-mold shutter 340 includes a shutter member 344 that is slidably coupled, for example, to a support base (not shown), in the manner described previously with reference to the description of the in-mold shutter 140, or directly to the platen (not shown), and a link member 346. The link member 346 includes two parts, namely a first wedge 347 and a second wedge 349, wherein the first wedge 347 is associated with a shutter member 344 and the second wedge 349 is associated with the first core retainer 132 of the first mold shoe 130.

The first wedge 347 and the second wedge 349 are configured to define a wedging interface 351 therebetween (across complementary angled faces thereof) that is operable to translate movement of the shutter member 344, by the shutter actuator (not shown), between a shut position S (FIG. 11A) and an open position U (FIG. 11B), into movement of the first core retainer 132 of the first mold shoe along the mold-stroke axis X.

In operation, with the shutter member 344 positioned in the shut position S, as depicted with reference to FIG. 12A, the first wedge 347 and the second wedge 349 of the link member 346 are cooperable to engage the first mold shoe 130 with the platen in a manner that holds the first mold shoe 130 in the extended position E during molding of the first molded article 102A (not shown). Conversely, with the shutter member 344 positioned in the open position U, as depicted with reference to FIG. 12B, the first wedge 347 and the second wedge 349 are spaced apart, thereby disengaging the wedging interface 351 therebetween, whereby the first core retainer 132 of the first mold shoe may be moved along the mold stroke axis X between the extended position E (FIG. 12A) and a retracted position B (FIG. 12B).

Figure 13A:
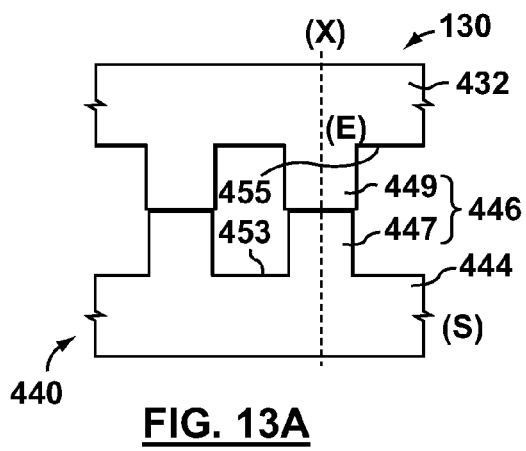
Figure 13B:
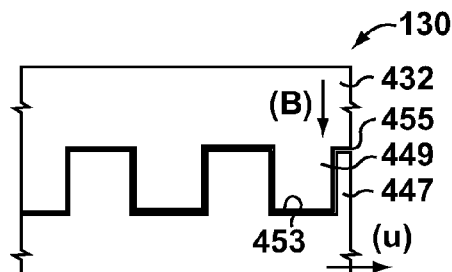

FIGS. 13A and 13B depict a further alternative non-limiting embodiment of an in-mold shutter 440 for selectively engaging, in use, a first mold shoe 430 (only the first core retainer 432 of which is shown) with a platen (not shown) of the mold clamping assembly (not shown).

The in-mold shutter 440 includes a shutter member 444 that is slidably coupled, for example, to a support base (not shown), in the manner described previously with reference to the description of the in-mold shutter 140, or directly to the platen (not shown), and a link member 446. The link member 446 includes two parts, namely a first key 447 and a second key 449, wherein the first key 447 is associated with a shutter member 444 and the second key 449 is associated with the first core retainer 132 of the first mold shoe 130. The in-mold shutter 440 also includes a pair of keyways, namely a first keyway 455 that is defined in the first core retainer 132 of the first mold shoe 130 and a second keyway 453 that is defined in the shutter member 444. The keys and keyways are positioned on their respective supporting structures wherein with the shutter member 444 positioned in an open position U (FIG. 13B), the first key 447 is recessable within the first keyway 455 and likewise the second key 449 is recessable within the second keyway 453, whereby the first mold shoe 130 is movable along the mold-stroke axis (X).

In operation, with the shutter member 444 positioned in a shut position S, by means of the shutter actuator (not shown), the first key 447 and the second key 449 of the link member 446 are cooperable, across a supporting interface 451 that is defined therebetween, to engage the first mold shoe 130 with the platen in a manner that holds the first mold shoe 130 in the extended position E during molding of the first molded article 102A (not shown). Conversely, with the shutter member 444 positioned in the open position U (FIG. 13B), by means of the shutter actuator, the first key 447 is recessable within the first keyway 455 and likewise the second key 449 is recessable within the second keyway 453, whereby the first mold shoe 130 is movable along the mold-stroke axis X between the extended position E (FIG. 13A) and a retracted position B (FIG. 13B).

It may be furthermore noted that the shutter member 444 may further include, as shown, an array of first keys, included in which is the first key 447, and an array of second keyways, included in which is the second keyway 453, and likewise the first mold shoe 130 includes an array of second keys, included in which is the second key 449, and an array of first keyways, included in which is the first keyway 455. Thus, with the first mold shoe 130 positioned in the extended position E and the shutter member 444 positioned in the shut position S, the array of first keys and the array of second keys are cooperable to engage the first mold shoe 130 with the platen in a manner that holds the first mold shoe 130 in the extended position E during molding of the first molded article 102A (not shown). Likewise, with the shutter member 444 positioned in an open position U, the array of first keys are recessable within the array of first keyways and the array of second keys are recessable within the array of second keyways, whereby the first mold shoe 130 is movable along the mold-stroke axis X.

Lastly, with reference to FIG. 14 there is depicted yet a further alternative non-limiting embodiment of an in-mold shutter 540 for selectively engaging, in use, a first mold shoe 130 (only the first core retainer 132 of which is shown) with a platen (not shown) of the mold clamping assembly (not shown).

The in-mold shutter 540 includes a shutter actuator 548 that is configured to selectively engage the first core retainer 132 of the first mold shoe 130 with the platen (not shown) to hold the first mold shoe 130 in an extended position E, along a mold-stroke axis X, during a step of molding a first molded article 102A (not shown). The actuator 548 may be configured, as shown, as any manner of linear actuator, such as, for example, a piston actuator, wherein a shutter member 544 defines a piston bore 559 within which to receive a piston 557, and that a link member 546 (i.e. rod) further connects the piston 557 with the first core retainer 132.

In operation, with the first mold shoe 130 positioned in the extended position E, as shown, the shutter actuator 548 is operable to extend the link member 546 to engage the first mold shoe 130 with the platen (not shown) in a manner that holds the first mold shoe 130 in the extended position E during molding of the first molded article 102A (not shown). Conversely, the shutter actuator 548 is further operable to retract the link member 546 to effectively disengage (i.e. no longer provides a load path) the first mold shoe 130 from the platen (not shown).

It is noted that the foregoing has outlined some of the more pertinent non-limiting embodiments. These non-limiting embodiments may be used for many applications. Thus, although the description is made for particular arrangements and methods, the intent and concept of these non-limiting embodiments may be suitable and applicable to other arrangements and applications. It will be clear to those skilled in the art that modifications to the disclosed non-limiting embodiments can be effected. The described non-limiting embodiments ought to be construed to be merely illustrative of some of the more prominent features and applications thereof. Other beneficial results can be realized by applying these non-limiting embodiments in a different manner or modifying them in ways known to those familiar with the art. This includes the mixing and matching of features, elements and/or functions between various non-limiting embodiments is expressly contemplated herein, unless described otherwise, above.

What is claimed is:

1. An in-mold shutter that is operable to selectively engage, in use, a first mold shoe of a first mold half of an injection mold to one of a moving platen and a stationary platen of a mold clamping assembly, wherein the in-mold shutter comprises:
    a shutter member that is associated, in use, with one of a platen of the mold clamping assembly and the first mold shoe of the injection mold; and
    a link member that is associated with a remaining one of the platen and the first mold shoe;
    the shutter member and the link member being selectively engageable to hold the first mold shoe in an extended position, along a mold-stroke axis, during a step of molding a first molded article in the injection mold.

2. The in-mold shutter of claim 1, further comprising:
    a shutter actuator with which to selectively engage the shutter member with the link member.

3. The in-mold shutter of claim 1, wherein:
    the shutter member and the link member are configured to cooperate such that: (i) when the shutter member is positioned in an open position, relative to the link member, the shutter member is disengaged from the link member, whereby the first mold shoe may be moved, in use, along the mold-stroke axis; and (ii) when the shutter member is positioned in a shut position, the shutter member is engaged with the link member, whereby the first mold shoe is engaged with the platen.

4. The in-mold shutter of claim 3, wherein:
the shutter member defines a first clearance aperture that is configured to accommodate the link member being arranged therein, in use, with the shutter member being positioned in the open position and with a movement of the first mold shoe, along the mold-stroke axis, towards a retracted position.

5. The in-mold shutter of claim 4, wherein:
the first clearance aperture is structured to extend through the shutter member;
a support base defines a second clearance aperture that is aligned, in use, with the first clearance aperture, with positioning of the shutter member into the open position; and
the second clearance aperture is configured to accommodate the link member being arranged therein, in use, with the shutter member being positioned in the open position and with the movement of the first mold shoe, along the mold-stroke axis, towards the retracted position.

6. The in-mold shutter of claim 2, wherein:
the link member pivotally connects the first mold shoe with the shutter member, whereby the first mold shoe is movable, in use, along the mold-stroke axis, between the extended position and a retracted position with movement of the shutter member, by the shutter actuator, between a shut position and an open position, respectively; and
wherein with the first mold shoe having been positioned into the extended position, the link member is oriented to engage the first mold shoe with the platen in a manner that holds the first mold shoe in the extended position during molding of the first molded article.

7. The in-mold shutter of claim 2, wherein:
the link member has an elongate body that is oriented to be substantially parallel to the mold-stroke axis with movement of the shutter member into the shut position.

8. The in-mold shutter of claim 2, wherein:
the link member includes a first wedge and a second wedge, wherein the first wedge is associated with the shutter member and the second wedge is associated with the first mold shoe;
the first wedge and the second wedge are configured to define a wedging interface therebetween that is operable to translate movement of the shutter member into the movement of the first mold shoe along the mold-stroke axis, whereby with positioning of the shutter member into a shut position the first mold shoe is positioned into the extended position; and
wherein with the first mold shoe positioned in the extended position, the first wedge and the second wedge of the link member are cooperable to engage the first mold shoe with the platen in a manner that holds the first mold shoe in the extended position during molding of the first molded article.

9. The in-mold shutter of claim 2, wherein:
the link member includes a first key and a second key, wherein the first key is associated with the shutter member and the second key is associated with the first mold shoe;
wherein with the shutter member positioned in a shut position, the first key and the second key of the link member are cooperable, across a supporting interface that is defined therebetween, to engage the first mold shoe with the platen in a manner that holds the first mold shoe in the extended position during molding of the first molded article; and
wherein with the shutter member positioned in an open position, the first key on the shutter member is recessable within a first keyway that is defined in the first mold shoe and the second key on the first mold shoe is recessable within a second keyway that is defined in the shutter member, whereby the first mold shoe is movable along the mold-stroke axis.

10. The in-mold shutter of claim 9, wherein:
the shutter member includes an array of first keys, included in which is the first key, and an array of second keyways, included in which is the second keyway; and
the first mold shoe includes an array of second keys, included in which is the second key, and an array of first keyways, included in which is the first keyway;
wherein with the first mold shoe positioned in the extended position and the shutter member positioned in the shut position, the array of first keys and the array of second keys are cooperable to engage the first mold shoe with the platen in the manner that holds the first mold shoe in the extended position during molding of the first molded article; and
wherein with the shutter member positioned in the open position, the array of first keys are recessable within the array of first keyways and the array of second keys are recessable within the array of second keyways, whereby the first mold shoe is movable along the mold-stroke axis.

11. The in-mold shutter of claim 3, further comprising:
a support base, wherein the shutter member is slidably coupled to the support base.

12. The in-mold shutter of claim 11, further comprising:
an ejector box with which to couple a molded article transfer device to the support base;
the ejector box defines a space within which the first mold shoe may be moved, in use, along the mold-stroke axis.

13. The in-mold shutter of claim 3, wherein:
the injection mold includes a first mold stack with which to define a molding cavity to mold, in use, the first molded article, a first stack portion of the first mold stack is connected to the first mold shoe.

14. The in-mold shutter of claim 13, wherein:
the link member is aligned with the first stack portion.

15. The in-mold shutter of claim 13, wherein:
the injection mold includes a plurality of mold stacks, included in which is the first mold stack.

16. An in-mold shutter for use with an injection mold wherein the in-mold shutter is configured such that the injection mold may be opened or closed substantially without having to move a moving platen relative to a stationary platen.

17. The in-mold shutter of claim 16, wherein the in-mold shutter is operable between a shut position wherein a first mold shoe of a first mold half is held in an extended position relative to one of a moving platen and a stationary platen of a mold clamping assembly during molding of a molded article, and an open position wherein the first mold shoe is disengaged from the one of the moving platen and the stationary platen for movement relative thereto.

* * * * *